US008704955B2

(12) United States Patent  (10) Patent No.: US 8,704,955 B2
Ichimura et al.  (45) Date of Patent: *Apr. 22, 2014

(54) COMMUNICATION SYSTEM, TRANSMISSION DEVICE, RECEPTION DEVICE, COMMUNICATION METHOD, PROGRAM, AND COMMUNICATION CABLE

(75) Inventors: Gen Ichimura, Tokyo (JP); Akihiko Tao, Kanagawa (JP)

(73) Assignee: Sony Corporation (JP)

( * ) Notice: Subject to any disclaimer, the term of this patent is extended or adjusted under 35 U.S.C. 154(b) by 1050 days.

This patent is subject to a terminal disclaimer.

(21) Appl. No.: 12/452,184

(22) PCT Filed: Jun. 26, 2008

(86) PCT No.: PCT/JP2008/061604
§ 371 (c)(1),
(2), (4) Date: Apr. 7, 2010

(87) PCT Pub. No.: WO2009/001880
PCT Pub. Date: Dec. 31, 2008

(65) Prior Publication Data
US 2010/0188567 A1 Jul. 29, 2010

(30) Foreign Application Priority Data
Jun. 26, 2007 (JP) .............................. P2007-168176

(51) Int. Cl.
*H04N 7/00* (2011.01)
*H04N 11/00* (2006.01)
*H04N 5/268* (2006.01)
*G06F 13/12* (2006.01)
*G06F 13/38* (2006.01)

(52) U.S. Cl.
USPC .............................. 348/705; 348/467; 710/65

(58) Field of Classification Search
None
See application file for complete search history.

(56) References Cited

U.S. PATENT DOCUMENTS 8,374,225 B2 * 2/2013 Rofougaran et al. .......... 375/222
2003/0089785 A1 * 5/2003 Tashiro ........................ 235/492
(Continued)

FOREIGN PATENT DOCUMENTS

CA 2668980 A1 5/2008
JP 9-153886 A 6/1997
(Continued)

OTHER PUBLICATIONS

"High-Definition Multimedia Interface Specification Version 1.1", May 20, 2004, pp. 10-42, 4. Physical Layer.
(Continued)

*Primary Examiner* — Idriss N Alrobaye
*Assistant Examiner* — Ronald Modo
(74) *Attorney, Agent, or Firm* — Lerner, David, Littenberg, Krumholz & Mentlik, LLP

(57) ABSTRACT

The present invention relates to a communication system, a transmission device, a reception device, a communication method, a program, and a communication cable, whereby high-speed communication can be executed while maintaining compatibility. In the event that an HDMI® source 71 and an HDMI® sink 72 execute two-way IP communication using a CEC line 84 and a signal line 141, a switching control unit 121 controls a switch 133 to select a partial signal making up the differential signal from a conversion unit 131 at the time of transmitting data, and controls the switch 133 to select a partial signal making up a differential signal from a receiver 82 at the time of transmitting data, and in the case of executing two-way communication using the CEC line 84 alone, the switching control unit 121 controls the switch 133 to select the CEC signal from the HDMI® source 71 or receiver 82 with the switch 133. The present invention may be applied to HDMI®, for example.

5 Claims, 36 Drawing Sheets

(56) References Cited

U.S. PATENT DOCUMENTS

| | | |
|---|---|---|
| 2005/0028211 A1 | 2/2005 | Mochizuki et al. |
| 2006/0001777 A1 | 1/2006 | Araki |

FOREIGN PATENT DOCUMENTS

| | | |
|---|---|---|
| JP | 2005-018312 A | 1/2005 |
| JP | 2005-057714 A | 3/2005 |
| JP | 2006-019948 A | 1/2006 |
| JP | 2007168177 A | 7/2007 |
| JP | 2007-311884 A | 11/2007 |
| WO | WO-2008-056686 A1 | 5/2008 |

OTHER PUBLICATIONS

Office Action from Japanese Application No. 2007-168176, dated Nov. 15, 2012.

* cited by examiner

FIG. 4

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved(N.C. on device) |
| 15 | SCL | 16 | SDA |
| 17 | DDC/CEC Ground | 18 | +5V Power |
| 19 | Hot Plug Detect | | |

HDMI PIN-OUT (CASE OF TYPE-A)

FIG. 5

| PIN | Signal Assignment | PIN | Signal Assignment |
|---|---|---|---|
| 1 | TMDS Data2 Shield | 2 | TMDS Data2+ |
| 3 | TMDS Data2− | 4 | TMDS Data1 Shield |
| 5 | TMDS Data1+ | 6 | TMDS Data1− |
| 7 | TMDS Data0 Shield | 8 | TMDS Data0+ |
| 9 | TMDS Data0− | 10 | TMDS Clock Shield |
| 11 | TMDS Clock+ | 12 | TMDS Clock− |
| 13 | DDC/CEC Ground | 14 | CEC |
| 15 | SCL | 16 | SDA |
| 17 | Reserved | 18 | +5V Power |
| 19 | Hot Plug Detect | | |

HDMI PIN-OUT (CASE OF TYPE-C)

E-EDID DATA STRUCTURE

FIG. 9

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | Full Duplex | Half Duplex | Video Latency | | | | |
| 9 | Audio Latency | | | | | | | |
| 10 | | | | | | | | |
| 11 | Interlaced Video Latency | | | | | | | |
| 12 | Interlaced Audio Latency | | | | | | | |
| 13...N | Reserved (0) | | | | | | | |

E-EDID Vendor Specific Data Block Structure

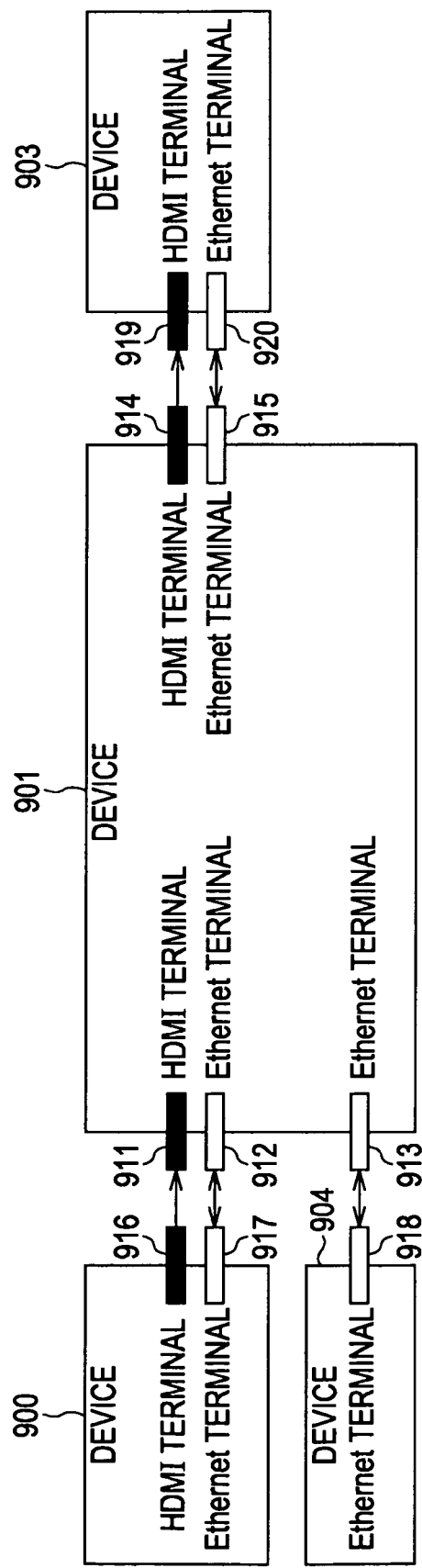

FIG. 23

Table 8-6 HDMI-LLC Vendor-specific Data Block (HDMI VSDB)

| Byte# | 7 | 6 | 5 | 4 | 3 | 2 | 1 | 0 | |
|---|---|---|---|---|---|---|---|---|---|
| 0 | Vendor-specific tag code (=3) | | | Length(=N) | | | | | |
| 1 | 24-bit IEEE Registration Indentifier (0x000C03) (least significant byte first) | | | | | | | | |
| 2 | | | | | | | | | |
| 3 | | | | | | | | | |
| 4 | A | | | | B | | | | |
| 5 | C | | | | D | | | | |
| 6 | Supports_AI | DC_48bit | DC_36bit | DC_30bit | DC_Y444 | Rsvd (0) | Rsvd (0) | DVI_Dual | extension fields ↓ |
| 7 | Max_TMDS_Clock | | | | | | | | |
| 8 | Latency_Fields_Present | I_Latency_Fields_Present | Rsvd (0) | Rsvd (0) | Rsvd (0) | Rsvd (0) | Rsvd (0) | Rsvd (0) | |
| (9) | Video_Latency | | | | | | | | |
| (10) | Audio_Latency | | | | | | | | |
| (11) | Interlaced_Video_Latency | | | | | | | | |
| (12) | Interlaced_Audio_Latency | | | | | | | | |
| 9,11 or 13*...N | Reserved (0)** | | | | | | | | |

\* The position of these bytes will depend upon the values of Latency_Fields_Present and I_Latency_Fields_Present.

\*\* No additional bytes are necessary but if present, they shall be zero.

- Length      [5 bits] Total length of data block, not including this byte. Shall be 5 (encompassing fields only up to C and D fields) or greater, to encompass additional fields.

- A,B,C,D      [4 bits each] Components of Source Physical Address (A,B,C,D). See Section 8.7.

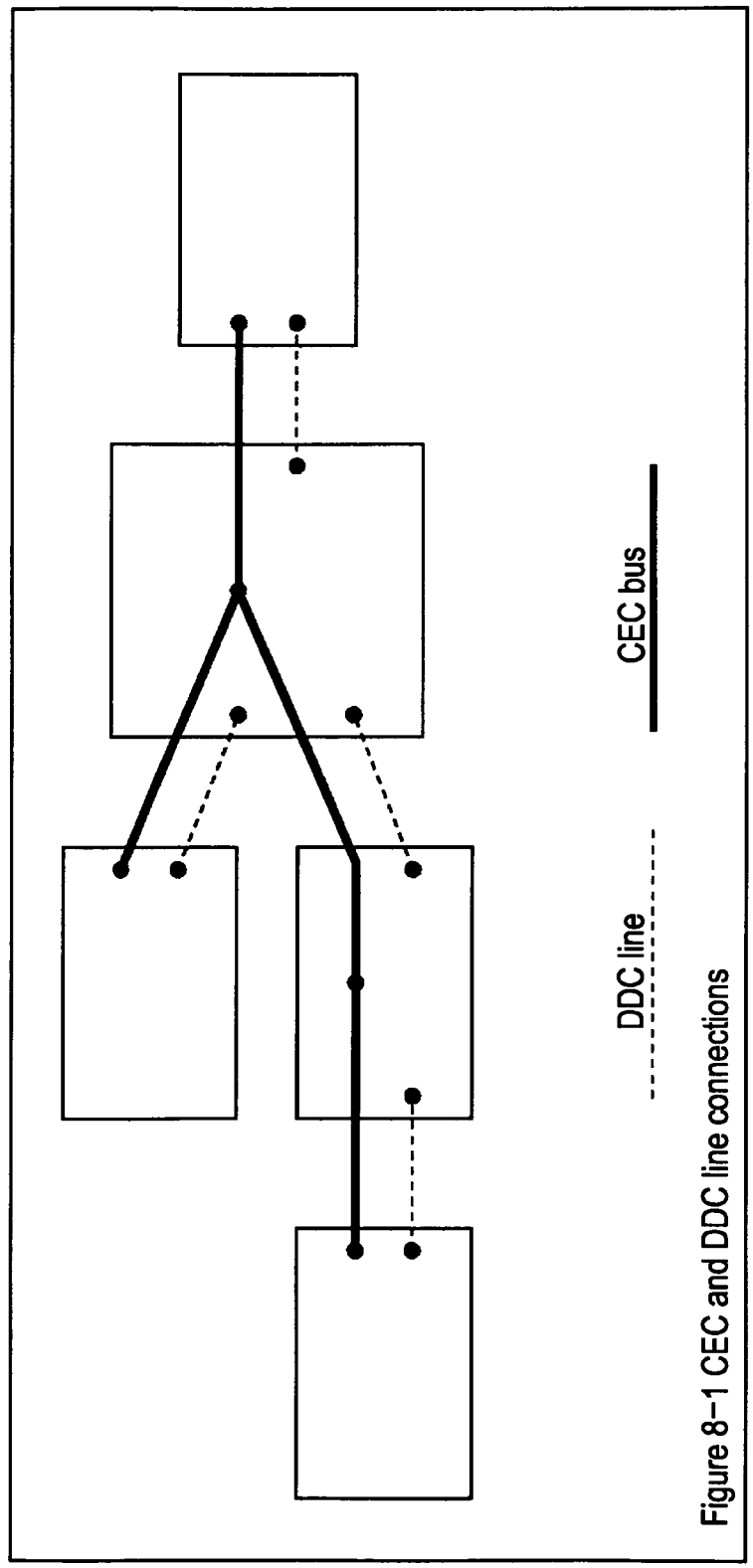

Figure 8-2 Typical HDMI cluster

Figure 8-3 Addresses within an HDMI cluster

FIG. 27

| CEC Table 5 Logical Addresses | |
|---|---|
| Address | Device |
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered(as initiator address) Broadcast(as destination address) | under 35 U.S.C. §371 of International Application No. PCT/JP2008/061604 filed Jun. 26, 2008, published on Dec. 31, 2008 as WO 2009/001880 A1, which claims priority from Japanese Patent Application No. JP 2007-168176 filed in the Japanese Patent Office on Jun. 26, 2007.

COMMUNICATION SYSTEM, TRANSMISSION DEVICE, RECEPTION DEVICE, COMMUNICATION METHOD, PROGRAM, AND COMMUNICATION CABLE

CROSS-REFERENCES TO RELATED APPLICATIONS

The present application is a national phase entry under 35 U.S.C. §371 of International Application No. PCT/JP2008/061604 filed Jun. 26, 2008, published on Dec. 31, 2008 as WO 2009/001880 A1, which claims priority from Japanese Patent Application No. JP 2007-168176 filed in the Japanese Patent Office on Jun. 26, 2007.

TECHNICAL FIELD

The present invention relates to a communication system, a transmission device, a reception device, a communication method, a program, and a communication cable, and more specifically, it relates to a communication system, a transmission device, a reception device, a communication method, a program, and a communication cable, whereby high-speed communication can be executed while maintaining compatibility with a communication interface, for example, such as an HDMI (High Definition Multimedia Interface)® whereby the pixel data of an uncompressed image can be transmitted in one direction at high speed.

BACKGROUND ART

In recent years, for example, HDMI® is becoming widespread as a communication interface wherein a digital television signal, i.e., the pixel data of an uncompressed (baseband) image, and audio data accompanying the image thereof are transmitted from, e.g., a DVD (Digital Versatile Disc) recorder, set top box, or other AV (Audio Visual) source to a television receiver, a projector, or other display device at high speed.

With regard to HDMI®, a TMDS (Transition Minimized Differential Signaling) channel for transmitting pixel data and audio data from an HDMI® source to an HDMI® sink in one direction at high speed, a CEC line (Consumer Electronics Control Line) for executing two-way communication between an HDMI® source and an HDMI® sink, and so forth are stipulated in the HDMI standard.

For example, such as shown in FIG. 1, a digital television receiver 11, and an AV amplifier 12 are connected with an HDMI cable 13 conforming to HDMI®, thereby enabling the high-speed transmission of pixel data and audio data.

In FIG. 1, a digital television receiver 11, an AV amplifier 12, and a playback device 14 are installed in a living room situated to the left side in the drawing of a user's home, and between the digital television receiver 11 and the AV amplifier 12, and between the AV amplifier 12 and the playback device 14 are connected with an HDMI® cable 13, and an HDMI® cable 15.

Also, a hub 16 is installed in the living room, and the television receiver 11 and the playback device 14 are connected to the hub 16 using a LAN (Local Area Network) cable 17 and a LAN cable 18. Further, in the drawing, a digital television receiver 19 is installed in a bedroom situated to the right side of the living room, and the digital television receiver 19 is connected to the hub 16 via a LAN cable 20.

For example, in the case that a content recorded in the playback device 14 is played, and an image is displayed on the digital television receiver 11, the playback device 14 decodes the pixel data and audio data for playing the content, and supplies the uncompressed pixel data and audio data obtained as a result thereof to the digital television receiver 11 via the HDMI® cable 15, AV amplifier 12, and HDMI® cable 13. Subsequently, the digital television receiver 11 displays an image, or outputs audio based on the pixel data and audio data supplied from the playback device 14.

Also, in the case that a content recorded in the playback device 14 is played, and an image is displayed on the digital television receiver 11 and the digital television receiver 19 simultaneously, the playback device 14 supplies the compressed pixel data and audio data for playing the content to the digital television receiver 11 via the LAN cable 18, hub 16, and LAN cable 17, and also supplies those to the digital television receiver 19 via the LAN cable 18, hub 16, and LAN cable 20.

Subsequently, the digital television receiver 11 and digital television receiver 19 decode the pixel data and audio data supplied from the playback device 14, and displays an image or outputs audio based on the uncompressed pixel data and audio data obtained as a result thereof.

Further, in the case that the digital television receiver 11 has received pixel data and audio data for playing a program on air on television, in the event that the received audio data is, for example, 5.1-channel surround audio data or the like, and the digital television receiver 11 has difficulty in decoding the received audio data, the television receiver 11 converts the audio data into an optical signal, and transmits this to the AV amplifier 12.

The AV amplifier 12 receives the optical signal transmitted from the digital television receiver 11 to subject this to photoelectric conversion, and decodes the audio data thus obtained. Subsequently, the AV amplifier 12 amplifies the decoded uncompressed audio data as appropriate, and plays the audio using a surround speaker connected to the AV amplifier 12. Thus, the digital television receiver 11 decodes the received pixel data, displays the image based on the decoded pixel data, and plays the 5.1-channel surround program by outputting the audio using the AV amplifier 12 based on the audio data supplied to the AV amplifier 12.

Incidentally, with regard to HDMI®, a device has been proposed wherein when transmitting pixel data and audio data from an HDMI® source to an HDMI® sink, discarded data is muted by turning on/off transmission of data (e.g., see Patent Document 1).

Further, with regard to HDMI®, a device has been proposed wherein, of multiple HDMI® sinks, pixel data and audio data can be output to a desired HDMI® sink without switching a cable for connecting an HDMI® source and an HDMI® sink by switching a terminal for outputting pixel data and audio data using a changeover switch (e.g., see Patent Document 2).

Patent Document 1: Japanese Unexamined Patent Application Publication No. 2005-57714
Patent Document 2: Japanese Unexamined Patent Application Publication No. 2006-19948

DISCLOSURE OF INVENTION

Technical Problem

As described above, with HDMI®, pixel data and audio data can be transmitted from an HDMI® source to an HDMI® sink in one direction at high speed, and also two-way communication can be executed between an HDMI® source and an HDMI® sink.

Note however, the transmission rate of two-way communication that can be executed with the current HDMI® is several hundreds bps, and accordingly, two-way communication such as two-way IP (Internet Protocol) communication or the like has difficulty in being executed between an HDMI® source and an HDMI® sink at high speed.

Therefore, in the case of executing two-way IP communication with HDMI® including the devices described in Patent Document 1 and Patent Document 2, the data amount of data to be transmitted with IP communication is restricted. Also, upon transmitting data having great data amount using IP communication, great time delay is caused. Accordingly, for example, it has been difficult for an application used for transmitting data having great data amount such as a compressed image bi-directionally, or an application for requesting a high-speed response to employ HDMI®.

Therefore, for example, a method can be conceived wherein a dedicated pin for two-way high-speed IP communication is provided to the connectors for HDMI® of an HDMI® source and an HDMI® sink, and two-way IP communication is executed at high speed using the dedicated pins thereof.

Note however, providing a dedicated pin to the connector of the current HDMI® reduces compatibility as to the current HDMI®.

The present invention has been made in the light of such a situation, and the object thereof is to enable a communication interface capable of transmitting pixel data of an uncompressed image in one direction at high speed, such as HDMI® for example, to execute high-speed two-way communication while maintaining compatibility.

Technical Solution

A communication system according to a first aspect of the present invention is a communication system including: a transmission device configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal; and a reception device configured to receive the first differential signal transmitted from the transmission device; with the transmission device including first conversion means configured to convert data different from the pixel data, which is data to be transmitted, into a second differential signal made up of a first partial signal and a second partial signal, transmit the first partial signal to the reception device via a first signal line, and also output the second partial signal, first selecting means configured to select one of a transmission signal that is a signal relating to control, and the second partial signal output from the first conversion means, and transmit the selected signal to the reception device via a second signal line, first control means configured to control, in the case of transmitting the transmission signal to the reception device, the first selecting means so as to select the transmission signal, and in the case of transmitting the second differential signal to the reception device, to control the first selecting means so as to select the second partial signal, and first decoding means configured to receive a third differential signal transmitted from the reception device, and decode this to the original data; and with the reception device including second conversion means configured to convert data different from the pixel data, which is data to be transmitted, into the third differential signal, and transmit this to the transmission device, second decoding means configured to receive the second differential signal transmitted from the transmission device, and decode this to the original data, second selecting means configured to select one of the transmission signal and the second partial signal, and second control means configured to control, in the case of receiving the transmission signal, the second selecting means so as to select and receive the transmission signal, and in the case of receiving the second differential signal, to control the second selecting means so as to select the second partial signal, and the second decoding means so as to receive the second partial signal.

A communication method according to the first aspect of the present invention is a communication method for a communication system including a transmission device configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal, and a reception device configured to receive the first differential signal transmitted from the transmission device; with the transmission device including first conversion means configured to convert data different from the pixel data, which is data to be transmitted, into a second differential signal made up of a first partial signal and a second partial signal, transmit the first partial signal to the reception device via a first signal line, and also output the second partial signal, first selecting means configured to select one of a transmission signal that is a signal relating to control, and the second partial signal output from the first conversion means, and first decoding means configured to receive a third differential signal transmitted from the reception device, and decode this to the original data; with the reception device including second conversion means configured to convert data different from the pixel data, which is data to be transmitted, into the third differential signal, and transmit this to the transmission device, second decoding means configured to receive the second differential signal transmitted from the transmission device, and decode this to the original data, and second selecting means configured to select one of the transmission signal and the second partial signal; and with the communication method including the steps of: controlling, in the case of transmitting the transmission signal to the reception device, the first selecting means so as to select the transmission signal, and in the case of transmitting the second differential signal to the reception device, controlling the first selecting means so as to select the second partial signal, controlling, in the case of the receiving device receiving the transmission signal, the second selecting means so as to select and receive the transmission signal, and in the case of the receiving device receiving the second differential signal, controlling the second selecting means so as to select the second partial signal, and the second decoding means so as to receive the second partial signal.

With the first aspect of the present invention, with the transmission device, data different from pixel data, which is data to be transmitted, is converted into a second differential signal made up of a first partial signal and a second partial signal, the first partial signal is transmitted to the reception device via a first line, and also said second partial signal is output, one of a transmission signal that is a signal relating to control, and said output second partial signal is selected, and the selected signal is transmitted to the reception device via a second signal line. Here, in the case of transmitting the transmission signal to the reception device, the transmission signal is controlled so as to be selected, and in the case of transmitting the second differential signal to the reception device, the second partial signal is controlled so as to be selected. Also, the third differential signal transmitted from said reception device is received, and is decoded to the original data.

On the other hand, with the reception device, data different from the pixel data, which is data to be transmitted, is converted into the third differential signal, and is transmitted to the transmission device, and the second differential signal transmitted from the transmission device is received, and is decoded to the original data, and one of the transmission signal and the second partial signal is selected. Here, in the case of receiving the transmission signal, the transmission signal is controlled so as to be selected and received, and in the case of receiving the second differential signal, the second partial signal is controlled so as to be selected and received.

A transmission device according to a second aspect of the present invention is a transmission device configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal, including: conversion means configured to convert data different from the pixel data, which is data to be transmitted, into a second differential signal made up of a first partial signal and a second partial signal, transmit the first partial signal to the reception device via a first signal line, and also output the second partial signal; first selecting means configured to select one of a first transmission signal that is a signal relating to control, and the second partial signal output from the conversion means, and transmit the selected signal to the reception device via a second signal line; first control means configured to control, in the case of transmitting the first transmission signal to the reception device, the first selecting means so as to select the first transmission signal, and in the case of transmitting the second differential signal to the reception device, to control the first selecting means so as to select the second partial signal; and decoding means configured to receive a third differential signal made up of a third partial signal and a fourth partial signal, transmitted from the reception device, and decode this to the original data.

The decoding means may be controlled to receive the third differential signal made up of the third partial signal transmitted via the second signal line, and the fourth partial signal transmitted via the first signal line; with the first selecting means being controlled to select the second partial signal or the third partial signal, or the first transmission signal; and with the first control means being controlled to cause first selecting means to select the third partial signal, and the decoding means to receive the third partial signal, in the case of receiving the third differential signal.

The first selecting means may select the second partial signal or the third partial signal, or the first transmission signal, or a reception signal that is a signal relating to control, transmitted from the reception device via the second signal line, and in the case of selecting the reception signal, receive and output the selected reception signal.

The decoding means may receive the third differential signal made up of the third partial signal transmitted via a third signal line, and the fourth partial signal transmitted via a fourth signal line; with the transmission device further including: second selecting means configured to select one of the third partial signal, and a second transmission signal that is a signal relating to control, to be transmitted to the reception device; third selecting means configured to select one of the fourth partial signal, and a third transmission signal to be transmitted to the reception device; and second control means configured to control, in the case of transmitting the second transmission signal and the third transmission signal to the reception device, the second selecting means so as to select the second transmission signal and to transmit the second transmission signal to the reception device via the third signal line, and to control the third selecting means so as to select the third transmission signal and to transmit the third transmission signal to the reception device via the fourth signal line, and in the case of receiving the third differential signal, control the second selecting means so as to select the third partial signal, and the decoding means so as to receive this, and the third selecting means so as to select the fourth partial signal, and the decoding means so as to receive this.

The first selecting means may select the second partial signal, or the first transmission signal, or a first reception signal that is a signal relating to control, transmitted from the reception device via the second signal line, and in the case of selecting the first reception signal, to receive and output the selected first reception signal; with the second selecting means selecting the third partial signal, or the second transmission signal, or a second reception signal that is a signal relating to control, transmitted from the reception device via the third signal line, and in the case of selecting the second reception signal, receiving and outputting the selected second reception signal.

The first transmission signal and the first reception signal may be a CEC (Consumer Electronics Control) signal that is data for control of the transmission device or the reception device; with the second reception signal being E-EDID (Enhanced Extended Display Identification Data) that is information relating to the performance of the reception device, used for control; with data to be converted into the second differential signal, and data obtained by decoding the third differential signal being data conforming to IP (Internet Protocol); with the first control means being controlled to cause the first selecting means to select the second partial signal after receiving the second reception signal; and with the second control means being controlled to cause the second selecting means and the third selecting means to select the third partial signal and the fourth partial signal after receiving the second reception signal.

A communication method or program according to the second aspect of the present invention is a communication method for a transmission device or a program causing a computer to control a transmission device, which is configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal; with the transmission device including conversion means configured to convert data different from the pixel data, which is data to be transmitted, into a second differential signal made up of a first partial signal and a second partial signal, transmit the first partial signal to the reception device via a first signal line, and also output the second partial signal, selecting means configured to select one of a transmission signal that is a signal relating to control, and the second partial signal output from the conversion means, and transmit the selected signal to the reception device via a second signal line, and decoding means configured to receive a third differential signal transmitted from the reception device, and decode this to the original data; with the communication method including the step of controlling, in the case of transmitting the transmission signal to the reception device, the selecting means so as to select the transmission signal, and in the case of transmitting the second differential signal to the reception device, controlling the selecting means so as to select the second partial signal.

With the second aspect of the present invention, data different from pixel data, which is data to be transmitted, is converted into a second differential signal made up of a first partial signal and a second partial signal, the first partial signal is transmitted to the reception device via a first signal line, and also the second partial signal is output, one of a first transmission signal that is a signal relating to control, and the output second partial signal is selected, and the selected signal is transmitted to the reception device via a second signal line. Here, in the case of transmitting the first transmission signal to the reception device, the first transmission signal is controlled so as to be selected, and in the case of transmitting the second differential signal to the reception device, the second partial signal is controlled so as to be selected. Also, a third differential signal made up of a third partial signal and a fourth partial signal transmitted from the reception device is received, and is decoded to the original data.

A reception device according to a third aspect of the present invention is a reception device configured to receive the pixel data of one screen worth of an uncompressed image to be transmitted from a transmission device in one direction within a valid image section that is a section obtained by removing a horizontal retrace section and a vertical retrace section from a section from one vertical synchronizing signal to the next vertical synchronizing signal, using a first differential signal, including: decoding means configured to receive a second differential signal made up of a first partial signal transmitted from the transmission device via a first signal line, and a second partial signal transmitted from the transmission device via a second signal line, and decode this to the original data; first selecting means configured to select one of the first partial signal, and a first reception signal that is a signal relating to control, transmitted from the transmission device via the first signal line; first control means configured to control, in the case of receiving the first reception signal, the first selecting means so as to select and receive the first reception signal, and in the case of receiving the second differential signal, to control the first selecting means so as to select the first partial signal, and the decoding means so as to receive this; and conversion means configured to convert data different from the pixel data, which is data to be transmitted, into a third differential signal made up of a third partial signal and a fourth partial signal, and transmit this to the transmission device.

The conversion means may be controlled to output the third partial signal, and also transmit the fourth partial signal to the transmission device via the second signal line; with the first selecting means being controlled to select the first reception signal, or the first partial signal, or the third partial signal output from the conversion means; and with the first control means being controlled to cause the first selecting means to select the third partial signal, and transmit this to the transmission device via the first signal line, in the case of transmitting the third differential signal.

The first selecting means may select the first partial signal or the third partial signal, or the first reception signal, or a transmission signal that is a signal relating to control, and in the case of selecting the transmission signal, to transmit the selected transmission signal to the transmission device via the first signal line.

The conversion means may output the third partial signal and the fourth partial signal; with the reception device further including: second selecting means configured to select one of the third partial signal output from the conversion means, and a second reception signal that is a signal relating to control, transmitted from the transmission device via a third signal line; third selecting means configured to select one of the fourth partial signal output from the conversion means, and a third reception signal transmitted from the transmission device via a fourth signal line; and second control means configured to control, in the case of receiving the second reception signal and the third reception signal, the second selecting means so as to select the second reception signal so as to receive this, and also control the third selecting means so as to select the third reception signal so as to receive this, and in the case of transmitting the third differential signal, to control the second selecting means so as to select the third partial signal and transmit this to the transmission device via the third signal line, and also to control the third selecting means so as to select the fourth partial signal and to transmit this to the transmission device via the fourth signal line.

The first selecting means may select the first partial signal, or the first reception signal, or a first transmission signal that is a signal relating to control, and in the case of selecting the first transmission signal, transmit the selected first transmission signal to the transmission device via the first signal line; with the second selecting means selecting the third partial signal, or the second reception signal, or a second transmission signal that is a signal relating to control, to be transmitted to the transmission device, and in the case of selecting the second transmission signal, transmitting the selected second transmission signal to the transmission device via the third signal line.

A communication method or program according to the third aspect of the present invention is a communication method for a reception device or a program causing a computer to control a reception device, which is configured to receive the pixel data of one screen worth of an uncompressed image to be transmitted from a transmission device in one direction within a valid image section that is a section obtained by removing a horizontal retrace section and a vertical retrace section from a section from one vertical synchronizing signal to the next vertical synchronizing signal, using a first differential signal, with the reception device including decoding means configured to receive a second differential signal made up of a first partial signal transmitted from the transmission device via a first signal line, and a second partial signal transmitted from the transmission device via a second signal line, and decode this to the original data, selecting means configured to select one of the first partial signal, and a reception signal that is a signal relating to control, transmitted from the transmission device via the first signal line, and conversion means configured to convert data different from the pixel data, which is data to be transmitted, into a third differential signal, and transmit this to the transmission device; with the communication method including the step of: controlling, in the case of receiving the reception signal, the selecting means so as to select and receive the reception signal, and in the case of receiving the second differential signal, controlling the selecting means so as to select the first partial signal, and the decoding means so as to receive this.

With the third aspect of the present invention, a second differential signal made up of a first partial signal transmitted from the transmission device via a first line, and a second partial signal transmitted from the transmission device via a second signal line is received, and is decoded to the original data, and one of the first partial signal, and a first reception signal that is a signal relating to control, transmitted from the transmission device via the first signal line is selected. Here, in the case of receiving the first reception signal, the first reception signal is controlled so as to be selected and received, and in the case of receiving the second differential signal, the first partial signal is controlled so as to be selected and received. Also, data different from the pixel data, which is data to be transmitted, is converted into a third differential signal made up of a third partial signal and a fourth partial signal, and is transmitted to the transmission device.

A communication cable according to a fourth aspect of the present invention is a communication cable configured to connect a transmission device configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal, including first conversion means configured to convert data different from the pixel data, which is data to be transmitted, into a second differential signal made up of a first partial signal and a second partial signal, transmit the first partial signal to the reception device via a first signal line, and also output the second partial signal, first selecting means configured to select one of a transmission signal that is a signal relating to control, and the second partial signal output from the first conversion means, and transmit the selected signal to the reception device via a second signal line, and first control means configured to control, in the case of transmitting the transmission signal to the reception device, the first selecting means so as to select the transmission signal, and in the case of transmitting the second differential signal to the reception device, to control the first selecting means so as to select the second partial signal, and a reception device configured to receive the first differential signal transmitted from the transmission device, including second conversion means configured to convert data different from the pixel data, which is data to be transmitted, into the third differential signal, and transmit this to the transmission device, second decoding means configured to receive the second differential signal transmitted from the transmission device, and decode this to the original data, second selecting means configured to select one of the second partial signal and the transmission signal, and second control means configured to control, in the case of receiving the transmission signal, the second selecting means so as to select and receive the transmission signal, and in the case of receiving the second differential signal, to control the second selecting means so as to select the second partial signal, and the second decoding means so as to receive the second partial signal, the communication cable including: the first signal line; and the second signal line; and wherein the first signal line and the second signal line are connected as a differential twist pair.

With the fourth aspect of the present invention, a first signal line and a second signal line are provided to a communication cable for connecting a transmission device and a reception device, and the first signal line and the second signal line are connected as a differential twist pair.

A fifth aspect of the present invention is a communication system including an interface arranged to execute data transmission of video and audio, exchange and authentication of connected device information, communication of device control data, and LAN communication using a single cable, including: a pair of differential transmission paths capable of connecting connection-compatible devices; and a function arranged to notify the connection state of the interface which has executed LAN communication using two-way communication via the one pair of differential transmission paths, using the DC bias potential of at least one of this one pair of differential transmission paths.

A sixth aspect of the present invention is a communication system including an interface arranged to execute data transmission of video and audio, exchange and authentication of connected device information, communication of device control data, and LAN communication using a single cable, including: two pairs of differential transmission paths capable of connecting connection-compatible devices; and a function arranged to notify the connection state of the interface which has executed LAN communication using one-way communication via the two pairs of differential transmission paths, using the DC bias potential of at least one transmission path of the transmission paths; with at least two transmission paths being used for communication of exchange and authentication of connected device information in a manner time-sharing with LAN communication.

Advantageous Effects

According to the present invention, two-way communication can be executed. Specifically, for example, with a communication interface capable of transmitting the pixel data of an uncompressed image, and audio data accompanying the image thereof in one direction at high speed, high-speed two-way communication can be executed while maintaining compatibility.

Also, according to the present invention, a circuit for LAN communication can be formed regardless of electric standards stipulated regarding DDC, and stable and sure LAN communication can be realized inexpensively.

BRIEF DESCRIPTION OF DRAWINGS

FIG. 4 is a diagram illustrating the pin-out of the connector of the type-A of HDMI®.

FIG. 5 is a diagram illustrating the pin-out of the connector of the type-C of HDMI®.

FIG. 9 is a diagram illustrating the data structure of Vender Specific.

FIG. 22 is a diagram illustrating a system including multiple devices to be connected by using HDMI and Ethernet (Registered Trademark) together.

FIG. 23 is a diagram illustrating HDMI VSDB.

FIG. 24 is a diagram illustrating CEC and DDC connections.

FIG. 27 is a diagram illustrating logical addresses.

EXPLANATION OF REFERENCE NUMERALS

Figure 1:
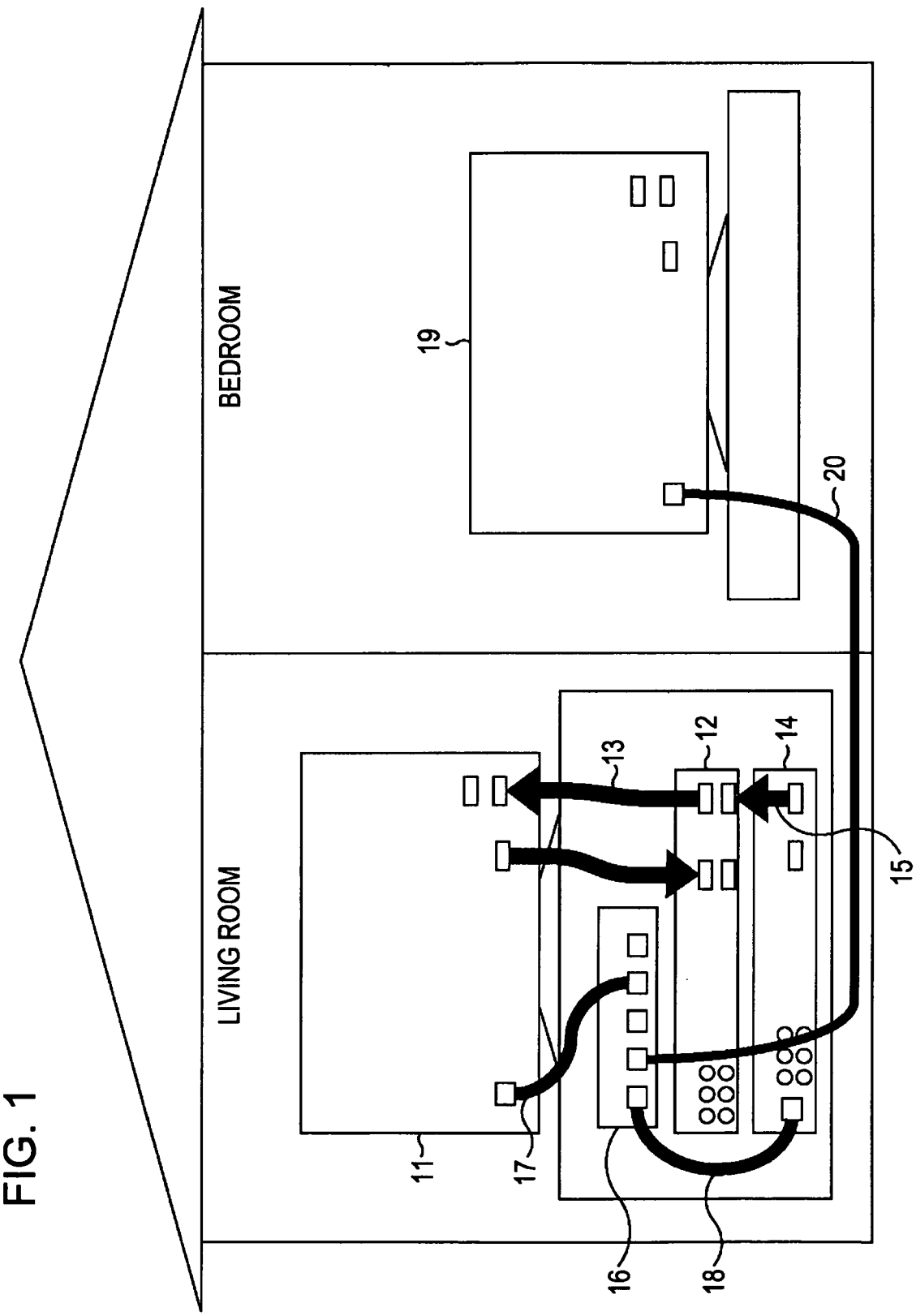
FIG. 1 is a diagram illustrating the configuration of a common image transmission system.

35 HDMI® cable, 71 HDMI® source, 72 HDMI® sink, 81 transmitter, 82 receiver, 83 DDC, 84 CEC line, 85 EDIDROM, 121 switching control unit, 124 switching control unit, 131 switch, 132 decoding unit, 133 switch, 134 conversion unit, 135 switch, 136 decoding unit, 141 signal line, 171 switching control unit, 172 switching control unit, 181 switch, 182 switch, 183 decoding unit, 184 conversion unit, 185 switch, 186 switch, 191 SDA line, 192 SCL line, 400 communication system, 401 LAN function expansion HDMI (EH) source device, 411 LAN signal transmission circuit, 12 terminating resistor, 413 and 414 AC connection capacitances, 415 LAN signal reception circuit, 416 subtracting circuit, 421 pull-up resistor, 422 resistor, 423 capacitance, 424 comparator, 431 pull-down resistor, 432 resistor, 433 capacitance, 434 comparator, 402 EH sink device, 441 LAN signal transmission circuit, 442 terminating resistor, 443 and 444 AC connection capacitances, 445 LAN signal reception circuit, 446 subtracting circuit, 451 pull-down resistor, 452 resistor, 453 capacitance, 454 comparator, 461 choke coil, 462 and 463 resistors, 403 EH cable, 501 reserved line, 502 HPD line, 511, 512 source side terminal, 521 and 522 sink side terminals, 600 communication system, 601 LAN function expansion HDMI(EH) source device, 611 LAN signal transmission circuit, 612 and 613 terminating resistors, 614 through 617 AC connection capacitances, 618 LAN signal reception circuit, 620 inverter, 621 resistor, 622 resistor, 623 capacitance, 624 comparator, 631 pull-down resistor, 632 resistor, 633 capacitance, 634 comparator, 640 NOR gate, 641 through 644 analog switches, 645 inverter, 646 and 647 analog switches, 651 and 652 DDC transceivers, 653 and 654 pull-down resistors, 602 EH sink device, 661 LAN signal transmission circuit, 662 and 663 terminating resistors, 664 through 667 AC connection capacitances, 668 LAN signal reception circuit, 671 pull-down resistor, 672 resistor, 673 capacitance, 674 comparator, 681 choke coil, 682, 683 resistor, 691 through 694 analog switches, 695 inverter, 696 and 697 analog switches, 701 and 702 DDC transceivers, 703 and 704 pull-up resistors, 603 EH cable, 801 reserved line, 802 HPD line, 803 SCL line, 804 SDA line, 811 through 814 source side terminals, 821 through 824 sink side terminals, 901 device, 911 HDMI terminal, 912 Ethernet (Registered Trademark) terminal, 913 Ethernet (Registered Trademark) terminal, 914 HDMI terminal, 915 Ethernet (Registered Trademark) terminal, 1001 device, 1102 HDMI terminal, 1103 Ethernet (Registered Trademark) terminal, 1104 HDMI terminal, 1105 Ethernet (Registered Trademark) terminal, 1106 Ethernet (Registered Trademark) terminal, 1131 conversion adaptor, 1161 network controller, 1162 network controller, 1164 switch, 1165 HDMI connector, 1166 LAN connector, 1191 LAN connector, 1192 HDMI connector, 1211 LAN connector, 1212 HDMI connector, 1213 network controller, 1216 network controller

BEST MODES FOR CARRYING OUT THE INVENTION

[First Embodiment] Embodiments to which the present invention has been applied will be described below with reference to the drawings.

Figure 2:
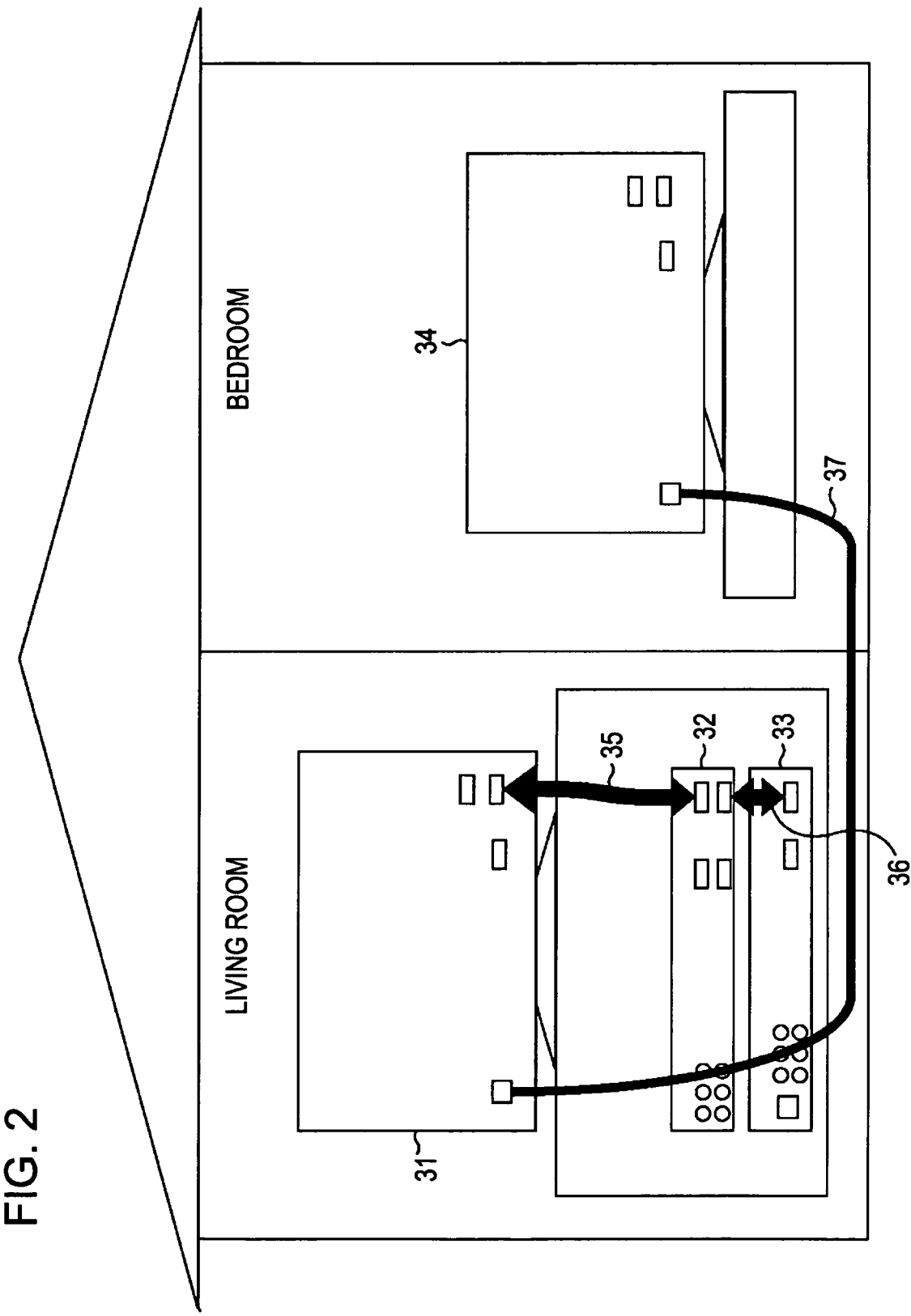
FIG. 2 is a diagram illustrating the configuration of the image transmission system according to an embodiment to which the present invent has been applied.

FIG. 2 is a diagram illustrating the configuration of an image transmission system according to an embodiment to which the present invent has been applied.

The image transmission system is configured of a digital television receiver 31, an amplifier 32, a playback device 33, and a digital television receiver 34, and between the digital television receiver 31 and the amplifier 32, and between the amplifier 32 and the playback device 33 are connected with an HDMI® cable 35 and an HDMI® cable 36 which are communication cables conforming to HDMI®. Also, between the digital television receiver 31 and the digital television receiver 34 is connected with a LAN cable 37 for LAN such as Ethernet (Registered Trademark) or the like.

With the example in FIG. 2, the digital television receiver 31, amplifier 32, and playback device 33 are installed in a living room situated to the left side in the drawing of a user's home, and the digital television receiver 34 is installed in a bedroom situated to the right side of the living room.

The playback device 33, which is made up of, for example, a DVD player, hard disk recorder, or the like, decodes pixel data and audio data for playing a content, and supplies uncompressed pixel data and audio data obtained as a result thereof to the amplifier 32 via the HDMI® cable 36.

The amplifier 32, which is made up of, for example, an AV amplifier or the like, receives supply of pixel data and audio data from the playback device 33, and amplifies the supplied audio data as appropriate. Also, the amplifier 32 supplies the audio data and pixel data supplied from the playback device 33 and amplified as appropriate to the digital television receiver 31 via the HDMI® cable 35. The digital television receiver 31 plays a content by displaying an image, and outputting audio based on the pixel data and audio data supplied from the amplifier 32.

Also, the digital television receiver 31 and the amplifier 32 can execute two-way communication such as IP communication or the like for example, at high speed using the HDMI® cable 35, and the amplifier 32 and the playback device 33 can also execute two-way communication such as IP communication or the like for example, at high speed using the HDMI® cable 36.

That is to say, for example, the playback device 33 executes IP communication with the amplifier 32, whereby compressed pixel data and audio data can be transmitted to the amplifier 32 via the HDMI® cable 36 as data conforming to IP, and the amplifier 32 can receive the compressed pixel data and audio data transmitted from the playback device 33.

Also, the amplifier 32 executes IP communication with the digital television receiver 31, whereby compressed pixel data and audio data can be transmitted to the digital television receiver 31 via the HDMI® cable 35 as data conforming to IP, and the digital television receiver 31 can receive the compressed pixel data and audio data transmitted from the amplifier 32.

Accordingly, the digital television receiver 31 can transmit the received pixel data and audio data to the digital television receiver 34 via the LAN cable 37. Also, the digital television receiver 31 decodes the received pixel data and audio data, and based on uncompressed pixel data and audio data obtained according to decoding, plays a content by displaying an image and outputting audio.

The digital television receiver 34 receives and decodes the pixel data and audio data transmitted from the digital television receiver 31 via the LAN cable 34, and based on uncompressed pixel data and audio data obtained according to decoding, plays a content by displaying an image and outputting audio. Thus, with the digital television receiver 31 and the digital television receiver 34, the same or different content can be played simultaneously.

Further, in the case that the digital television receiver 31 has received pixel data and audio data for playing a program which is content on air on television, when the received audio data is, for example, 5.1-channel surround audio data or the like, and the digital television receiver 31 has difficulty in decoding the received audio data, the digital television receiver 31 executes IP communication with the amplifier 32, thereby transmitting the received audio data to the amplifier 32 via the HDMI® cable 35.

The amplifier 32 receives and decodes the audio data transmitted from the digital television receiver 31, and also amplifies the decoded audio data as appropriate. Subsequently, 5.1-channel surround audio is played with a speaker (not shown) connected to the amplifier 32.

The digital television receiver 31 transmits audio data to the amplifier 32 via the HDMI® cable 35, and also decodes the received pixel data, and based on the pixel data obtained by decoding, plays a program by displaying an image.

Thus, with the image transmission system in FIG. 2, electronic devices connected by the HDMI® cable 35 and HDMI® cable 36, such as the digital television receiver 31, amplifier 32, playback device 33, and the like can execute IP communication at high speed using the HDMI® cable, and accordingly, the LAN cable corresponding to the LAN cable 17 in FIG. 1 does not have to be provided.

Also, the digital television receiver 31 and the digital television receiver 34 are connected with the LAN cable 37, whereby the digital television receiver 31 can transmit the data received from the playback device 33 via the HDMI® cable 36, amplifier 32, and HDMI® cable 35 via the LAN cable 37, further to the digital television receiver 34, and accordingly, the LAN cable and electronic device corresponding to the LAN cable 18 and hub 16 in FIG. 1 do not have to be provided.

Such as shown in FIG. 1, with an existing image transmission system, according to data to be transmitted/received and a communication method, the corresponding different cable has to be provided, and laying cables for connecting electronic devices is complicated. On the other hand, with the image transmission system shown in FIG. 2, two-way communication, such as IP communication or the like, can be executed at high speed between electronic devices connected with an HDMI® cable, and accordingly, connection of the electronic devices can be simplified. That is to say, laying cables for connecting electronic devices, which is conventionally complicated, can be further simplified.

Figure 3:
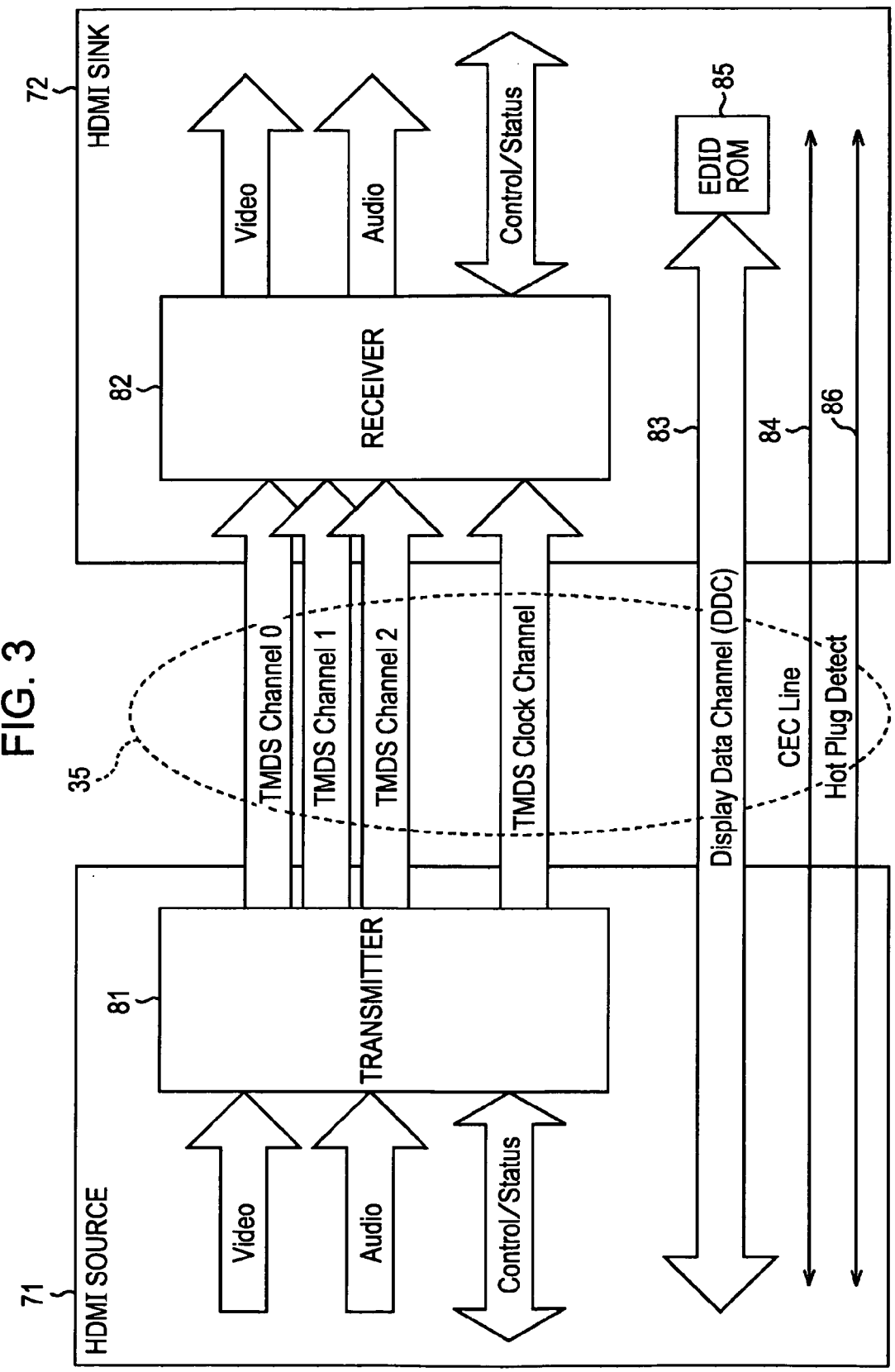
FIG. 3 is a diagram illustrating a configuration example of an HDMI® source and an HDMI® sink.

Next, FIG. 3 illustrates a configuration example of an HDMI® source and an HDMI® sink built into each of the electronic devices connected with an HDMI® cable, e.g., the HDMI® sources provided within the amplifier 32 in FIG. 2, and the HDMI® sink provided within the digital television receiver 31.

The HDMI® source 71 and the HDMI® sink 72 are connected with a single HDMI® cable 35, and the HDMI® source 71 and the HDMI® sink 72 can execute two-way IP communication at high speed using the HDMI® cable 35 while maintaining the compatibility with the current HDMI®.

The HDMI® source 71 transmits the differential signals corresponding to the pixel data of one screen worth of an uncompressed image to the HDMI® sink 72 in one direction using multiple channels during a valid image section (hereinafter also referred to as active video section as appropriate) that is a section obtained by removing a horizontal retrace section and a vertical retrace section from a section between one vertical synchronizing signal and the next vertical synchronizing signal, and also transmits at least the differential signals corresponding to audio data and control data accompanying the image, other auxiliary data, and the like to the HDMI® sink 72 in one direction using multiple channels during a horizontal retrace section or vertical retrace section.

That is to say, the HDMI® source 71 includes a transmitter 81. For example, the transmitter 81 converts the pixel data of an uncompressed image into the corresponding differential signals, and serially transmits these to the HDMI® sink 72 connected thereto via the HDMI® cable 35 using three TMDS channels #0, #1, and #2 which are multiple channels in one direction.

Also, the transmitter 81 converts the audio data accompanying an uncompressed image, and further necessary control data, other auxiliary data, and the like into the corresponding differential signals, and serially transmits these to the HDMI® sink 72 connected thereto via the HDMI® cable 35 using the three TMDS channels #0, #1, and #2 in one direction.

Further, the transmitter 81 transmits a pixel clock in sync with the pixel data transmitted through the three TMDS channels #0, #1, and #2 to the HDMI® sink 72 connected thereto via the HDMI® cable 35 using the TMDS clock channel. Here, 10-bit pixel data is transmitted with a single TMDS channel #i (i=0, 1, 2) during one clock of the pixel clock.

The HDMI® sink 72 receives the differential signals corresponding to the pixel data, transmitted from the HDMI® source 71 in one direction using the multiple channels during an active video section, and also receives the differential signals corresponding to audio data and control data, transmitted in one direction from the HDMI® source 71 using the multiple channels during a horizontal retrace section or vertical retrace section.

That is to say, the HDMI® sink 72 includes a receiver 82. The receiver 82 receives the differential signals corresponding to the pixel data, and the differential signals corresponding to the audio data and control data, transmitted from the HDMI® source 71 connected thereto via the HDMI® cable 35 in one direction using the TMDS channels #0, #1, and #2 in sync with the pixel clock transmitted through the TMDS clock channel similarly from the HDMI® source 71.

The transmission channels of the HDMI® system made up of the HDMI® source 71 and the HDMI® sink 72 include transmission channels called as a DDC (Display Data Channel) 83 and a CEC line 84 in addition to the three TMDS channels #0 through #2 serving as transmission channels for transmitting pixel data and audio data from the HDMI® source 71 to the HDMI® sink 72 in one direction in sync with the pixel clock, and the TMDS clock channel serving as a transmission channel for transmitting the pixel clock.

The DDC 83 is made up of two signal lines not shown included in the HDMI® cable 35, and is used for the HDMI® source 71 reading out E-EDID (Enhanced Extended Display Identification Data) from the HDMI® sink 72 connected thereto via the HDMI® cable 35.

That is to say, the HDMI® sink 72 includes EDIDROM (EDID ROM (Read Only Memory)) 85 which stores E-EDID that is information relating to the settings and performance of the self device in addition to the receiver 82. The HDMI® source 71 reads out the E-EDID stored in the EDIDROM 85 of the HDMI® sink 72 via the DDC 83 from the HDMI® sink 72 connected thereto via the HDMI® cable 35, and based on the E-EDID thereof, recognizes the settings and performance of the HDMI® sink 72, i.e., for example, the image format (profile) corresponding to (an electronic device including) the HDMI® sink 72, e.g., RGB (Red, Green, Blue), YCbCr4:4:4, YCbCr4:2:2, or the like.

Note that, though not shown in the drawing, the HDMI® source 71 stores E-EDID, in the same way as the HDMI® sink 72, and can transmit the E-EDID thereof to the HDMI® sink 72 as appropriate.

The CEC line 84 is made up of a single signal line not shown included in the HDMI® cable 35, and is used for executing two-way communication of data for control between the HDMI® source 71 and the HDMI® sink 72.

Also, the HDMI® source 71 and the HDMI® sink 72 transmit a frame conforming to, for example, IEEE (Institute of Electrical and Electronics Engineers) 802.3 to the HDMI® sink 72 and the HDMI® source 71 via the DDC 83 or CEC line 84, whereby two-way IP communication can be executed.

Further, a signal line 86 connected to a pin called Hot Plug Detect is included in the HDMI® cable 35, and the HDMI® source 71 and the HDMI® sink 72 can detect connection of a new electronic device, i.e., the HDMI® sink 72 or HDMI® source 71 using this signal line 86.

Next, FIG. 4 and FIG. 5 illustrate the pin-out (pin assignment) of a connection not shown provided to the HDMI® source 71 or HDMI® sink 72, connected to the HDMI® cable 35.

Note that, in FIG. 4 and FIG. 5, a pin number for determining a pin of the connector is described in the left column (the column of pins), and the name of the signal assigned to the pin determined with a pin number described in the left column of the same row is described in the right column (the column of signal assignment).

FIG. 4 illustrates the pin-out of a connector called the Type-A of HDMI®.

Two signal lines which are differential signal lines where the differential signals TMDS Data#i+ and TMDS Data#i− of the TMDS channel #i are transmitted are connected to a pin to which the TMDS Data#i+ is assigned (the pins of which the pin numbers are 1, 4, and 7), and a pin to which the TMDS Data#i− is assigned (the pins of which the pin numbers are 3, 6, and 9).

Also, the CEC line 84 where the CEC signal which is data for control is transmitted is connected to a pin of which the pin number is 13, and a pin of which the pin number is 14 is a reserved pin. If two-way IP communication can be executed using this reserved pin, the compatibility with the current HDMI® can be maintained. Therefore, in order to transmit a differential signal using the CEC line 84 and a signal line connected to the pin of which the pin number is 14 are subjected to differential twist pair connection and shielded, and are grounded with the ground lines of the CEC line 84 and DDC 83 connected to the pin of which the pin number is 17.

Further, a signal line where a SDA (Serial Data) signal such as E-EDID or the like is transmitted is connected to a pin of which the pin number is 16, and a signal line where a SCL (Serial Clock) signal which is a clock signal used for synchronization at the time of transmitting/receiving the SDA signal is transmitted is connected to a pin of which the pin number is 15. The DDC 83 in FIG. 3 is made up of a signal line where the SDA signal is transmitted, and a signal line where the SCL signal is transmitted.

Also, the signal line where the SDA signal is transmitted, and the signal line where the SCL signal is transmitted are connected as a differential twist pair and shielded so as to transmit a differential signal line, and is grounded with a ground line connected to a pin of which the pin number is 17, in the same way as the CEC line 84 and the signal line connected to the pin of which the pin number is 14.

Further, the signal line 86 where a signal for detecting connection of a new electronic device is transmitted is connected to a pin of which the pin number is 19.

FIG. 5 illustrates the pin-out of a connector called the Type-C or Type-mini of HDMI®.

Two signal lines which are differential signal lines where the differential signals TMDS Data#i+ and TMS Data#i− of the TMDS channel #i are transmitted are connected a pin to which the TMDS Data#i+ is assigned (pins of which the pin numbers are 2, 5, and 8), and a pin to which the TMDS Data#i− is assigned (pins of which the pin numbers are 3, 6, and 9).

Also, the CEC line 84 where the CEC signal is transmitted is connected to a pin of which the pin number is 14, and a pin of which the pin number is 17 is a reserved pin. A signal line connected to the pin of which the pin number is 17, and the CEC line 84 are connected as a differential twist pair and shielded in the same way as with the case of Type-A, and are grounded with the ground lines of the CEC line 84 and the DDC 83 connected to a pin of which the pin number is 13.

Further, the signal line where the SDA signal is transmitted is connected to the pin of which the pin number is 16, and the signal line where the SCL signal is transmitted is connected to the pin of which the pin number is 15. Also, the signal line where the SDA signal is transmitted, and the signal line where the SCL signal is transmitted are connected as a differential twist pair and shielded so as to transmit a differential signal, and is grounded with a ground line connected to a pin of which the pin number is 13, in the same way as with the case of Type-A. Further, also, the signal line 86 where a signal for detecting connection of a new electronic device is transmitted is connected to a pin of which the pin number is 19.

Figure 6:
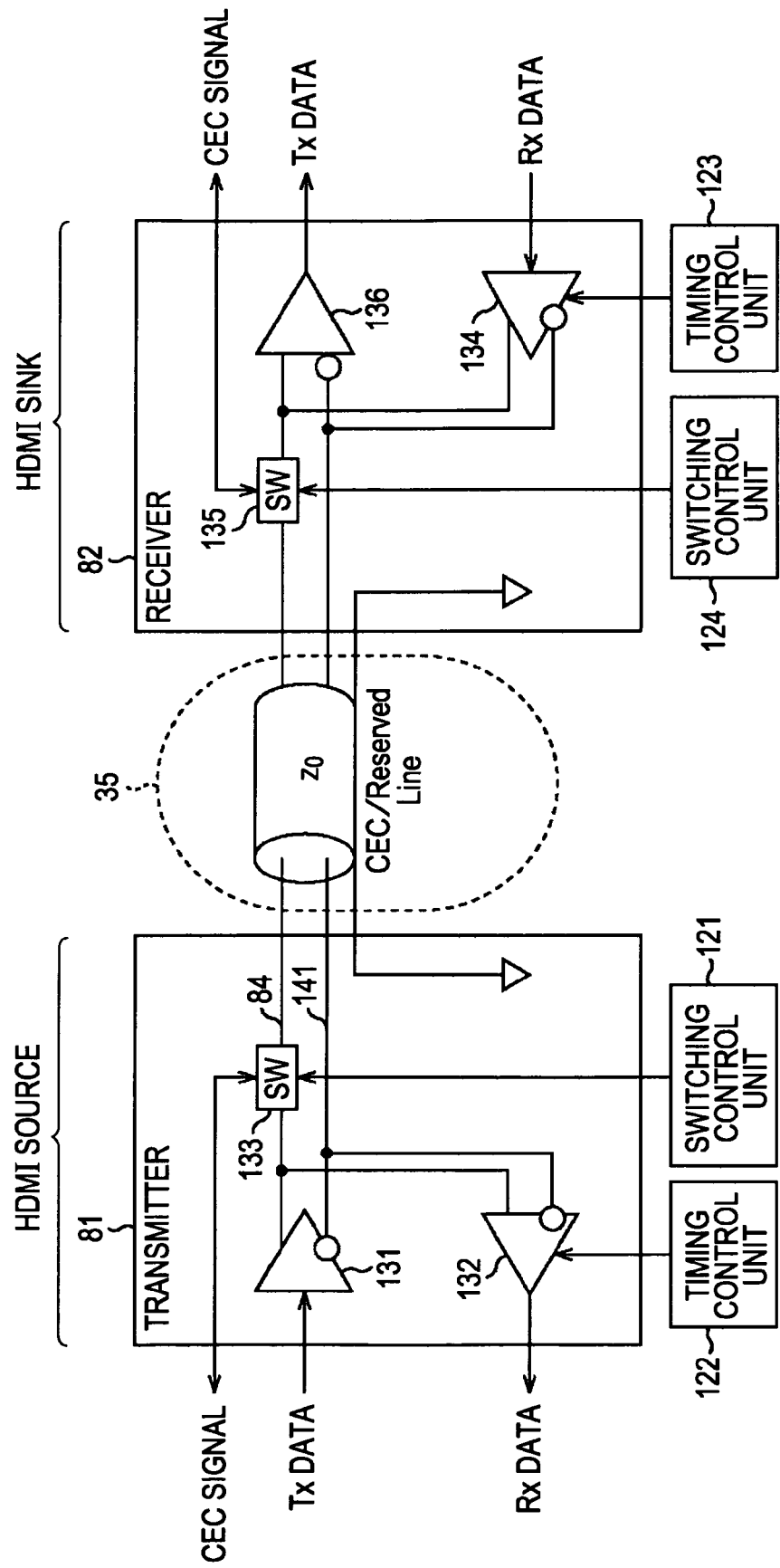
FIG. 6 is a diagram illustrating a more detailed configuration example of the HDMI® source and the HDMI® sink.

Next, FIG. 6 is a diagram illustrating the configuration of the HDMI® source 71 and the HDMI® sink 72 which execute IP communication by the half-duplex communication method using a signal line connected to a reserved pin of the CEC line 84 and the connector of HDMI® connector. Note that FIG. 6 illustrates a configuration example of portions relating to half-duplex communication of the HDMI® source 71 and HDMI® sink 72. Also, in FIG. 6, the portions corresponding to those in the case in FIG. 3 are denoted with the same reference numerals, and description thereof will be omitted as appropriate.

The HDMI® source 71 is configured of a transmitter 81, a switching control unit 121, and a timing control unit 122. Also, a conversion unit 131, a decoding unit 132, and a switch 133 are provided to the transmitter 81.

Tx data that is data to be transmitted from the HDMI® source 71 to the HDMI® sink 72 using two-way IP communication between the HDMI® source 71 and the HDMI® sink 72 is supplied to the conversion unit 131. Examples of the Tx data include compressed pixel data and audio data.

The conversion unit 131, which is configured of a differential amplifier for example, converts the supplied Tx data into a differential signal made up of two partial signals. Also, the conversion unit 131 transmits the differential signal obtained by conversion to the receiver 82 via the CEC line 84, and a signal line 141 connected to a reserved pin of the connector not shown provided to the transmitter 81. That is to say, the conversion unit 131 supplies one of the partial signals making up the differential signal obtained by conversion to the switch 133 via a signal line connected to the CEC line 84 of the HDMI® cable 35, which is a signal line provided to the CEC line 84, more specifically to the transmitter 81, and supplies the other partial signal making up the differential signal to the receiver 82 via a signal line connected to the signal line 141 of the HDMI® cable 35, which is the signal line 141, more specifically, the signal line provided to the transmitter 81, and the signal line 141.

The decoding unit 132 is configured of, for example, a differential amplifier, and the input terminal thereof is connected to the CEC line 84 and the signal line 141. The decoding unit 132 receives, based on the control of the timing control unit 122, the differential signal transmitted from the receiver 82 via the CEC line 84 and the signal line 141, i.e., the differential signal made up of the partial signal on the CEC line 84, and the differential signal made up of the partial signal on the signal line 141, decodes this to Rx data that is the original data, and outputs this. The Rx data mentioned here is data to be transmitted from the HDMI® sink 72 to the HDMI® source 71 by two-way IP communication between the HDMI® source 71 and the HDMI® sink 72, and examples thereof include a command for requesting transmission of pixel data and audio data, or the like.

The CEC signal from the HDMI® source 71, or the partial signal making up the differential signal corresponding to the Tx data from the conversion unit 131 is supplied to the switch 133 at timing for transmitting data, and the CEC signal from the receiver 82, or the partial signal making up the differential signal corresponding to the Rx data from the receiver 82 is supplied to the switch 133 at timing for receiving data. The switch 133 selects and outputs, based on the control from the switching control unit 121, the CEC signal from the HDMI® source 71, or the CEC signal from the receiver 82, or the partial signal making up the differential signal corresponding to the Tx data, or the partial signal making up the differential signal corresponding to the Rx data.

That is to say, the switch 133 selects one of the CEC signal supplied from the HDMI® source 71, and the partial signal supplied from the conversion unit 131 at timing for the HDMI® source 71 transmitting data to the HDMI® sink 72, and transmits the selected CEC signal or partial signal to the receiver 82 via the CEC line 84.

Also, the switch 133 receives the CEC signal transmitted from the receiver 82 via the CEC line 84, or the partial signal of the differential signal corresponding to the Rx data at timing for the HDMI® source 71 receiving the data transmitted from the HDMI® sink 72, and supplies the received CEC signal or partial signal to the HDMI® source 71 or decoding unit 132.

The switching control unit 121 controls the switch 133 to switch the switch 133 so as to select one of the signals supplied to the switch 133. The timing control unit 122 controls the reception timing of the differential signal by the decoding unit 132.

Also, the HDMI® sink 72 is configured of the receiver 82, timing control unit 123, and switching control unit 124. Further, a conversion unit 134, a switch 135, and a decoding unit 136 are provided to the receiver 82.

The conversion unit 134 is configured of, for example, a differential amplifier, and the Rx data is supplied to the conversion unit 134. The conversion unit 134 converts, based on the control of the timing control unit 123, the supplied Rx data into a differential signal made up of two partial signals, and transmits the differential signal obtained by conversion to the transmitter 81 via the CEC line 84 and the signal line 141. That is to say, the conversion unit 134 supplies one of the partial signals making up the differential signal obtained by conversion to the switch 135 via a signal line connected to the CEC line 84 of the HDMI® cable 35, which is a signal line provided to the CEC line 84, more specifically to the receiver 82, and supplies the other partial signal making up the differential signal to the transmitter 81 via a signal line connected to the signal line 141 of the HDMI® cable 35, which is the signal line 141, more specifically, the signal line provided to the receiver 82, and the signal line 141.

The CEC signal from the transmitter 81, or the partial signal making up the differential signal corresponding to the Tx data from the transmitter 81 is supplied to the switch 135 at timing for receiving data, and the partial signal making up the differential signal corresponding to the Rx data from the conversion unit 134, or the CEC signal from the HDMI® sink 72 is supplied to the switch 135 at timing for transmitting data. The switch 135 selects and outputs, based on the control from the switching control unit 124, the CEC signal from the transmitter 81, or the CEC signal from the HDMI® sink 72, or the partial signal making up the differential signal corresponding to the Tx data, or the partial signal making up the differential signal corresponding to the Rx data.

That is to say, the switch 135 selects one of the CEC signal supplied from the HDMI® sink 72, and the partial signal supplied from the conversion unit 134 at timing for the HDMI® sink 72 transmitting data to the HDMI® source 71, and transmits the selected CEC signal or partial signal to the transmitter 81 via the CEC line 84.

Also, the switch 135 receives the CEC signal transmitted from the transmitter 81 via the CEC line 84, or the partial signal of the differential signal corresponding to the Tx data at timing for the HDMI® sink 72 receiving the data transmitted from the HDMI® source 71, and supplies the received CEC signal or partial signal to the HDMI® sink 72 or decoding unit 136.

The decoding unit 136 is configured of, for example, a differential amplifier, and the input terminal thereof is connected to the CEC line 84 and the signal line 141. The decoding unit 136 receives the differential signal transmitted from the transmitter 81 via the CEC line 84 and the signal line 141, i.e., the differential signal made up of the partial signal on the CEC line 84, and the partial signal on the signal line 141, decodes this to Tx data that is the original data, and outputs this.

The switching control unit 124 controls the switch 135 to switch the switch 135 so as to select one of the signals supplied to the switch 135. The timing control unit 123 controls the transmission timing of the differential signal by the conversion unit 134.

Figure 7:
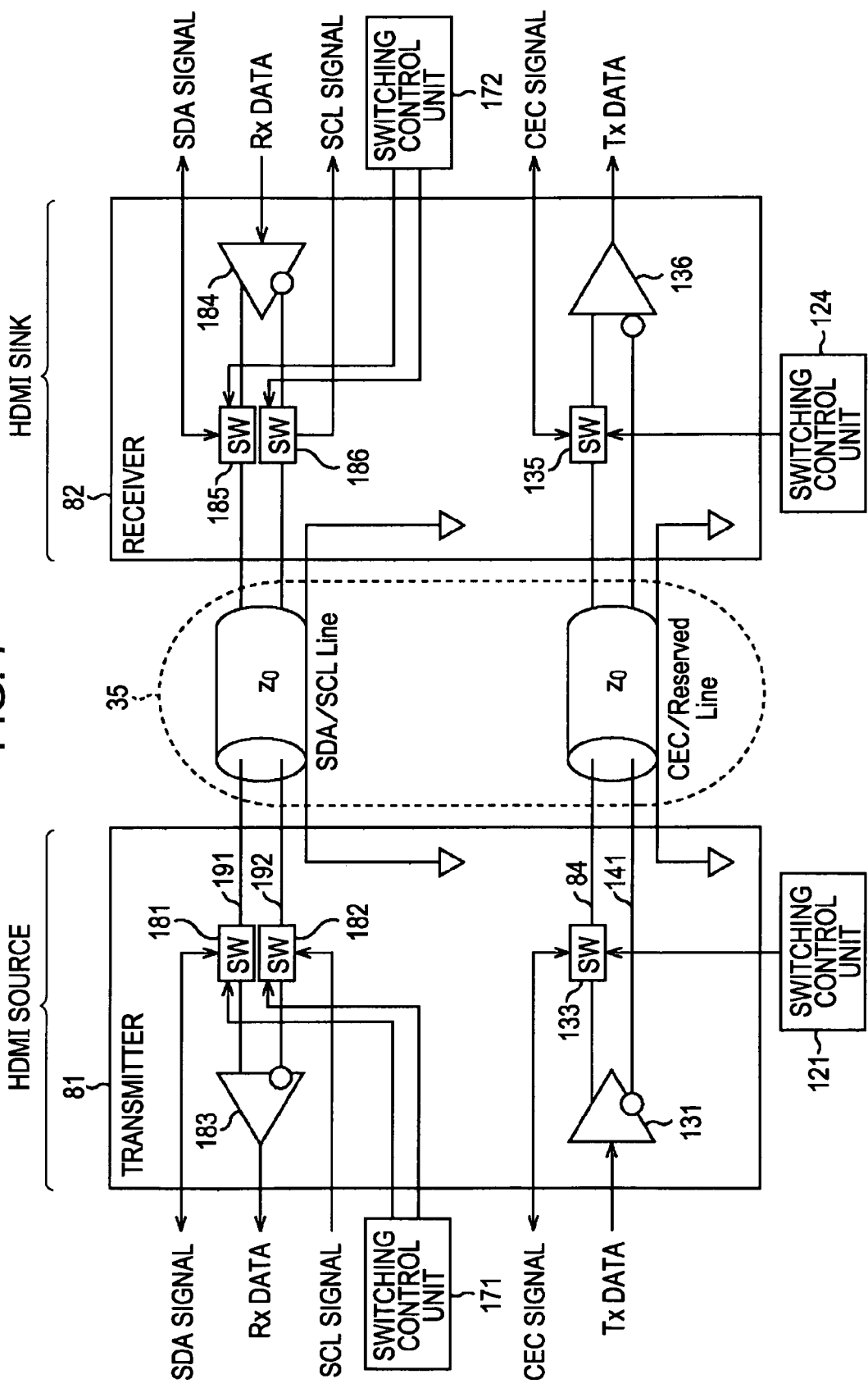
FIG. 7 is a diagram illustrating another more detailed configuration example of the HDMI® source and the HDMI® sink.

Also, in the case that the HDMI® source 71 and the HDMI® sink 72 execute IP communication by the full-duplex communication method using the signal line 141 connected to the CEC line 84 and the reserved pin, and a signal line where the SDA signal is transmitted, and a signal line where the SCL signal is transmitted, the HDMI® source 71 and the HDMI® sink 72 are configured such as shown in FIG. 7, for example. Note that, in FIG. 7, the portions corresponding to those in the case in FIG. 6 are denoted with the same reference numerals, and description thereof will be omitted as appropriate.

The HDMI® source 71 is configured of a transmitter 81, a switching control unit 121, and a switching control unit 171. Also, a conversion unit 131, a switch 133, a switch 181, a switch 182, and a decoding unit 183 are provided to the transmitter 81.

The SDA signal from the HDMI® source 71 is supplied to the switch 181 at timing for transmitting data, and the SDA signal from the receiver 82, or the partial signal making up the differential signal corresponding to the Rx data from the receiver 82 is supplied to the switch 181 at timing for receiving data. The switch 181 selects and outputs, based on the control from the switching control unit 171, the SDA signal from the HDMI® source 71, or the SDA signal from the receiver 82, or the partial signal making up the differential signal corresponding to the Rx data.

That is to say, the switch 181 receives the SDA signal transmitted from the receiver 82 via the SDA line 191 which is a signal line over which SDA signals are transmitted, or the partial signal of the differential signal corresponding to the Rx data at timing for the HDMI® source 71 receiving the data transmitted from the HDMI® sink 72, and supplies the received SDA signal or partial signal to the HDMI® source 71 or decoding unit 183.

Also, the switch 181 transmits the SDA signal supplied from the HDMI® source 71 to the receiver 82 via the SDA line 191 or transmits nothing to the receiver 82 at timing for the HDMI® source 71 transmitting data to the HDMI® sink 72.

The SCL signal from the HDMI® source 71 is supplied to the switch 182 at timing for transmitting data, and the partial signal making up the differential signal corresponding to the Rx data from the receiver 82 is supplied to the switch 182 at timing for receiving data. The switch 182 selects and outputs, based on the control from the switching control unit 171, one of the SCL signal, and the partial signal making up the differential signal corresponding to the Rx data.

That is to say, the switch 182 receives the partial signal of the differential signal corresponding to the Rx data, transmitted from the receiver 82 via the SCL line 192 that is a signal line where the SCL signal is transmitted, at timing for the HDMI® source 71 receiving the data transmitted from the HDMI® sink 72 to supply the received partial signal to the decoding unit 183, or receives nothing.

Also, the switch 182 transmits the SCL signal supplied from the HDMI® source 71 to the receiver 82 via the SCL line 192, or transmits nothing to the receiver 82 at timing for the HDMI® source 71 transmitting data to the HDMI® sink 72.

The decoding unit 183 is configured of, for example, a differential amplifier, and the input terminal thereof is connected to the SDA line 191 and the SCL line 192. The decoding unit 183 receives the differential signal transmitted from the receiver 82 via the SDA line 191 and the SCL line 192, i.e., the differential signal made up of the partial signal on the SDA line 191, and the partial signal on the SCL line 192, decodes this to Rx data that is the original data, and outputs this.

The switching control unit 171 controls the switch 181 and the switch 182 to switch the switch 181 and the switch 182 so as to select one of the signals supplied to the switch 181 and the switch 182.

Also, the HDMI® sink 72 is configured of the receiver 82, switching control unit 124, and switching control unit 172. Further, the switch 135, the decoding unit 136, a conversion unit 184, a switch 185, and a switch 186 are provided to the receiver 82.

The conversion unit 184 is configured of, for example, a differential amplifier, and the Rx data is supplied to the conversion unit 184. The conversion unit 184 converts the supplied Rx data into a differential signal made up of two partial signals, and transmits the differential signal obtained by conversion to the transmitter 81 via the SDA line 191 and the SCL line 192. That is to say, the conversion unit 184 transmits one of the partial signals making up the differential signal obtained by conversion to the transmitter 81 via the switch 185, and transmits the other partial signal making up the differential signal to the transmitter 81 via the switch 186.

The partial signal making up the differential signal corresponding to the Rx data from the conversion unit 184, and the SDA signal from the HDMI® sink 72 are supplied to the switch 185 at timing for transmitting data, and the SDA signal from the transmitter 81 is supplied to the switch 185 at timing for receiving data. The switch 185 selects and outputs, based on the control from the switching control unit 172, the SDA signal from the HDMI® sink 72, or the SDA signal from the transmitter 81, or the partial signal making up the differential signal corresponding to the Rx data.

That is to say, the switch 185 receives the SDA signal transmitted from the transmitter 81 via the SDA line 191 at timing for the HDMI® sink 72 receiving the data transmitted from the HDMI® source 71 to supply the received SDA signal to the HDMI® sink 72, or receives nothing.

Also, the switch 185 transmits the SDA signal supplied from the HDMI® sink 72, or the partial signal supplied from the conversion unit 184 to the transmitter 81 via the SDA line 191 at timing for the HDMI® sink 72 transmitting data to the HDMI® source 71.

The partial signal making up the differential signal corresponding to the Rx data from the conversion unit 184 is supplied to the switch 186 at timing for transmitting data, and the SCL signal from the transmitter 81 is supplied to the switch 186 at timing for receiving data. The switch 186 selects and outputs, based on the control from the switching control unit 172, one of the partial signal making up the differential signal corresponding to the Rx data, and the SCL signal.

That is to say, the switch 186 receives the SCL signal transmitted from the transmitter 81 via the SCL line 192 at timing for the HDMI® sink 72 receiving the data transmitted from the HDMI® source 71 to supply the received SCL signal to the HDMI® sink 72, or receives nothing.

Also, the switch 186 transmits the partial signal supplied from the conversion unit 184 to the transmitter 81 via the SCL line 192, or transmits nothing to the transmitter 81 at timing for the HDMI® sink 72 transmitting data to the HDMI® source 71.

The switching control unit 172 controls the switch 185 and the switch 186 to switch the switch 185 and the switch 186 so as to select one of the signals supplied to the switch 185 and the switch 186.

Incidentally, in the case that the HDMI® source 71 and the HDMI® sink 72 execute IP communication, it is determined depending on the configuration of each of the HDMI® source 71 and the HDMI® sink 72 whether half-duplex communication is available, or full-duplex communication is available. Therefore, the HDMI® source 71 determines whether to execute half-duplex communication, full-duplex communication, or two-way communication by exchanging the CEC signal with reference to the E-EDID received from the HDMI® sink 72.

Figure 8:
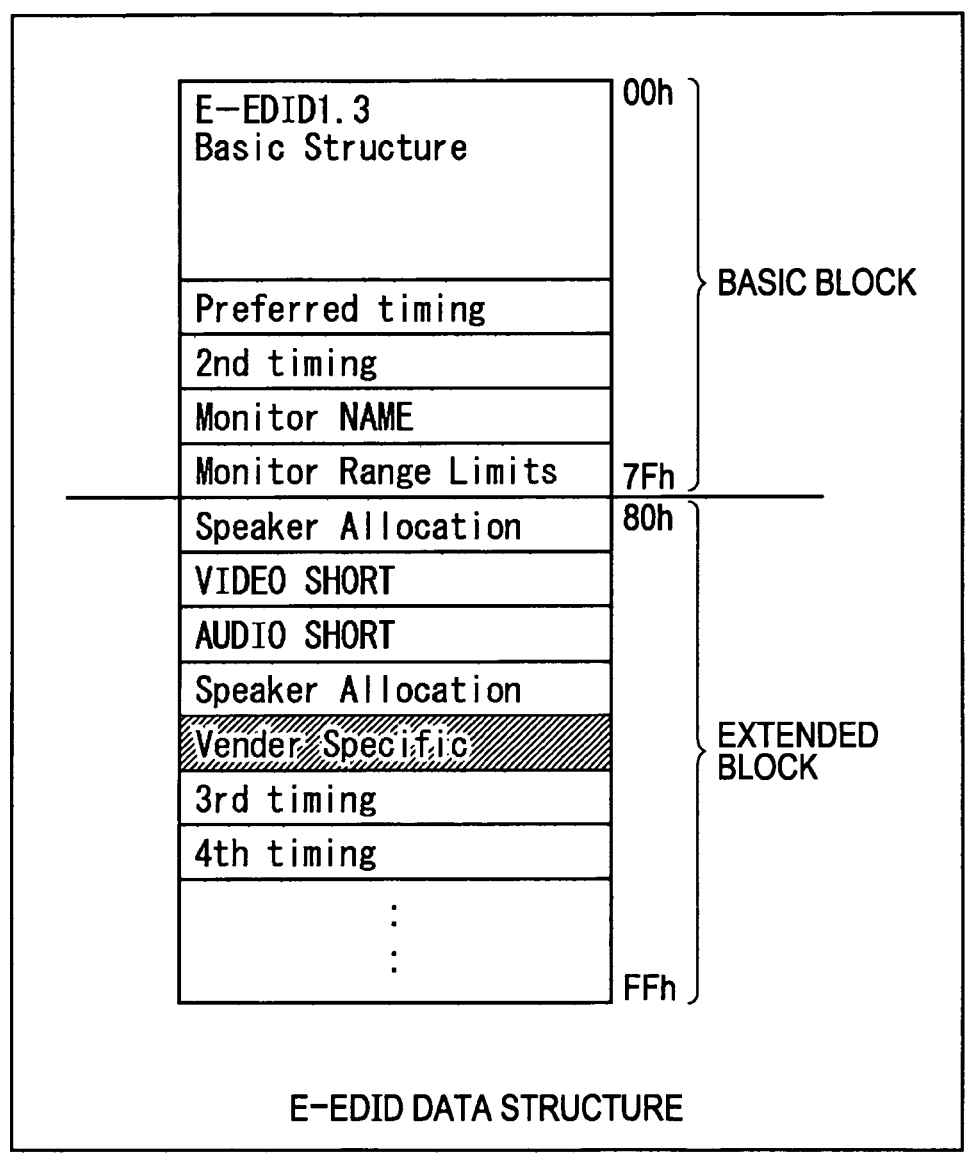
FIG. 8 is a diagram illustrating the data structure of E-EDID.

The E-EDID that the HDMI® source 71 receives is made up of, for example such as shown in FIG. 8, a basic block and an extended block.

Data determined with the E-EDID 1.3 standard represented by "E-EDID 1.3 Basic Structure" is disposed at the head of the basic block of the E-EDID, and subsequently, timing information for maintaining compatibility with the conventional EDID represented by "Preferred timing", and timing information represented by "2nd timing" different from "Preferred timing" for maintaining compatibility with the conventional EDID are disposed.

Also, with the basic block, information indicating the name of a display device represented by "Monitor NAME", and information indicating the number of displayable pixels regarding a case where the aspect ratio is 4:3 and 16:9 represented by "Monitor Range Limits" are disposed in order following the "2nd timing".

On the other hand, information relating to left and right speakers represented by "Speaker Allocation" is disposed at the head of the extended block, and subsequently, data represented by "VIDEO SHORT" in which the displayable image size, frame rate, and information indicating whether to be interlace or progressive, and information of the aspect ratio and the like are described, data represented by "AUDIO SHORT" in which information such as a playable audio codec method, a sampling frequency, a cut-off band, a codec bit count, and the like are described, and information relating to left and right speakers represented by "Speaker Allocation" are disposed in order.

Also, with the extended block, data defined uniquely for each maker represented by "Vender Specific", timing information for maintaining compatibility with the conventional EDID represented by "3rd timing", and timing information for maintaining compatibility with the conventional EDID represented by "4th timing" are disposed following "Speaker Allocation".

Further, the data represented by "Vender Specific" is made up of a data structure shown in FIG. 9. That is to say, the 0th block through the Nth block that are 1-byte blocks are provided to the data represented by "Vender Specific".

With the 0th block disposed at the head of the data represented by "Vender Specific", a header indicating the data region of the data "Vender Specific" represented by "Vender-Specific tag code (=3)", and information indicating the length of the data "Vender Specific" represented by "Length (=N)" are disposed.

Also, with the 1st block through the 3rd block, information indicating a number "0x000003" registered for HDMI® represented by "24 bit IEEE Registration Identifier (0x000C03) LSB first" is disposed. Further, with the 4th block and the 5th block, information indicating the physical address of a 24-bit sink device represented with each of "A", "B", "C", and "D" is disposed.

With the 6th block, a flag indicating a function that the sink device can handle represented by "Supports-AI", information for specifying the number of bits per one pixel represented with each of "DC-48 bit", "DC-36 bit", and "DC-30 bit", a flag indicating whether or not the sink device can handle transmission of image of YCbCr4:4:4 represented by "DC-Y444", and a flag indicating whether or not the sink device can handle a dual DVI (Digital Visual Interface) represented by "DVI-Dual" are disposed.

Also, with the 7th block, information indicating the maximum frequency of the TMDS pixel clock represented by "Max-TMDS-Clock" is disposed. Further, with the 8th block, a flag indicating whether or not there is the delay information of video and audio represented by "Latency", a full-duplex flag indicating whether or not full-duplex communication is available represented by "Full Duplex", and a half-duplex flag indicating whether or not half-duplex communication is available represented by "Half Duplex" are disposed.

Here, the full-duplex flag that has been set (e.g., set to "1") indicates that the HDMI® sink 72 has a function for executing full-duplex communication, i.e., has a configuration shown in FIG. 7, and the full-duplex flag that has been reset (e.g., set to "0") indicates that the HDMI® sink 72 has no function for executing full-duplex communication.

Similarly, the half-duplex flag that has been set (e.g., set to "1") indicates that the HDMI® sink 72 has a function for executing half-duplex communication, i.e., has a configuration shown in FIG. 6, and the half-duplex flag that has been reset (e.g., set to "0") indicates that the HDMI® sink 72 has no function for executing half-duplex communication.

Also, With the 9th block of data represented by "Vender Specific", the delay time data of progressive video represented by "Video Latency" is disposed, and with the 10th block, the delay time data of audio accompanying progressive video represented by "Audio Latency" is disposed. Further, with the 11th block, the delay time data of interlace video represented by "Interlaced Video Latency" is disposed, and with the 12th block, the delay time data of audio accompanying interlace video represented by "Interlaced Audio Latency" is disposed.

The HDMI® source 71 determines whether half-duplex communication is executed, full-duplex communication is executed, or two-way communication according to exchange of the CEC signal is executed, based on the full-duplex flag and the half-duplex flag included in the E-EDID received from the HDMI® sink 72, and executes two-way communication with the HDMI® sink 72 in accordance with the determination result thereof.

For example, in the case that the HDMI® source 71 is configured such as shown in FIG. 6, the HDMI® source 71 can execute half-duplex communication with the HDMI® sink 72 shown in FIG. 6, but has difficulty in executing half-duplex communication with the HDMI® sink 72, shown in FIG. 7.

Therefore, upon the power supply of the electronic device provided to the HDMI® source 71 being turned on, the HDMI® source 71 starts communication processing, and executes two-way communication according to the function included in the HDMI® sink 72 connected to the HDMI® source 71.

Figure 10:
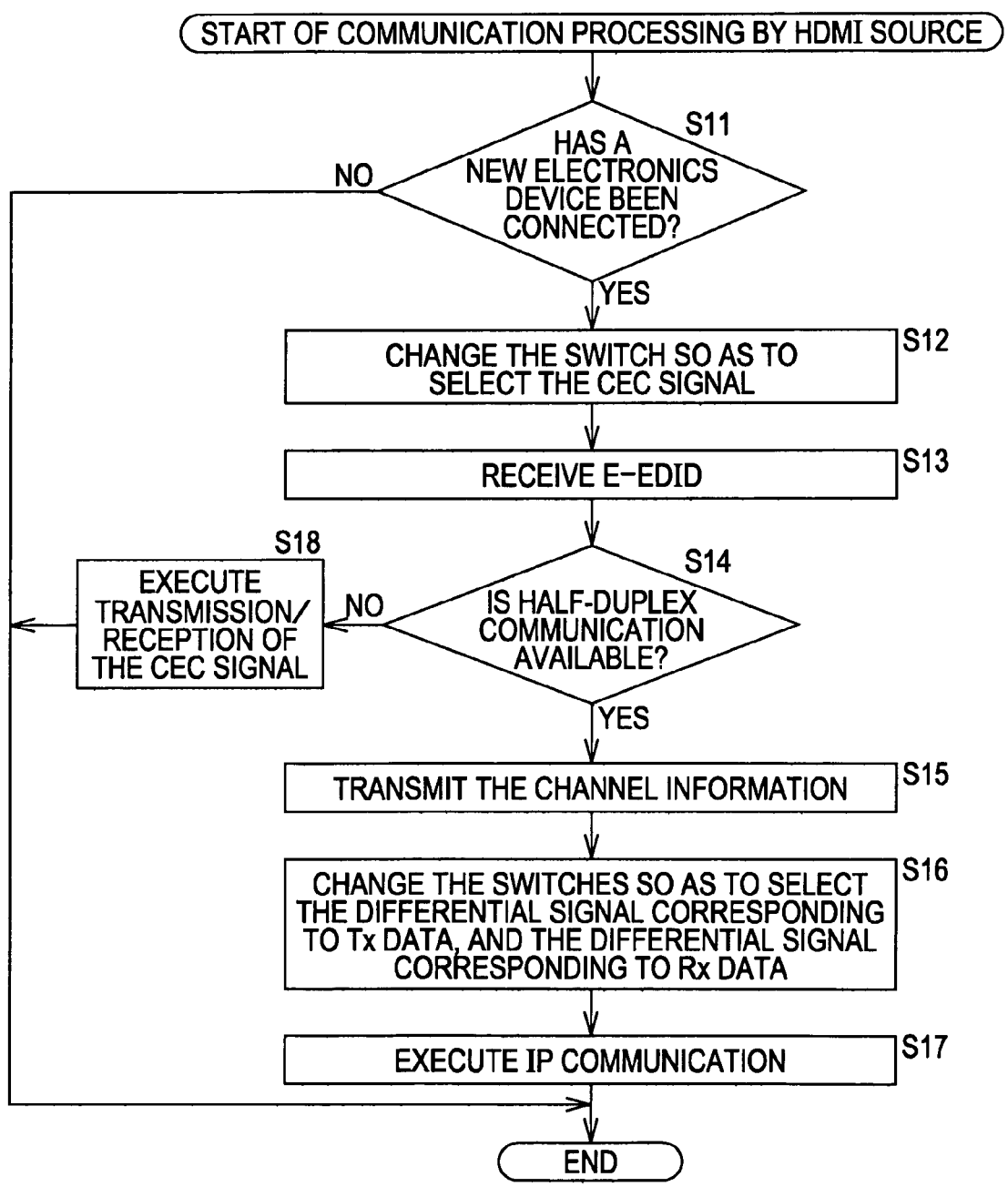
FIG. 10 is a flowchart for describing communication processing by the HDMI® source.

Description will be made below regarding the communication processing by the HDMI® source 71 shown in FIG. 6 with reference to the flowchart in FIG. 10.

In step S11, the HDMI® source 71 determines whether or not a new electronic device has been connected to the HDMI® source 71. For example, the HDMI® source 71 determines whether or not a new electronic device to which the HDMI® sink 72 is provided has been connected, based on the magnitude of the voltage applied to a pin called Hot Plug Detect to which the signal line 86 is connected.

In the case that determination is made in step S11 that a new electronic device has not been connected, communication is not executed, and accordingly, the communication processing ends.

On the other hand, in the case that determination is made in step S11 that a new electronic device has been connected, in step S12 the switching control unit 121 controls the switch 133 to switch the switch 133 so as to select the CEC signal from the HDMI® source 71 at the time of transmitting data, and to select the CEC signal from the receiver 82 at the time of receiving data.

In step S13, the HDMI® source 71 receives the E-EDID transmitted from the HDMI® sink 72 via the DDC 83. That is to say, upon detecting connection of the HDMIR® source 71, the HDMI® sink 72 reads out the E-EDID from the EDIDROM 85, and transmits the readout E-EDID to the HDMI® source 71 via the DDC 83, and accordingly, the HDMI® source 71 receives the E-EDID transmitted from the HDMI® sink 72.

In step S14, the HDMI® source 71 determines whether or not half-duplex communication with the HDMI® sink 72 is available. That is to say, the HDMI® source 71 determines whether or not the half-duplex flag "Half Duplex" in FIG. 9 has been set, with reference to the E-EDID received from the HDMI® sink 72, and for example, in the case that the half-duplex flag has been set, the HDMI® source 71 determines that two-way IP communication by the half-duplex communication method, i.e., half-duplex communication is available.

In the case that determination is made in step S14 that half-duplex communication is available, in step S15 the HDMI® source 71 transmits a signal to the effect that IP communication will be performed with the half-duplex communication method using the CEC line 84 and the signal line 141, to the receiver 82 via the switch 133 and the CEC line 84, as channel information indicating the channel to be used for bidirectional communication.

That is to say, in the case that the half-duplex flag has been set, the HDMI® source 71 can recognize that the HDMI® sink 72 is configured such as shown in FIG. 6, and half-duplex communication using the CEC line 84 and the signal line 141 is available, and accordingly, transmits the channel information to the HDMI® sink 72 to notify that half-duplex communication is executed.

In step S16, the switching control unit 121 controls the switch 133 to switch the switch 133 so as to select the differential signal corresponding to the Tx data from the conversion unit 131 at the time of transmitting data, and so as to select the differential signal corresponding to the Rx data from the receiver 82 at the time of receiving data.

In step S17, each unit of the HDMI® source 71 executes two-way IP communication with the HDMI® sink 72 by the half-duplex communication method, and the communication processing ends. Specifically, the conversion unit 131 converts the Tx data supplied from the HDMI® source 71 into a differential signal at the time of transmitting data, supplies one of the partial signals making up the differential signal obtained by conversion to the switch 133, and transmits the other partial signal to the receiver 82 via the signal line 141. The switch 133 transmits the partial signal supplied from the conversion unit 131 to the receiver 82 via the CEC line 84. Thus, the differential signal corresponding to the Tx data is transmitted from the HDMI® source 71 to the HDMI® sink 72.

Also, the decoding unit 132 receives the differential signal corresponding to the Rx data transmitted from the receiver 82 at the time of receiving data. That is to say, the switch 133 receives the partial signal of the differential signal corresponding to the Rx data, transmitted from the receiver 82 via the CEC line 84, and supplies the received partial signal to the decoding unit 132. Under control of the timing control unit 122, the decoding unit 132 decodes the differential signal made up of the partial signal supplied from the switch 133, and the partial signal supplied from the receiver 82 via the signal line 141 to Rx data that is the original data, and outputs this to the HDMI® source 71.

Thus, the HDMI® source 71 executes exchange of various types of data with the HDMI® sink 72, such as control data, pixel data, audio data, and the like.

Also, in the case that determination is made in step S14 that half-duplex communication is not available, in step S18 each unit of the HDMI® source 71 executes transmission/reception of the CEC signal, thereby executing two-way communication with the HDMI® sink 72, and the communication processing ends.

That is to say, the HDMI® source 71 transmits the CEC signal to the receiver 82 via the switch 133 and the CEC line 84 at the time of transmitting data, and the HDMI® source 71 receives the CEC signal transmitted from the receiver 82 via the switch 133 and the CEC line 84 at the time of receiving data, thereby executing exchange of control data with the HDMI® sink 72.

Thus, the HDMI® source 71 references the half-duplex flag to execute half-duplex communication with the HDMI® sink 72 capable of half-duplex communication using the CEC line 84 and the signal line 141.

Thus, the HDMI® source 71 switches the switch 133 to select data to be transmitted and data to be received, and executes half-duplex communication using the CEC line 84 and the signal line 141, i.e., IP communication by the half-duplex communication method with the HDMI® sink 72, whereby high-speed two-way communication can be executed while maintaining compatibility with the conventional HDMI®.

Also, similar to the HDMI® source 71, upon the power supply of the electronic device provided to the HDMI® sink 72 being turned on, the HDMI® sink 72 also starts communication processing, and executes two-way communication with the HDMI® source 71.

Figure 11:
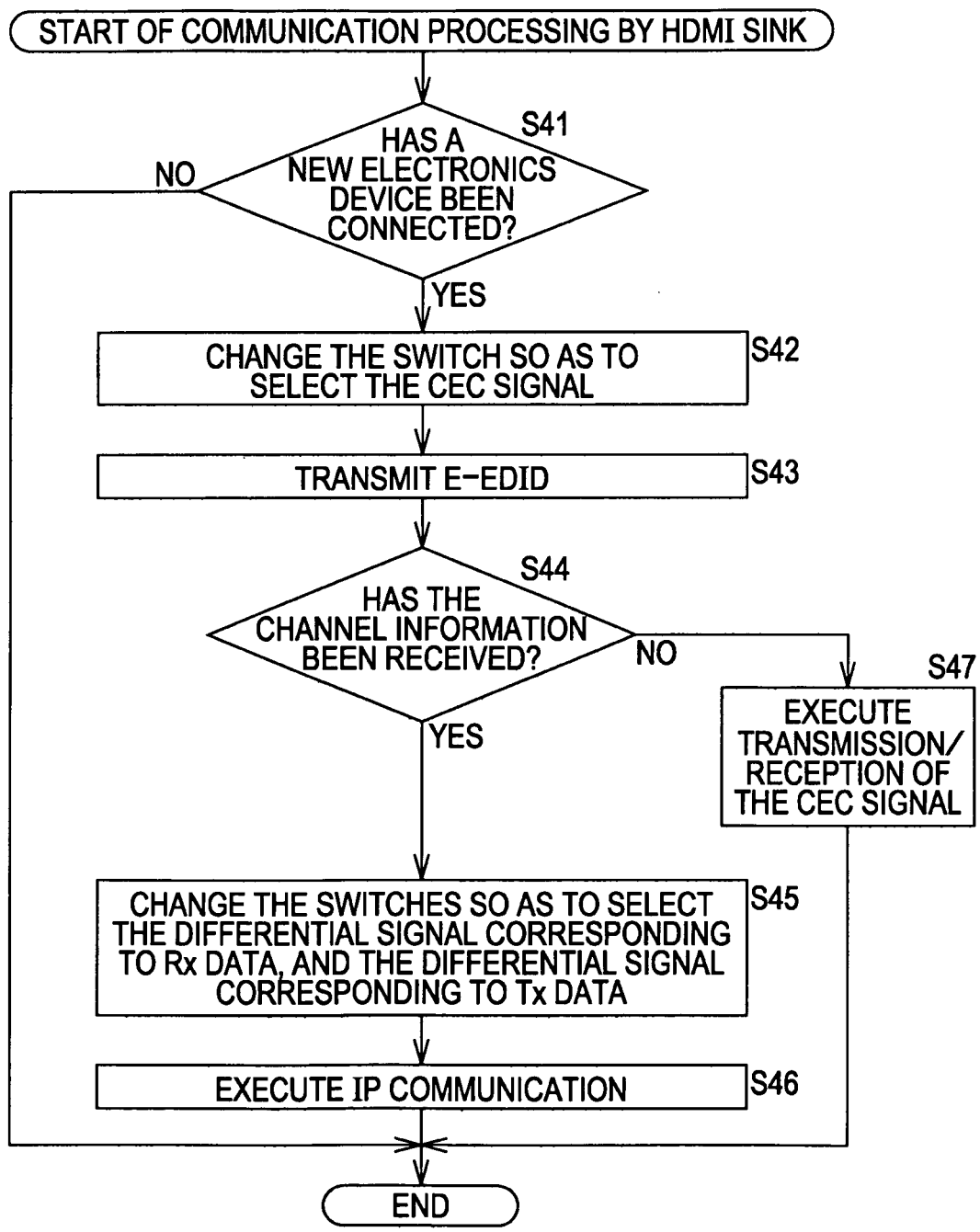
FIG. 11 is a flowchart for describing communication processing by the HDMI® sink.

Description will be made below regarding the communication processing by the HDMI® sink 72 shown in FIG. 6 with reference to the flowchart in FIG. 11.

In step S41, the HDMI® sink 72 determines whether or not a new electronic device has been connected to the HDMI® sink 72. For example, the HDMI® sink 72 determines whether or not a new electronic device to which the HDMI® source 71 is provided has been connected, based on the magnitude of the voltage applied to a pin called Hot Plug Detect to which the signal line 86 is connected.

In the case that determination is made in step S41 that a new electronic device has not been connected, communication is not executed, and accordingly, the communication processing ends.

On the other hand, in the case that determination is made in step S41 that a new electronic device has been connected, in step S42 the switching control unit 124 controls the switch 135 to switch the switch 135 so as to select the CEC signal from the HDMI® sink 72 at the time of transmitting data, and so as to select the CEC signal from the transmitter 81 at the time of receiving data.

In step S43, the HDMI® sink 72 reads out E-EDID from the EDIDROM 85, and transmits the readout E-EDID to the HDMI® source 71 via the DDC 83.

In step S44, the HDMI® sink 72 determines whether or not the channel information transmitted from the HDMI® source 71 has been received.

That is to say, the channel information indicating the channel of two-way communication is transmitted according to the functions that the HDMI® source 71 and the HDMI® sink 72 have. For example, in the case that the HDMI® source 71 is configured such as shown in FIG. 6, the HDMI® source 71 and the HDMI® sink 72 can execute half-duplex communication using the CEC line 84 and the signal line 141, and accordingly, channel information to the effect that IP communication is executed using the CEC line 84 and the signal line 141 is transmitted from the HDMI® source 71 to the HDMI® sink 72. The HDMI® sink 72 receives the channel information transmitted from the HDMI® source 71 via the switch 135 and the CEC line 84, and determines that the channel information has been received.

On the other hand, in the case that the HDMI® source 71 does not have a function for executing half-duplex communication, the channel information has not been transmitted from the HDMI® source 71 to the HDMI® sink 72, and accordingly, the HDMI® sink 72 determines that no channel information has been received.

In the case that determination is made in step S44 that the channel information has been received, the processing proceeds to step S45, where the switching control unit 124 controls the switch 135 to switch the switch 135 so as to select the differential signal corresponding to the Rx data from the conversion unit 134 at the time of transmitting data, and so as to select the differential signal corresponding to the Tx data from the transmitter 81 at the time of receiving data.

In step S46, each unit of the HDMI® sink 72 executes two-way IP communication with the HDMI® source 71 by the half-duplex communication method, and the communication processing ends. Specifically, the conversion unit 134 converts the Rx data supplied from the HDMI® sink 72 into a differential signal based on the control of the timing control unit 123 at the time of transmitting data, and supplies one of the partial signals making up the differential signal obtained by conversion to the switch 135, and transmits the other partial signal to the transmitter 81 via the signal line 141. The switch 135 transmits the partial signal supplied from the conversion unit 134 to the transmitter 81 via the CEC line 84. Thus, the differential signal corresponding to the Rx data is transmitted from the HDMI® sink 72 to the HDMI® source 71.

Also, the decoding unit 136 receives the differential signal corresponding to the Tx data transmitted from the transmitter 81 at the time of receiving data. That is to say, the switch 135 receives the partial signal of the differential signal corresponding to the Tx data, transmitted from the transmitter 81 via the CEC line 84, and supplies the received partial signal to the decoding unit 136. The decoding unit 136 decodes the differential signal made up of the partial signal supplied from the switch 135, and the partial signal supplied from the transmitter 81 via the signal line 141 to Tx data that is the original data, and outputs this to the HDMI® sink 72.

Thus, the HDMI® sink 72 executes exchange of various types of data with the HDMI® source 71, such as control data, pixel data, audio data, and the like.

Also, in the case that determination is made in step S44 that the channel information has not been received, in step S47 each unit of the HDMI® sink 72 executes transmission/reception of the CEC signal, thereby executing two-way communication with the HDMI® source 71, and the processing ends.

That is to say, the HDMI® sink 72 transmits the CEC signal to the transmitter 81 via the switch 135 and the CEC line 84 at the time of transmitting data, and the HDMI® sink 72 receives the CEC signal transmitted from the transmitter 81 via the switch 135 and the CEC line 84 at the time of receiving data, thereby executing exchange of control data with the HDMI® source 71.

Thus, upon receiving the channel information, the HDMI® sink 72 executes half-duplex communication with the HDMI® sink 72 using the CEC line 84 and the signal line 141.

Thus, the HDMI® sink 72 switches the switch 135 to select data to be transmitted and data to be received, and executes half-duplex communication with the HDMI® source 71 using the CEC line 84 and the signal line 141, whereby high-speed two-way communication while maintaining compatibility with the conventional HDMI®.

Also, in the case that the HDMI® source 71 is configured such as shown in FIG. 7, with the communication processing, the HDMI® source 71 determines whether or not the HDMI® sink 72 has a function for executing full-duplex communication, based on the full-duplex flag included in the E-EDID, and executes two-way communication according to the determination result thereof.

Figure 12:
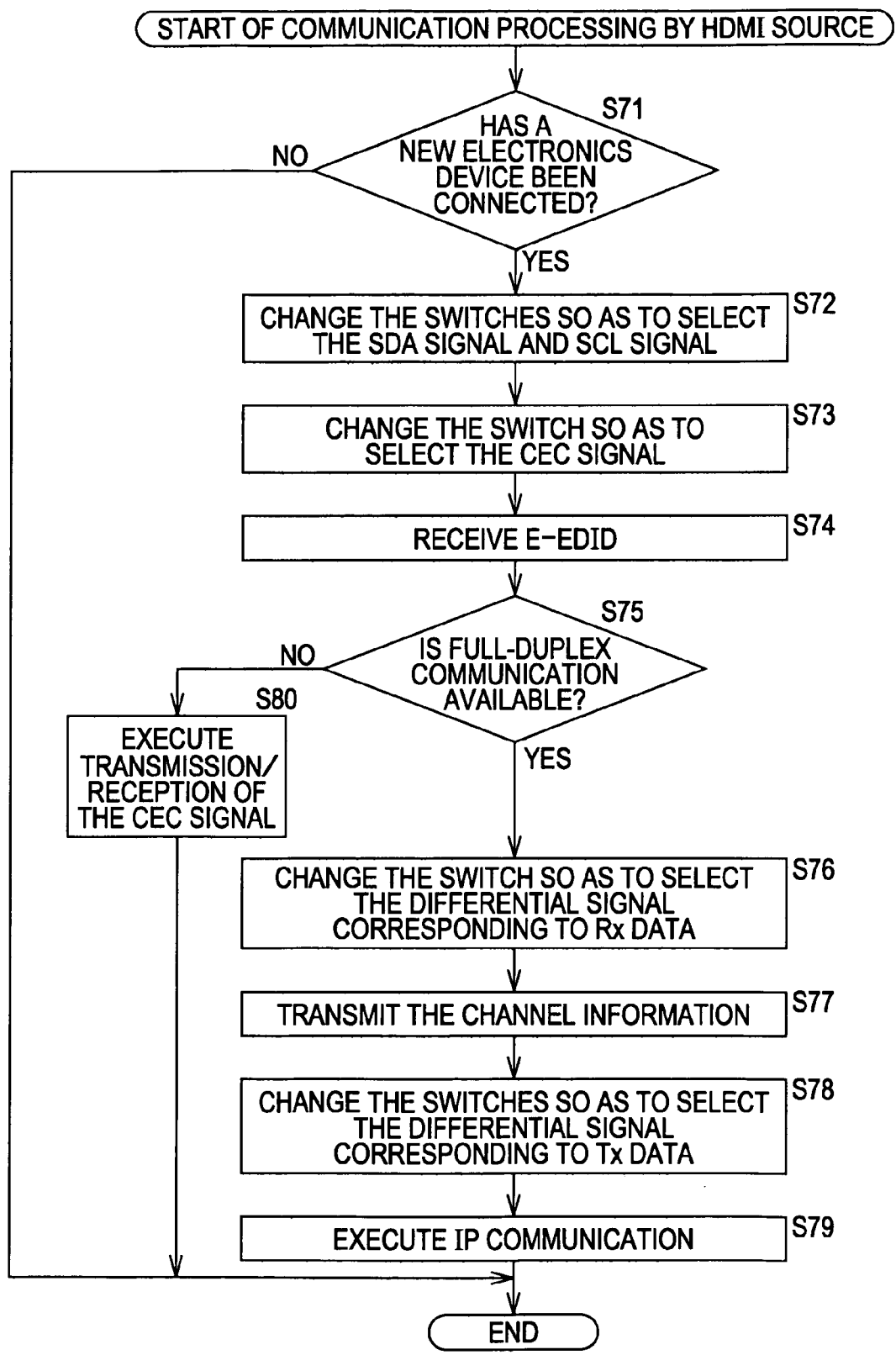
FIG. 12 is a flowchart for describing communication processing by the HDMI® source.

Description will be made below regarding the communication processing by the HDMI® source 71 shown in FIG. 7 with reference to the flowchart in FIG. 12.

In step S71, the HDMI® source 71 determines whether or not a new electronic device has been connected to the HDMI® source 71. In the case that determination is made in step S71 that a new electronic device has not been connected, communication is not executed, and accordingly, the communication processing ends.

On the other hand, in the case that determination is made in step S71 that a new electronic device has been connected, in step S72 the switching control unit 171 controls the switch 181 and the switch 182 to switch the switch 181 and the switch 182 so as to select the SDA signal from the HDMI® source 71 by the switch 181 and select the SCL signal from the HDMI® source 71 by the switch 182 at the time of transmitting data, and so as to select the SDA signal from the receiver 82 by the switch 181 at the time of receiving data.

In step S73, the switching control unit 121 controls the switch 133 to switch the switch 133 so as to select the CEC signal from the HDMI® source 71 at the time of transmitting data, and so as to select the CEC signal from the receiver 82 at the time of receiving data.

In step S74, the HDMI® source 71 receives the E-EDID transmitted from the HDMI® sink 72 via the SDA line 191 of the DDC 83. That is to say, upon detecting connection of the HDMI® source 71, the HDMI® sink 72 reads out E-EDID from the EDIDROM 85, and transmits the readout stream to the HDMI® source 71 via the SDA line 191 of the DDC 83, and accordingly, the HDMI® source 71 receives the E-EDID transmitted from the HDMI® sink 72.

In step S75, the HDMI® source 71 determines whether or not full-duplex communication with the HDMI® sink 72 is available. That is to say, the HDMI® source 71 references the E-EDID received from the HDMI® sink 72 to determine whether or not the full-duplex flag "Full Duplex" in FIG. 9 has been set, and for example, in the case that the full-duplex flag has been set, the HDMI® source 71 determines that two-way IP communication by the full-duplex communication method, i.e., full-duplex communication is available.

In the case that determination is made in step S75 that full-duplex communication is available, in step S76 the switching control unit 171 controls the switch 181 and the switch 182 to switch the switch 181 and the switch 182 to select the differential signal corresponding to the Rx data from the receiver 82 at the time of receiving data.

That is to say, the switching control unit 171 switches the switch 181 and the switch 182 so as to select the partial signal transmitted via the SDA line 191 using the switch 181, and so as to select the partial signal transmitted via the SCL line 192 using the switch 182, of the partial signals making up the differential signal corresponding to the Rx data, transmitted from the receiver 82 at the time of receiving data.

The SDA line 191 and the SCL line 192 making up the DDC 83 are not used after the E-EDID is transmitted from the HDMI® sink 72 to the HDMI® source 71, i.e., transmission/reception of the SDA signal and the SCL signal via the SDA line 191 and the SCL line 192 is not executed, and accordingly, the SDA line 191 and the SCL line 192 can be used as the transmission paths of the Rx data according to full-duplex communication by switching the switch 181 and the switch 182.

In step S77, the HDMI® source 71 transmits a signal to the effect that IP communication by the full-duplex communication method using the CEC line 84 and the signal line 141, and the SDA line 191 and the SCL line 192 as the channel information indicating a two-way communication channel, to the receiver 82 via the switch 133 and the CEC line 84.

That is to say, in the case that the full-duplex flag has been set, the HDMI® source 71 can recognize that the HDMI® sink 72 is configured such as shown in FIG. 7, and full-duplex communication using the CEC line 84 and the signal line 141, and the SDA line 191 and the SCL line 192 is available, and accordingly, transmits the channel information to the HDMI® sink 72 to notify that full-duplex communication is executed.

In step S78, the switching control unit 121 controls the switch 133 to switch the switch 133 so as to select the differential signal corresponding to the Tx data from the conversion unit 131 at the time of transmitting data. That is to say, the switching control unit 121 switches the switch 133 so as to select the partial signal of the differential signal corresponding to the Tx data supplied from the conversion unit 131 to the switch 133.

In step S79, each unit of the HDMI® source 71 executes two-way IP communication with the HDMI® sink 72 by the full-duplex communication method, and the communication processing ends. Specifically, the conversion unit 131 converts the Tx data supplied from the HDMI® source 71 into a differential signal, supplies one of the partial signals making up the differential signal obtained by conversion to the switch 133, and transmits the other partial signal to the receiver 82 via the signal line 141, at the time of transmitting data. The switch 133 transmits the partial signal supplied from the conversion unit 131 to the receiver 82 via the CEC line 84. Thus, the differential signal corresponding to the Tx data is transmitted from the HDMI® source 71 to the HDMI® sink 72.

Also, the decoding unit 183 receives the differential signal corresponding to the Rx data transmitted from the receiver 82 at the time of receiving data. That is to say, the switch 181 receives the partial signal of the differential signal corresponding to the Rx data, transmitted from the receiver 82 via the SDA line 191, and supplies the received partial signal to the decoding unit 183. Also, the switch 182 receives the other partial signal of the differential signal corresponding to the Rx data, transmitted form the receiver 82 via the SCL line 192, and supplies the received partial signal to the decoding unit 183. The decoding unit 183 decodes the differential signal made up of the partial signal supplied from the switch 181 and the switch 182 to Rx data that is the original data, and outputs this to the HDMI® source 71.

Thus, the HDMI® source 71 executes exchange of various types of data with the HDMI® sink 72, such as control data, pixel data, audio data, and the like.

Also, in the case that determination is made in step S75 that full-duplex communication is not available, in step S80 each unit of the HDMI® source 71 executes transmission/reception of the CEC signal, thereby executing two-way communication with the HDMI® sink 72, and the communication processing ends.

That is to say, the HDMI® source 71 transmits the CEC signal to the receiver 82 via the switch 133 and the CEC line 84 at the time of transmitting data, and the HDMI® source 71 receives the CEC signal transmitted from the receiver 82 via the switch 133 and the CEC lien 84 at the time of receiving data, thereby executing exchange of control data with the HDMI® sink 72.

Thus, the HDMI® source 71 references the full-duplex flag to execute full-duplex communication with the HDMI® sink 72 capable of full-duplex communication using the CEC line 84 and the signal line 141, and the SDA line 191 and the SCL line 192.

Thus, full-duplex communication is executed with the HDMI® sink 72 using the CEC line 84 and the signal line 141, and the SDA line 191 and the SCL line 192 by switching the switch 133, the switch 181, and the switch 182, to select data to be transmitted and data to be received, whereby high-speed two-way communication can be executed while maintaining compatibility with the conventional HDMI®.

Also, even in the case that the HDMI® sink 72 is configured such as shown in FIG. 7, the HDMI® sink 72 executes the communication processing in the same way as with the case of the HDMI® sink 72 shown in FIG. 6, thereby executing two-way communication with the HDMI® source 71.

Figure 13:
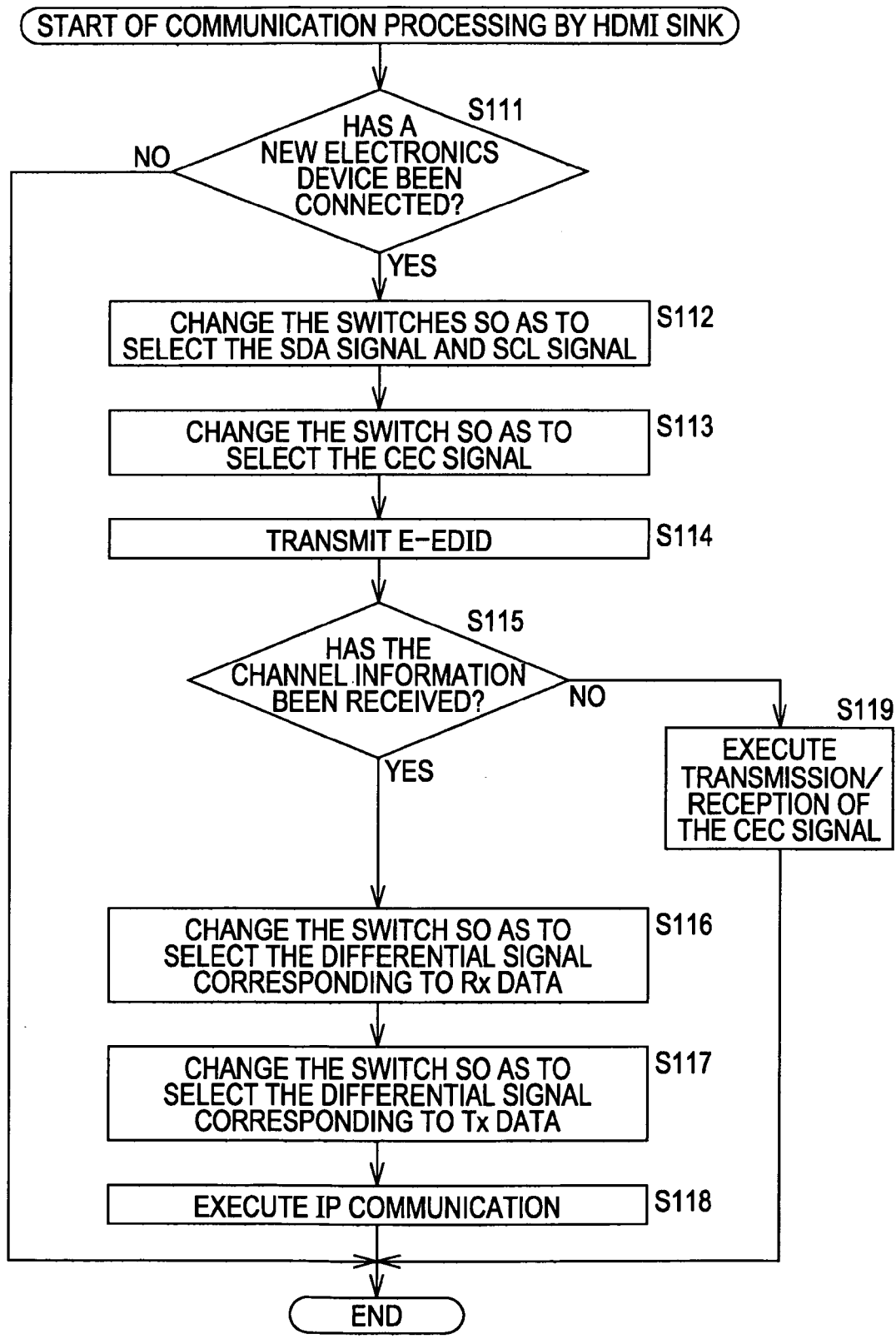
FIG. 13 is a flowchart for describing communication processing by the HDMI® sink.

Description will be made below regarding the communication processing by the HDMI® sink 72 shown in FIG. 7 with reference to the flowchart in FIG. 13.

In step S111, the HDMI® sink 72 determines whether or not a new electronic device has been connected to the HDMI® sink 72. In the case that determination is made in step S111 that a new electronic device has not been connected, communication is not executed, and accordingly, the communication processing ends.

On the other hand, in the case that determination is made in step S111 that a new electronic device has been connected, in step S112 the switching control unit 172 controls the switch 185 and the switch 186 to switch the switch 185 and the switch 186 so as to select the SDA signal from the HDMI® sink 72 by the switch 185 at the time of transmitting data, and further so as to select the SDA signal from the transmitter 81 by the switch 185 at the time of receiving data, and select the SCL signal from the transmitter 81 by the switch 186.

In step S113, the switching control unit 124 controls the switch 135 to switch the switch 135 so as to select the CEC signal from the HDMI® sink 72 at the time of transmitting data, and so as to select the CEC signal from the transmitter 81 at the time of receiving data.

In step S114, the HDMI® sink 72 reads out E-EDID from the EDIDROM 85, and transmits the readout E-EDID to the HDMI® source 71 via the switch 185 and the SDA line 191 of the DDC 83.

In step S115, the HDMI® sink 72 determines whether or not the channel information transmitted from the HDMI® source 71 has been received.

That is to say, the channel information indicating the two-way communication channel is transmitted from the HDMI® source 71 according to the functions that the HDMI® source 71 and the HDMI® sink 72 have. For example, in the case that the HDMI® source 71 is configured such as shown in FIG. 7, the HDMI® source 71 and the HDMI® sink 72 can execute full-duplex communication, and accordingly, channel information to the effect that IP communication by the full-duplex communication method using the CEC line 84 and the signal line 141, and the SDA line 191 and the SCL line 192 is executed, is transmitted from the HDMI® source 71 to the HDMI® sink 72, and accordingly, the HDMI® sink 72 receives the channel information transmitted from the HDMI® source 71 via the switch 135 and the CEC line 84, and determines that the channel information has been received.

On the other hand, in the case that the HDMI® source 71 does not have a function for executing full-duplex communication, the channel information is not transmitted from the HDMI® source 71 to the HDMI® sink 72, and accordingly, the HDMI® sink 72 determines that no channel information has been received.

In the case that determination is made in step S115 that the channel information has been received, the processing proceeds to step S116, where the switching control unit 172 controls the switch 185 and the switch 186 to switch the switch 185 and the switch 186 so as to select the differential signal corresponding to the Rx data from the conversion unit 184 at the time of transmitting data.

In step S117, the switching control unit 124 controls the switch 135 to switch the switch 135 so as to select the differential signal corresponding to the Tx data from the transmitter 81 at the time of receiving data.

In step S118, each unit of the HDMI® sink 72 executes two-way IP communication with the HDMI® source 71 by the full-duplex communication method, and the communication processing ends. Specifically, the conversion unit 184 converts the Rx data supplied from the HDMI® sink 72 into a differential signal, supplies one of the partial signals making up the differential signal obtained by conversion to the switch 185, and supplies the other partial signal to the switch 186, at the time of transmitting data. The switch 185 and the switch 186 transmit the partial signal supplied from the conversion unit 184 to the transmitter 81 via the SDA line 191 and the SCL line 192. Thus, the differential signal corresponding to the Rx data is transmitted from the HDMI® sink 72 to the HDMI® source 71.

Also, the decoding unit 136 receives the differential signal corresponding to the Tx data transmitted from the transmitter 81 at the time of receiving data. That is to say, the switch 135 receives the partial signal of the differential signal corresponding to the Tx data, transmitted from the transmitter 81 via the CEC line 84, and supplies the received partial signal to the decoding unit 136. The decoding unit 136 decodes the differential signal made up of the partial signal supplied from the switch 135, and the partial signal supplied from the transmitter 81 via the signal line 141 to Tx data that is the original data, and outputs this to the HDMI® sink 72.

Thus, the HDMI® sink 72 executes exchange of various types of data with the HDMI® source 71, such as control data, pixel data, audio data, and the like.

Also, in the case that determination is made in step S115 that no channel information has been received, in step S119 each unit of the HDMI® sink 72 executes transmission/reception of the CEC signal, thereby executing two-way communication with the HDMI® source 71, and the communication processing ends.

Thus, upon receiving the channel information, the HDMI® sink 72 executes full-duplex communication with the HDMI® sink 72 using the CEC line 84 and the signal line 141, and the SDA line 191 and the SCL line 192.

Thus, the HDMI® sink 72 switches the switch 135, switch 185, and switch 186 to select data to be transmitted and data to be received, and executes full-duplex communication with the HDMI® source 71 using the CEC line 84 and the signal line 141, and the SDA line 191 and the SCL line 192, whereby high-speed two-way communication can be executed while maintaining compatibility with the conventional HDMI®.

Note that, with the example in FIG. 7, the HDMI® source 71 has been configured wherein the conversion unit 131 is connected to the CEC line 84 and the signal line 141, and the decoding unit 183 is connected to the SDA line 191 and the SCL line 192, but may be configured wherein the decoding unit 183 is connected to the CEC line 84 and the signal line 141, and the conversion unit 131 is connected to the SDA line 191 and the SCL line 192.

In such a case, the switch 181 and the switch 182 are connected to the CEC line 84 and the signal line 141, and are also connected to the decoding unit 183, and the switch 133 is connected to the SDA line 191, and is also connected to the conversion unit 131.

Also, in the same way regarding the HDMI® sink 72 in FIG. 7, an arrangement may be made wherein the conversion unit 184 is connected to the CEC line 84 and the signal line 141, and the decoding unit 136 is connected to the SDA line 191 and the SCL line 192. In such a case, the switch 185 and the switch 186 are connected to the CEC line 84 and the signal line 141, and are also connected to the conversion unit 184, and the switch 135 is connected to the SDA line 191, and is also connected to the decoding unit 136.

Further, in FIG. 6, the CEC line 84 and the signal line 141 may be taken as the SDA line 191 and the SCL line 192. That is to say, an arrangement may be made wherein the conversion unit 131 and the decoding unit 132 of the HDMI® source 71, and the conversion unit 134 and the decoding unit 136 of the HDMI® sink 72 are connected to the SDA line 191 and the SCL line 192, and the HDMI® source 71 and the HDMI® sink 72 executes IP communication by the half-duplex communication method. Further, in this case, connection of an electronic device may be detected using a reserved pin of the connector to which the signal line 141 is connected.

Further, each of the HDMI® source 71 and the HDMI® sink 72 may have both of a function for executing half-duplex communication, and a function for executing full-duplex communication. In such a case, the HDMI® source 71 and the HDMI® sink 72 can execute IP communication by the half-duplex communication method or the full-duplex communication method according to the function that the connected electronic device has.

Figure 14:
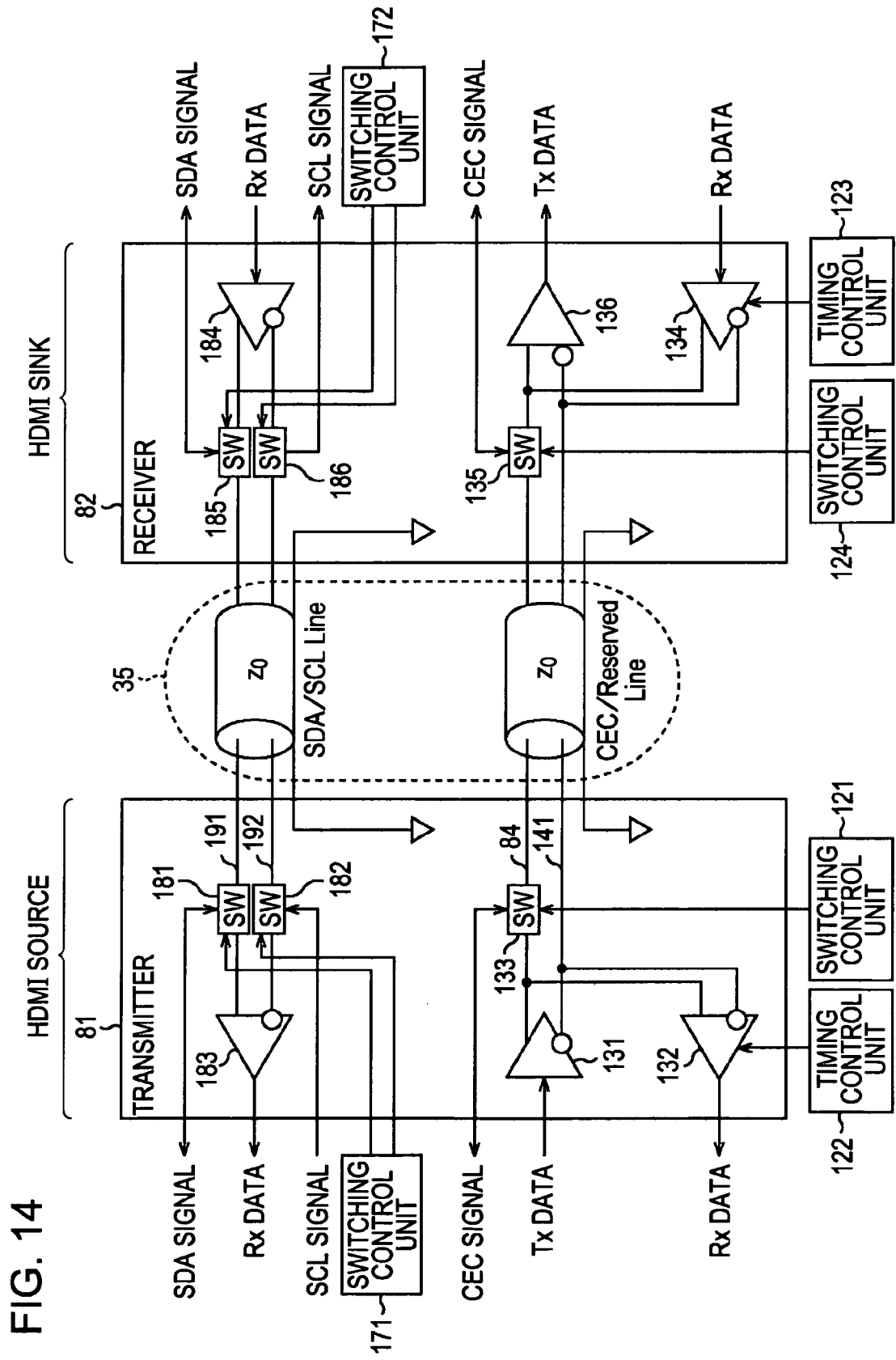
FIG. 14 is a diagram illustrating another more detailed configuration example of the HDMI® source and the HDMI® sink.

In the case that each of the HDMI® source 71 and the HDMI® sink 72 has both of a function for executing half-duplex communication, the HDMI® source 71 and the HDMI® sink 72 are configured such as shown in FIG. 14, for example. Note that, in FIG. 14, the portions corresponding to those in the case of FIG. 6 and FIG. 7 are denoted with the same reference numerals, and description thereof will be omitted.

The HDMI® source 71 shown in FIG. 14 is configured of a transmitter 81, a switching control unit 121, a timing control unit 122, and a switching control unit 171, and a conversion unit 131, a decoding unit 132, a switch 133, a switch 181, a switch 182, and a decoding unit 183 are provided to the transmitter 81. That is to say, the HDMI® source 71 in FIG. 14 is configured wherein the timing control unit 122 and the decoding unit 132 in FIG. 6 are further provided to the HDMI® source 71 shown in FIG. 7.

Also, the HDMI® sink 72 shown in FIG. 14 is configured of a receiver 82, a timing control unit 123, a switching control unit 124, and a switching control unit 172, and a conversion unit 134, a switch 135, a decoding unit 136, a conversion unit 184, a switch 185, and a switch 186 are provided to the receiver 82. That is to say, the HDMI® sink 72 in FIG. 14 is configured wherein the timing control unit 123 and the conversion unit 134 in FIG. 6 are further provided to the HDMI® sink 72 shown in FIG. 7.

Next, the communication processing by the HDMI® source 71 and the HDMI® sink 72 in FIG. 14 will be described.

Figure 15:
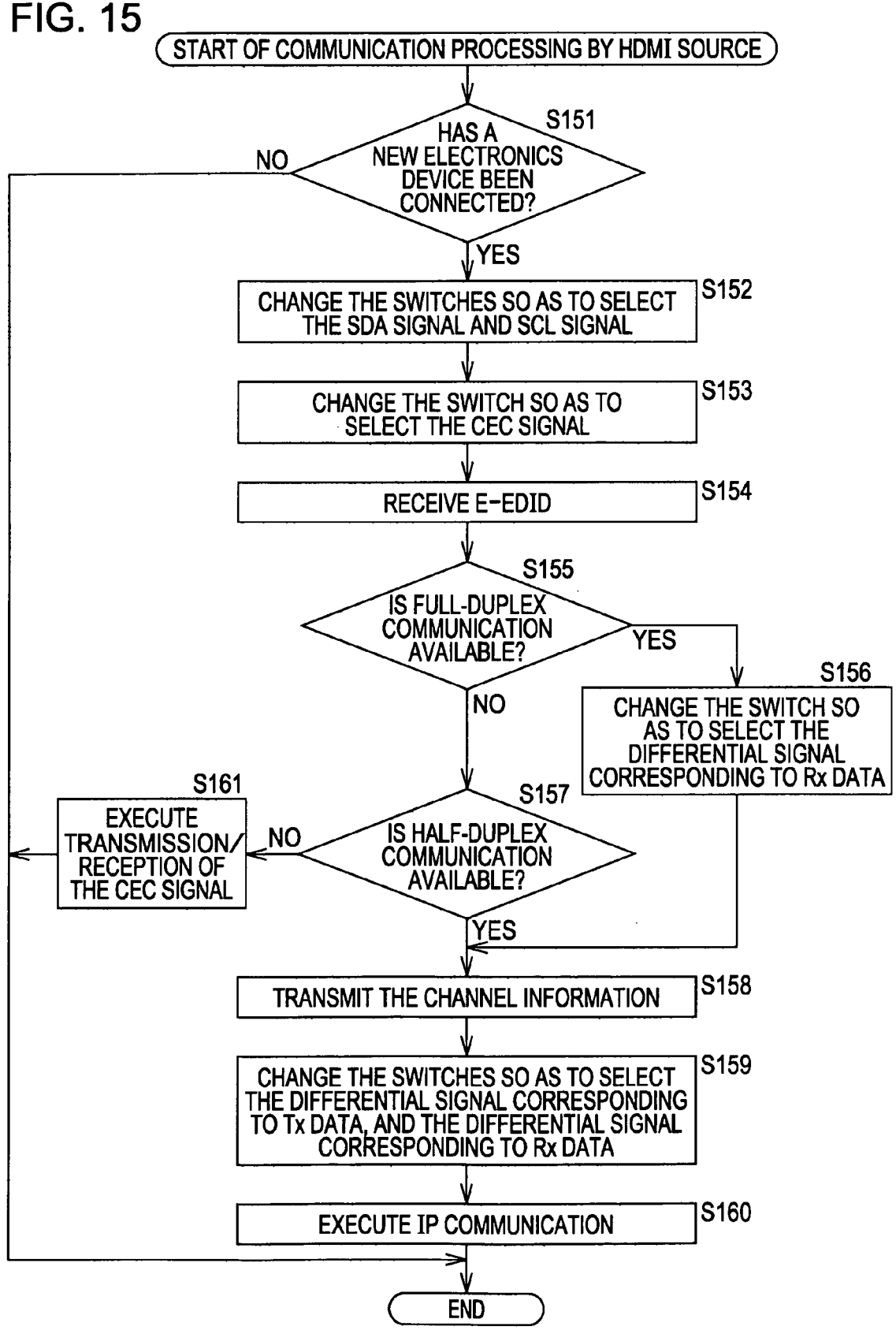
FIG. 15 is a flowchart for describing communication processing by the HDMI® source.

First, description will be made regarding the communication processing by the HDMI® source 71 in FIG. 14 with reference to the flowchart in FIG. 15. Note that the processes in step S151 through step S154 are the same as the processes in step S71 through step S74 in FIG. 12 respectively, and accordingly, description thereof will be omitted.

In step S155, the HDMI® source 71 determines whether or not full-duplex communication with the HDMI® sink 72 is available. That is to say, the HDMI® source 71 references the E-EDID received from the HDMI® sink 72 to determine whether or not the full-duplex flag "Full Duplex" in FIG. 9 has been set.

In the case that determination is made in step S155 that full-duplex communication is available, i.e., in the case that the HDMI® sink 72 shown in FIG. 14 or FIG. 7 is connected to the HDMI® source 71, in step S156 the switching control unit 171 controls the switch 181 and the switch 182 to switch the switch 181 and the switch 182 so as to select the differential signal corresponding to the Rx data from the receiver 82 at the time of receiving data.

On the other hand, in the case that determination is made that full-duplex communication is not available, in step S157 the HDMI® source 71 determines whether or not half-duplex communication is available. That is to say, the HDMI® source 71 references the received E-EDID to determine whether or not the half-duplex flag "Half Duplex" in FIG. 9 has been set. In other words, the HDMI® source 71 determines whether or not the HDMI® sink 72 shown in FIG. 6 has been connected to the HDMI® source 71.

In the case that determination is made in step S157 that half-duplex communication is available, or in the case that the switch 181 and the switch 182 have been switched in step S156, in step S158 the HDMI® source 71 transmits the channel information to the receiver 82 via the switch 133 and the CEC line 84.

Here, in the case that determination is made in step S155 that full-duplex communication is available, the HDMI® sink 72 has a function for executing full-duplex communication, and accordingly, the HDMI® source 71 transmits a signal to the effect that IP communication using the CEC line 84 and the signal line 141, and the SDA line 191 and the SCL line 192 is executed to the receiver 82 via the switch 133 and the CEC line 84 as the channel information.

Also, in the case that determination is made in step S157 that half-duplex communication is available, the HDMI® sink 72 has no function for executing full-duplex communication, but has a function for executing half-duplex communication, and accordingly, the HDMI® source 71 transmits a signal to the effect that IP communication using the CEC line 84 and the signal line 141 is executed to the receiver 82 via the switch 133 and the CEC line 84 as the channel information.

In step S159, the switching control unit 121 controls the switch 133 to switch the switch 133 so as to select the differential signal corresponding to the Tx data from the conversion unit 131 at the time of transmitting data, and so as to select the differential signal corresponding to the Rx data transmitted from the receiver 82 at the time of receiving data. Note that, in the case that the HDMI® source 71 and the HDMI® sink 72 execute full-duplex communication, the differential signal corresponding to the Rx data is not transmitted from the receiver 82 via the CEC line 84 and signal line 141 at the time of the HDMI® source 71 receiving data, and accordingly, the differential signal corresponding to the Rx data is not supplied to the decoding unit 132.

In step S160, each unit of the HDMI® source 71 executes two-way IP communication with the HDMI® sink 72, and the communication processing ends.

Specifically, in the case that the HDMI® source 71 and the HDMI® sink 72 execute full-duplex communication, and in the case of executing half-duplex communication, the conversion unit 131 converts the Tx data supplied from the HDMI® source 71 into a differential signal, and transmits one of the partial signal making up the differential signal obtained by conversion to the receiver 82 via the switch 133 and the CEC line 84, and transmits the other partial signal to the receiver 82 via the signal line 141, at the time of transmitting data.

Also, in the case that the HDMI® source 71 and the HDMI® sink 72 execute full-duplex communication, the decoding unit 183 receives the differential signal corresponding to the Rx data transmitted from the receiver 82, decodes the received differential signal to Rx data that is the original data, and outputs this to the HDMI® source 71, at the time of receiving data.

On the other hand, in the case that the HDMI® source 71 and the HDMI® sink 72 execute half-duplex communication, the decoding unit 132 receives the differential signal corresponding to the Rx data transmitted from the receiver 82 based on the control of the timing control unit 122, decodes the received differential signal to Rx data that is the original data, and outputs this to the HDMI® source 71, at the time of receiving data.

Thus, the HDMI® source 71 executes exchange of various types of data with the HDMI® sink 72, such as control data, pixel data, audio data, and the like.

Also, in the case that determination is made in step S157 that half-duplex is not available, in step S161 each unit of the HDMI® source 71 executes transmission/reception of the CEC signal, thereby executing two-way communication with the HDMI® sink 72 via the CEC line 84, and the communication processing ends.

Thus, the HDMI® source 71 references the full-duplex flag and the half-duplex flag to execute full-duplex communication or half-duplex communication according to the function that the HDMI® sink 72 which is a communication partner has.

Thus, the HDMI® source 71 switches the switch 133, switch 181, and switch 182 to select data to be transmitted and data to be received, and executes full-duplex communication or half-duplex communication, according to the function that the HDMI® sink 72 which is a communication partner has, whereby high-speed two-way communication can be executed by selecting a more appropriate communication method while maintaining compatibility with the conventional HDMI®.

Figure 16:
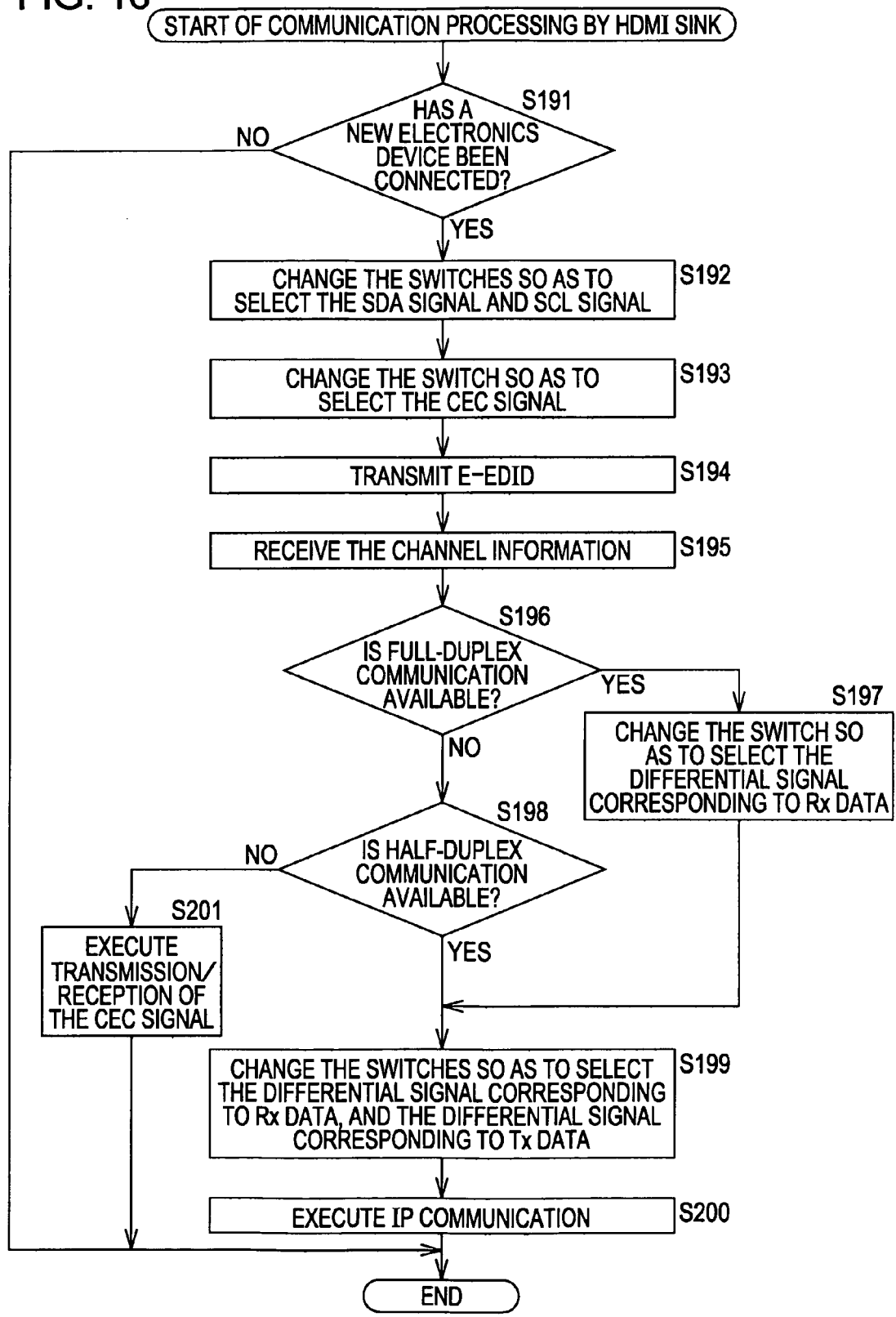
FIG. 16 is a flowchart for describing communication processing by the HDMI® sink.

Next, the communication processing by the HDMI® sink 72 in FIG. 14 will be described with reference to the flowchart in FIG. 16. Note that the processes in step S191 through step S194 are the same as the processes in step S111 through step S114 in FIG. 13 respectively, and accordingly, description thereof will be omitted.

In step S195, the HDMI® sink 72 receives the channel information transmitted from the HDMI® source 71 via the switch 135 and the CEC line 84. Note that, in the case that the HDMI® source 71 connected to the HDMI® sink 72 has neither a function for executing full-duplex communication nor a function for executing half-duplex communication, no channel information is transmitted from the HDMI® source 71 to the HDMI® sink 72, and accordingly, the HDMI® sink 72 does not receive the channel information.

In step S196, the HDMI® sink 72 determines whether or not full-duplex communication is executed, based on the received channel information. For example, in the case of receiving the channel information to the effect that IP communication using the CEC line 84 and the signal line 141, and the SDA line 191 and the SCL line 192 is executed, the HDMI® sink 72 determines that full-duplex communication is executed.

In the case that determination is made in step S196 that full-duplex communication is executed, in step S197 the switching control unit 172 controls the switch 185 and the switch 186 to switch the switch 185 and the switch 186 so as to select the differential signal corresponding to the Rx data from the conversion unit 184 at the time of transmitting data.

Also, in the case that determination is made in step S196 that full-duplex communication is not executed, in step S198 the HDMI® sink 72 determines based on the received channel information whether or not half-duplex communication is executed. For example, in the case of receiving channel information to the effect that IP communication using the CEC line 84 and the signal line 141 is executed, the HDMI® sink 72 determines that half-duplex communication is executed.

In the case that determination is made in step S198 that half-duplex communication is executed, or in the case that the switch 185 and the switch 186 have been switched in step S197, the switching control unit 124 controls the switch 135 to switch the switch 135 so as to select the differential signal corresponding to the Rx data from the conversion unit 134 at the time of transmitting data, and so as to select the differential signal corresponding to the Tx data from the transmitter 81 at the time of receiving data.

Note that, in the case that the HDMI® source 71 and the HDMI® sink 72 execute full-duplex communication, the differential signal corresponding to the Rx data is not transmitted from the conversion unit 134 to the transmitter 81 at the time of the HDMI® sink 72 transmitting data, and accordingly, the differential signal corresponding to the Rx data is not supplied to the switch 135.

In step S200, each unit of the HDMI® sink 72 executes two-way IP communication with the HDMI® source 71, and the communication processing ends.

Specifically, in the case that the HDMI® source 71 and the HDMI® sink 72 execute full-duplex communication, at the time of transmitting data, the conversion unit 184 converts the Rx data supplied form the HDMI® sink 72 into a differential signal, transmits one of the partial signals making up the differential signal obtained by conversion to the transmitter 81 via the switch 185 and the SDA line 191, and transmits the other partial signal to the transmitter 81 via the switch 186 and SCL line 192.

Also, in the case that the HDMI® source 71 and the HDMI® sink 72 execute half-duplex communication, at the time of transmitting data, the conversion unit 134 converts the Rx data supplied from the HDMI® sink 72 into a differential signal, transmits one of the partial signals making up the differential signal obtained by conversion to the transmitter 81 via the switch 135 and the CEC line 84, and transmits the other partial signal to the transmitter 81 via the signal line 141.

Further, in the case that the HDMI® source 71 and the HDMI® sink 72 execute full-duplex communication, and in the case of executing half-duplex communication, the decoding unit 136 receives the differential signal corresponding to the Tx data transmitted from the transmitter 81, decodes the received differential signal to Tx data that is the original data, and outputs this to the HDMI® sink 72, at the time of receiving data.

Also, in the case that determination is made in step S198 that half-duplex communication is not executed, i.e., in the case that no channel information has been transmitted, in step S201 each unit of the HDMI® sink 72 executes transmission/reception of the CEC signal, thereby executing two-way communication with the HDMI® source 71, and the communication processing ends.

Thus, the HDMI® sink 72 executes full-duplex communication or half-duplex communication according to the received channel information, i.e., according to the function that the HDMI® source 71 which is a communication partner has.

Thus, the HDMI® sink 72 switches the switch 135, switch 185, and switch 186 to select data to be transmitted and data to be received, and executes full-duplex communication or half-duplex communication, according to the function that the HDMI® source 71 which is a communication partner, whereby high-speed two-way communication can be executed by selecting a more appropriate communication method while maintaining compatibility with the conventional HDMI®.

Also, the HDMI® source 71 and the HDMI® sink 72 are connected with the HDMI® cable 35 including the CEC line 84 and the signal line 141 which are connected mutually as a differential twist pair and grounded with the ground line, and the SDA line 191 and the SCL line 192 which are connected mutually as a differential twist pair and grounded with the ground line, whereby high-speed two-way IP communication can be executed by the half-duplex communication method or full-duplex communication method while maintaining compatibility with the conventional HDMI® cable.

As described above, one of a single or multiple pieces of data to be transmitted is selected as data to be transmitted, the selected data is transmitted to a communication partner via a predetermined signal line, one of a single or multiple pieces of data to be received, transmitted from the communication partner, is selected as data to be received, and the selected data is received, whereby compatibility serving as HDMI® is maintained between the HDMI® source 71 and the HDMI® sink 72, i.e., the pixel data of an uncompressed image can be transmitted from the HDMI® source 71 to the HDMI® sink 72 at high speed in one direction, and also high-speed two-way IP communication can be executed via the HDMI® cable 35.

As a result thereof, in the case that a source device which is an electronic device such as the playback device 33 in FIG. 2 or the like, having the HDMI® source 71 built-in, has a server function such as DLNA (Digital Living Network Alliance) or the like, and a sink device which is an electronic device such as the digital television receiver 31 in FIG. 2 or the like, having the HDMI® sink 72 built-in, has a communication interface for LAN such as Ethernet (Registered Trademark) or the like, for example, according to two-way IP communication via an electronic device such as the amplifier 32 connected directly or via an HDMI® cable, or the like, a content can be transmitted from the source device to the sink device via the HDMI® cable, and further, the content from the source device can be transmitted from the sink device to another device connected to the communication interface for LAN of the sink device (e.g., digital television receiver 34 in FIG. 2, or the like).

Further, according to two-way IP communication between the HDMI® source 71 and the HDMI® sink 72, a command or response for control can be exchanged at high speed between the source device having the HDMI® source 71 built-in, and the sink device having the HDMI® sink 72 built-in, which are connected with the HDMI® cable 35, thereby enabling control between devices having fast response.

The above series of processing can be executed not only by a dedicated hardware but also by software. In the case of executing the series of processing by software, a program making up the software thereof is installed in, for example, a microcomputer for controlling the HDMI® source 71 or HDMI® sink 72, or the like.

Figure 17:
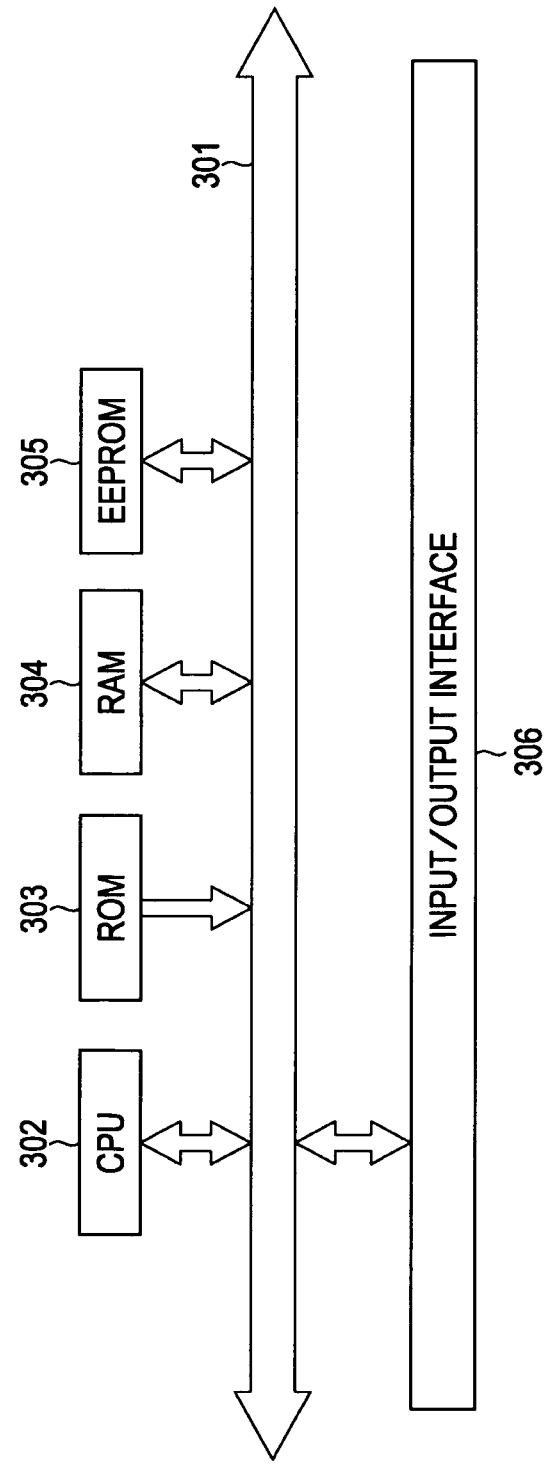
FIG. 17 is a block diagram illustrating a configuration example of an embodiment of a computer to which the present invention has been applied.

Therefore, FIG. 17 illustrates a configuration example of an embodiment of a computer in which the program for executing the above series of processing is installed.

The program may be recorded in EEPROM (Electrically Erasable Programmable Read-only Memory) 305 or ROM 303 serving as a recording medium built in the computer beforehand.

Alternatively, the program may be temporarily or permanently stored in a removable recording medium such as a flexible disk, CD-ROM (Compact Disc Read Only Memory), MO (Magnetic Optical) disk, DVD (Digital Versatile Disc), magnetic disk, semiconductor memory, or the like. Such a removable recording medium may be provided as so-called packaged software.

Note that the program may be transferred to the computer wirelessly via a satellite for digital satellite broadcasting from a download cite, or may be transferred to the computer by cable via a network such as a LAN, the Internet, or the like, in addition to being installed in the computer from a removable recording medium such as described above, and the computer may receive the program thus transferred at an input/output interface 306 to install this in the built-in EEPROM 305.

The computer has the CPU (Central Processing Unit) 302 built-in. The CPU 302 is connected to the input/output interface 306 via a bus 301, and the CPU 302 loads the program stored in the ROM (Read Only Memory) 303 or EEPROM 305 to RAM (Random Access Memory) 304, and executes this. Thus, the CPU 302 executes the processing in accordance with the above flowcharts, or processing executed with the configuration of the above block diagram.

Now, with the present Specification, the processing steps describing the program for causing the computer to execute various types of processing do not necessarily have to be processed in time-sequence following the order laid forth as flowcharts, and include processing executed in parallel or individually (e.g., parallel processing or processing by objects).

Also, the program may be processed by a single computer, or may be processed in a distributed manner by multiple computers.

Note that the present invention may be applied to, in addition to HDMI®, a communication interface made up of a transmission device configured to transmit the differential signal corresponding to the pixel data of one screen worth of an uncompressed image to a reception device in one direction using multiple channels during a valid image section that is a section obtained by removing a horizontal retrace section and a vertical retrace section from a section between one vertical synchronizing signal and the next vertical synchronizing signal, and the reception device configured to receive the differential signal transmitted from the transmission device with the multiple channels.

Also, with the present embodiment, though two-way IP communication has been executed by controlling data selecting timing, differential signal receiving timing, and transmission timing between the HDMI® source 71 and the HDMI® sink 72 as appropriate, two-way communication may be executed with a protocol other than IP.

Note that the embodiments of the present invention are not restricted to the above embodiment, and various modifications can be performed without departing from the essence of the present invention.

According to the above embodiment, two-way communication can be executed. Specifically, for example, with a communication interface capable of transmitting the pixel data of an uncompressed image, and audio data accompanying the image thereof at high speed in one direction, high-speed two-way communication can be executed while maintaining compatibility.

Incidentally, though there are portions overlapped with the already described techniques, many of video audio devices are installing a LAN communication function for a purpose such as two-way program viewing, advanced remote control, reception of an electronic program guide, or the like.

As means for forming the network thereof between video audio devices, there are choices such as laying of a dedicated cable such as CAT5, wireless communication, power line communication, and the like.

However, these choices have a disadvantage such that a dedicated cable makes connection between devices cumbersome and complicated, and wireless or power line connection makes a modulation circuit and a transmitter/receiver complicated and expensive.

Therefore, with the above embodiment, a technique for adding a LAN communication function to the HDM without adding a new connector electrode thereto has been disclosed.

HDMI is an interface for executing transmission of video and audio data, exchange and authentication of connected device information, and communication of device control data using a single cable, and accordingly, it is advantageous to enable LAN communication without using a dedicated cable, wireless, or the like, by adding a LAN function thereto.

Incidentally, with the technique disclosed as the above embodiment, a differential transmission path used for LAN communication is also used for exchange and authentication of connected device information, and communication of device control data.

With HDMI, the connected device electric property is strictly restrained in respect of parasitic capacitance or impedance regarding a DDC for executing exchange and authentication of connected device information, and CEC for executing communication of device control data.

Specifically, the DDC terminal parasitic capacitance of a device has to be equal to or smaller than 50 pF, and the DDC terminal has to be grounded with ground GND of which the impedance is 200Ω at the time of LOW output, and has to be pulled up with power supply of which the impedance is 2 kΩ or so in a HIGH state.

On the other hand, with LAN communication for propagating a high-speed signal, the transmission/reception terminal has to be terminated with 100Ω or so at least at a high-frequency band to stabilize communication. In order to satisfy the parasitic capacitance constraint of the DDC, LAN transmission and reception circuits to be added to the DDC line has to have AC connection via sufficient small capacitance, a LAN signal is attenuated greatly and subjected to distortion, and accordingly, there is a possibility that the transmission and reception circuits for compensating this may be complicated and high in cost.

Also, with the DDC communication, there is a possibility that transition between HIGH and LOW states may disturb LAN communication. That is to say, there is a possibility that the LAN may not function during a DDC communication period.

Therefore, description will be made below as a further suitable embodiment regarding a communication system having features wherein, with an interface for executing transmission of video and audio data, exchange and authentication of connected device information, communication of device control data, and LAN communication using a single cable, LAN communication is executed with two-way communication via one pair of differential transmission paths, and the connection state of the interface is notified with the DC bias potential of at least one of the transmission paths.

With the technique described below, the selecting unit does not necessarily have to be provided such as the above embodiment.

Figure 18:
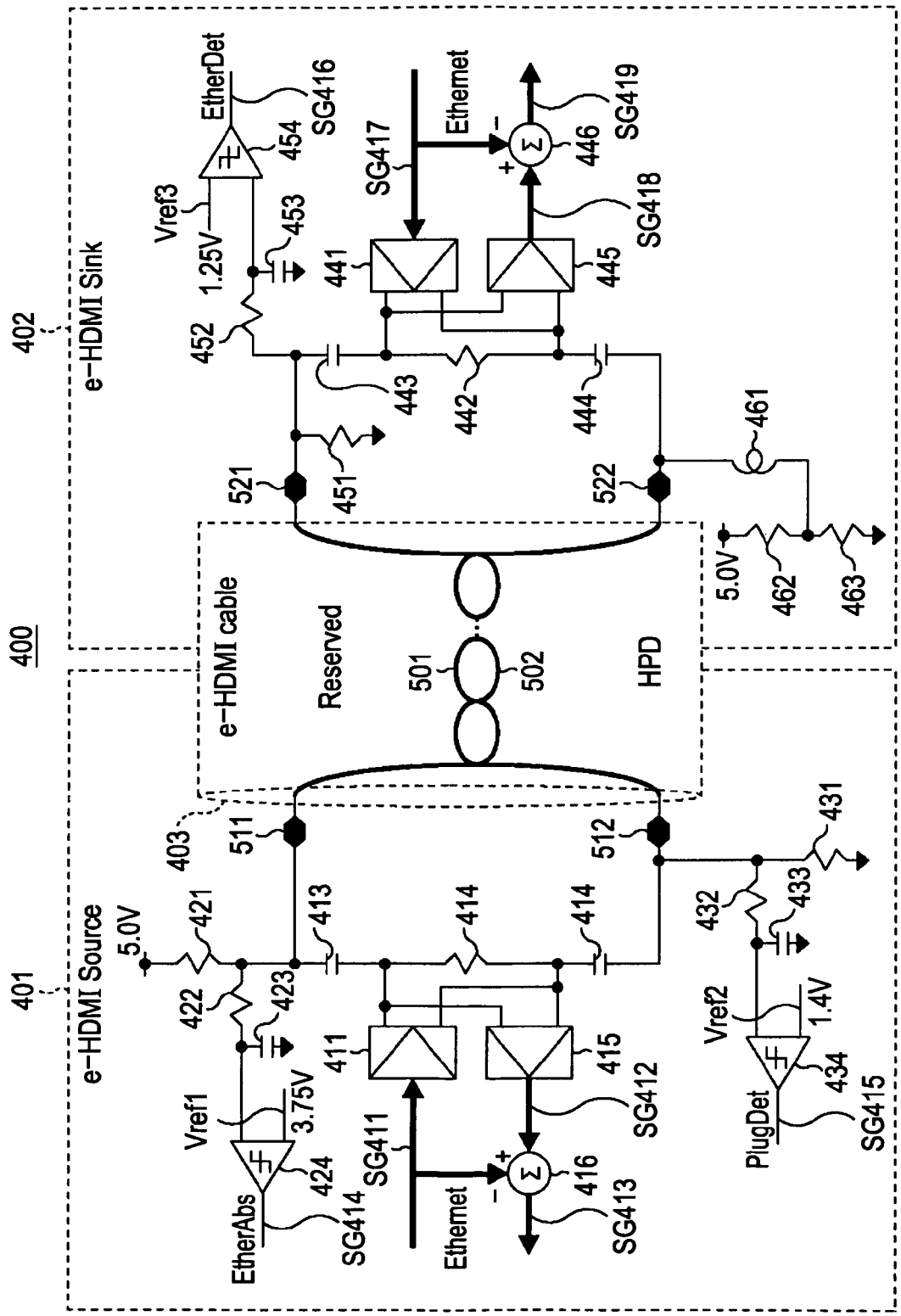
FIG. 18 is a circuit diagram illustrating a first configuration example of a communication system of which the interface connection state is notified with the DC bias potential of at least one of transmission paths.

FIG. 18 is a circuit diagram illustrating a first configuration example of a communication system of which the interface connection state is notified with the DC bias potential of at least one of the transmission paths.

Figure 19:
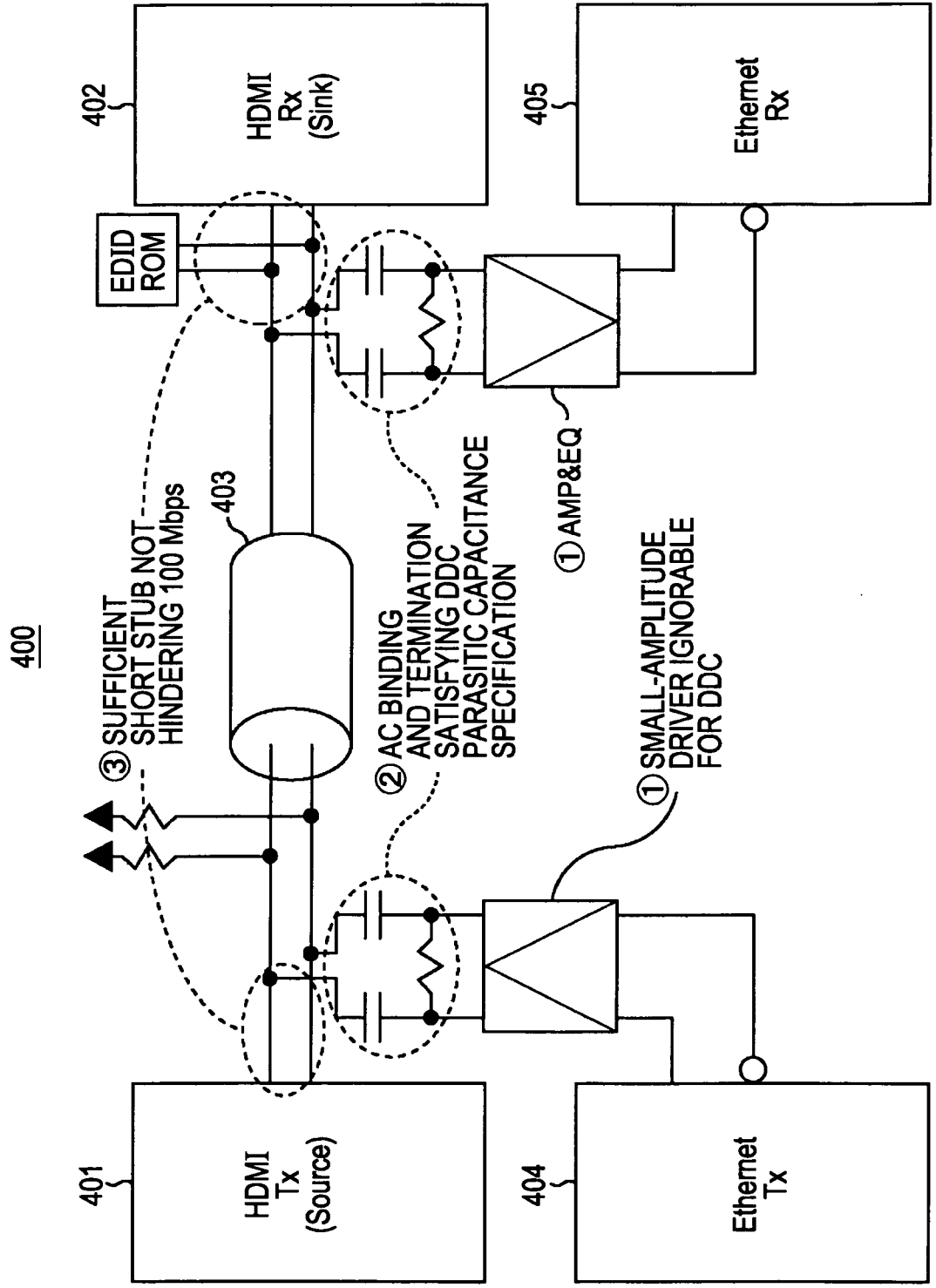
FIG. 19 is a diagram illustrating a configuration example of a system in the case of implementing Ethernet (Registered Trademark) (Ethernet (Registered Trademark)).

FIG. 19 is a diagram illustrating a configuration example of a system in the case of implementing Ethernet (Registered Trademark) (Ethernet (Registered Trademark)).

This communication system 400 is configured, such as shown in FIG. 18 and FIG. 19, so as to include a LAN expansion HDMI (hereafter, EH) source device 401, an EH sink device 402, an EH cable 403 for connecting an EH source device and an EH sink device, an Ethernet (Registered Trademark) transceiver 404, and an Ethernet (Registered Trademark) receiver 405.

The EH source device 401 includes a LAN signal transmission circuit 411, a terminating resistor 412, AC connection capacities 413 and 414, a LAN signal reception circuit 415, a subtracting circuit 416, a pull-up resistor 421, a resistor 422 and a capacitance 423 making up a low-pass filter, a comparator 424, a pull-down resistor 431, a resistor 432 and a capacitance 433 making up a low-pass filter, and a comparator 434.

The EH sink device 402 includes a LAN signal transmission circuit 441, a terminating resistor 442, AC connection capacities 443 and 444, a LAN signal reception circuit 445, a subtraction circuit 446, a pull-down resistor 451, a resistor 452 and a capacitance 453 making up a low-pass filter, a comparator 454, a choke coil 461, and resistors 462 and 463 serially connected between the power supply potential and the reference potential.

There is a differential transmission path made up of a reserved line 501 and an HPD line 502, the source-side terminal 511 of the reserved line 501 and the source-side terminal 312 of the HDP line 502, and the sink-side terminal 521 of the reserved line 501 and the sink-side terminal 522 of the HDP line are formed, within the EH cable 403. The reserved line 501 and the HPD line 502 are connected as a differential twist pair.

With the communication system 400 thus configured, the terminal 511 and the terminal 512 are connected to the terminating resistor 412, LAN signal transmission circuit 411, and LAN signal reception circuit 415 via the AC connection capacities 413 and 414 within the source device 401.

The subtracting circuit 416 receives a sum signal SG412 of a transmission signal voltage that the current output from the LAN signal transmission circuit 411 generates with the terminating resistor 412 and the transmission paths 501 and 502 as load, and a reception signal voltage that is a signal transmitted from the EH sink device 402.

With the subtracting circuit 4165, a signal SG413 obtained by subtracting a transmission signal SG411 from the sum signal SG412 is a net signal transmitted from the sink.

There is a similar circuit network within the sink device 402, and the source device 4011 and the sink device 4022 execute two-way LAN communication using these circuits.

Also, the HDP line 502 notifies the source device 401 that the cable 403 is connected to the sink device 402 with a DC bias level in addition to the above LAN communication.

Upon the cable 403 being connected to the sink device 402, the resistors 462 and 463 and the choke coil 461 within the sink device 402 bias the HDP line 502 to around 4 V via the terminal 522.

The source device 401 extracts the DC bias of the HPD line 502 at the low-pass filter made up of the resistor 432 and the capacitance 433, and compares this with a reference potential Vref2 (e.g., 1.4 V) at the comparator 434.

In the event that the cable 403 is not connected to the source device 402, the potential of the terminal 512 is lower than the reference potential Vref2 at the pull-down resistor 431, and in the event of being connected, the potential thereof is higher than the reference potential Vref2.

Accordingly, in the event that the output signal SG415 of the comparator 434 is HIGH, this indicates that the cable 403 is connected to the sink device 402.

On the other hand, in the event that the output signal SG415 of the comparator 434 is LOW, this indicates that the cable 403 is not connected to the sink device 402.

The present first configuration example further has a function for mutually recognizing whether the device connected to both ends of the cable 4033 with the DC bias potential of the reserved line 501 is an EH-compatible device or incompatible HDMI device.

The EH source device 401 pulls up the reserved line 501 with the resistor 421 (+5V), and the EH sink device 402 pulls down this with the resistor 451.

These resistors 421 and 451 are not included in an EH-incompatible device.

The EH source device 401 compares the DC potential of the reserved line 501 passed through the low-pass filter made up of the resistor 422 and the capacitance 423 with the reference voltage Vref1 at the comparator 424.

When the sink device 402 is compatible with EH and has pull-down, the potential of the reserved line 501 is 2.5 V, and when the sink device 402 is incompatible and open, the potential is 5 V, and accordingly, compatibility/incompatibility of the sink device can be recognized if the reference voltage Vref1 is set to 3.75 V.

The sink device 402 compares the DC potential of the reserved line 501 passed through the low-pass filter made up of the resistor 452 and the capacitance 453 with a reference voltage Vref3 at the comparator 454.

In the event that the source device 402 is compatible with EH and has a pull-up function, the DC potential of the reserved line 501 is 2.5 V, and in the event of incompatible, is 0 V, and accordingly, EH-compatibility/incompatibility of the source device can be recognized if the reference potential is set to 1.25 V.

Thus, according to the present first configuration example, with an interface for executing transmission of video and audio data, exchange and authentication of connected device information, communication of device control data, and LAN communication using a single cable 403, LAN communication is executed with two-way communication via one pair of differential transmission paths, and the connection state of the interface is notified with the DC bias potential of at least one of the transmission paths, and accordingly, spatial separation using neither the SCL line nor the SDA line for the sake of LAN communication physically can be executed.

As a result thereof, a circuit for LAN communication can be formed according to the separation thereof regardless of electrical standards stipulated regarding the DDC, and stable sure LAN communication can be realized inexpensively.

Figure 20:
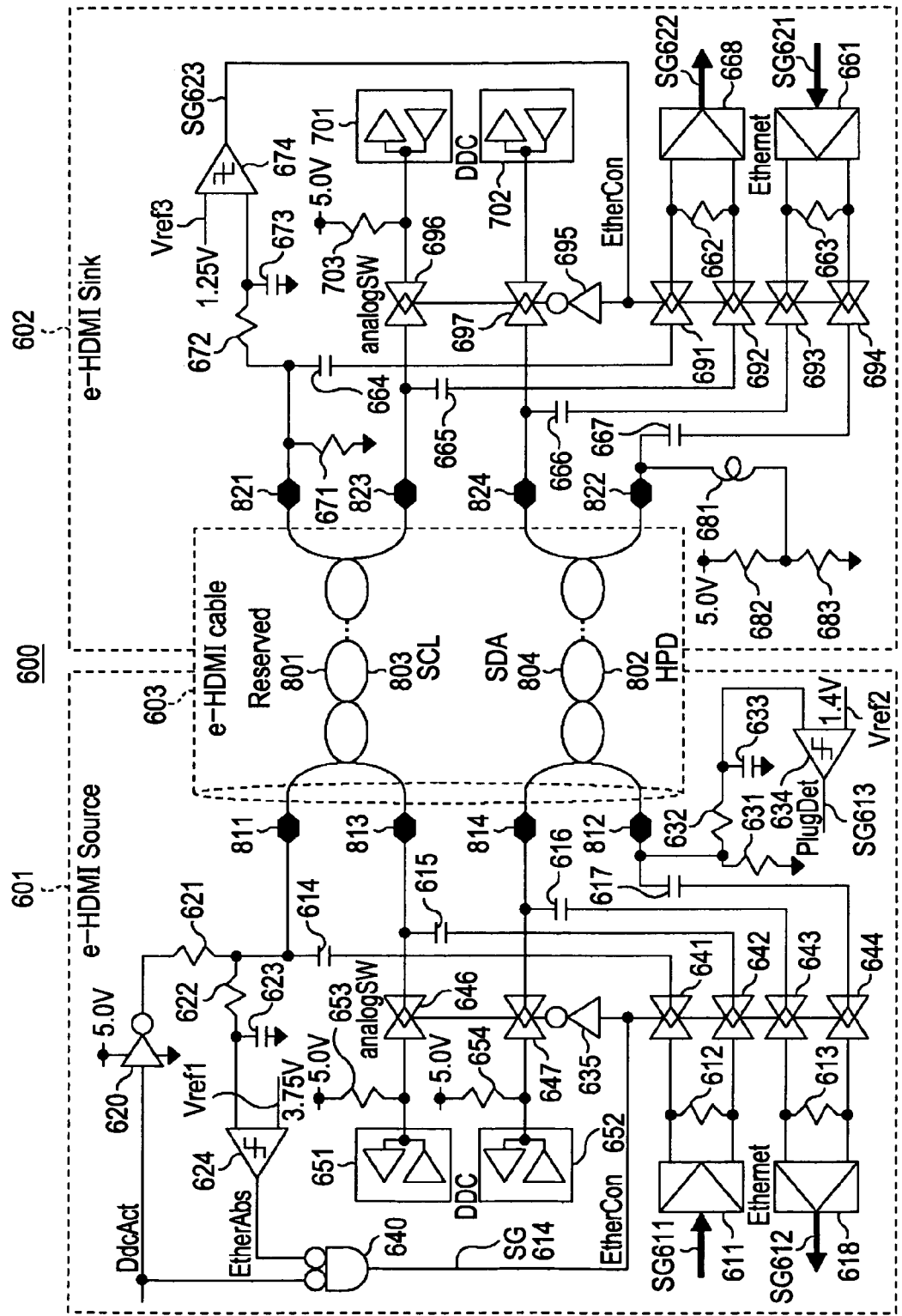
FIG. 20 is a circuit diagram illustrating a second configuration example of a communication system to which the connection state of an interface is notified with the DC bias potential of at least one of transmission paths.

FIG. 20 is a circuit diagram illustrating a second configuration example of a communication system wherein the connection state of the interface is notified with the DC bias potential of at least of the transmission paths.

This communication system 600 has, basically similar to the first configuration example, a configuration wherein, with an interface for executing transmission of video and audio data, exchange and authentication of connected device information, communication of device control data, and LAN communication using a single cable, LAN communication is executed with one-way communication via two pairs of differential transmission paths, and the connection state of the interface is notified with the DC bias potential of at least one of the transmission paths, and further, has a feature wherein at least two transmission paths are used for communication of exchange and authentication of connected device information in a manner time-sharing with LAN communication.

This communication system 600 is configured so as to include a LAN function expansion HDMI (hereafter, EH) source device 601, an EH sink device 602, and an EH cable 603 for connecting an EH sink device and an EH sink device.

The EH source device 601 includes a LAN signal transmission circuit 611, terminating resistors 612 and 613, AC connection capacities 614 through 617, a LAN signal reception circuit 618, an inverter 620, a resistor 621, a resistor 622 and a capacitance 623 making up a low-pass filter, a comparator 624, a pull-down resistor 631, a resistor 632 and a capacitance 633 making up a low-pass filter, a comparator 634, a NOR gate 640, analog switches 641 through 644, an inverter 645, an analog switch 646 and 747, DDC transceivers 651 and 652, and pull-up resistors 653 and 654.

The EH sink device 602 includes a LAN signal transmission circuit 661, terminating resistors 662 and 663, AC connection capacities 664 through 667, a LAN signal reception circuit 668, a pull-down resistor 671, a resistor 672 and a capacitance 673 making up a low-pass filter, a comparator 674, a choke coil 681, resistors 682 and 683 serially connected between the power supply potential and the reference potential, analog switches 691 through 694, an inverter 695, analog switches 696 and 697, DDC transceivers 701 and 702, and pull-up resistors 703 and 704.

There is a differential transmission path made up of a reserved line 801 and an SCL line 803, and a differential transmission path made up of an SDA line 804 and an HDP line 802, and the source-side terminal 811 through 814 thereof, and the sink-side terminals 821 through 824 are formed, within the EH cable 603.

The reserved line 801 and the SCL line 803, and the SDA line 804 and the HPD line 802 are connected as a differential twist pair.

With the communication system 600 thus configured, the terminals 811 and 813 are connected to the transmission circuit 611 for transmitting a LAN transmission signal SG611 to the sink, and the terminating resistor 612 via the AC connection capacities 614 and 605 and the analog switches 641 and 642 within the source device 603.

The terminals 814 and 812 are connected to the reception circuit 618 for receiving the LAN signal from the sink device 602, and the terminating resistor 613 via the AC connection capacities 616 and 617, and the analog switches 6433 and 644.

The terminals 821 through 824 are connected to the transmission and reception circuits 668 and 661 and the terminating resistors 662 and 663 via the AC connection capacities 664, 665, 666, and 667, and the analog switches 691 through 694 within the sink device 602.

The analog switches 641 through 644, and 691 through 694 are electrically conducted when executing LAN communication, and are opened when executing DDC communication.

The source device 601 connects the terminal 813 and the terminal 814 to the DDC transceivers 651 and 652, and the pull-up resistors 653 and 654 via other analog switches 646 and 647.

The sink device 602 connects the terminal 823 and the terminal 824 to the DDC transceivers 701 and 702, and the pull-up resistor 703 via the analog switches 696 and 697.

The analog switches 646 and 647 are electrically conducted when executing DDC communication, and are opened when executing DLAN communication.

The EH-compatible device recognizing mechanism according to the potential of the reserved line 801 is basically the same as with the case of the first configuration example except that the resistor 62 of the source device 601 is driven by the inverter 620.

The resistor 621 becomes a pull-down resistor when the input of the inverter 620 is HIGH, and accordingly, this goes into the same 0 V state as with the case of being connected to an EH-incompatible device as viewed from the sink device 602.

As a result thereof, a signal SG623 indicating the EH-compatibility determination result of the sink device 602 becomes LOW, the analog switches 691 through 694 controlled by the signal SG623 are opened, and the analog switches 696 and 697 controlled by a signal obtained by inverting the signal SG623 at the inverter 695 are electrically conducted.

As a result thereof, the sink device 602 separates the SCL line 803 and the SDA line 804 from the LAN transmitter and receiver, and goes into a state of being connected to the DDC transmitter and receiver.

On the other hand, with the source device 601, the input of the inverter 620 is also input to the NOR gate 640 to set an output SG614 thereof to LOW.

The analog switches 641 through 644 controlled by the output signal SG614 of the NOR gate 640 are opened, and the analog switches 646 and 647 controlled by a signal obtained by inverting the signal SG614 at the inverter 645 are electrically conducted.

As a result thereof, the source device 601 also separates the SCL line 803 and the SDA line 804 from the LAN transmitter and receiver, and goes into a state of being connected to the DDC transmitter and receiver.

Conversely, when the input of the inverter 620 is LOW, the source device 601 and the sink device 602 separate the SCL line 803 and the SDA line 804 from the DDC transmitter and receiver, and go into a state of being connected to the LAN transmitter and receiver.

The circuits 631 through 634, and 681 through 683 for confirming connection according to the DC bias potential of the HPD line 802 have the same function as those in the first configuration example.

Specifically, the HPD line 802 notifies the source device 601 that the cable 803 has been connected to the sink device 602 with a DC bias level in addition to the above LAN communication.

Upon the cable 803 being connected to the sink device 602, the resistors 682 and 683 and the choke coil 681 within the sink device 602 bias the HPD line 802 to around 4 V via the terminal 822.

The source device 601 extracts the DC bias of the HPD line 802 at the low-pass filter made up of the resistor 632 and the capacitance 633, and compares this with the reference potential Vref2 (e.g., 1.4 V) at the comparator 634.

In the event that the cable 803 is not connected to the source device 602, the potential of the terminal 812 is lower than the reference potential Vref2 with the pull-down resistor 631, and in the event of being connected, the potential of the terminal 812 is higher than the reference potential Vref2.

Accordingly, in the event that the output signal SG613 of the comparator 634 is HIGH, this indicates that the cable 803 and the sink device 602 are connected.

On the other hand, in the event that the output signal SG613 of the comparator 634 is LOW, this indicates that the cable 803 and the sink device 602 are not connected.

Thus, according to the present second configuration example, an arrangement is provided wherein, with an interface for executing transmission of video and audio data, exchange and authentication of connected device information, communication of device control data, and LAN communication using a single cable, LAN communication is executed with one-way communication via two pairs of differential transmission paths, and the connection state of the interface is notified with the DC bias potential of at least one of the transmission paths, and further, at least two transmission paths are used for communication of exchange and authentication of connected device information in a manner time-sharing with LAN communication, whereby time sharing for dividing time into a time zone for connecting the SCL line and the SDA line to the LAN communication circuit by the switches, and a time zone for connecting the SCL line and the SDA line to the DDC circuit, can be executed, circuits for LAN communication can be formed regardless of electrical standards stipulated regarding the DDC according to this division, and stable sure LAN communication can be realized inexpensively.

As described above, with the embodiment correlated with FIG. 2 through FIG. 17, full-duplex communication is realized wherein one-way communication is executed with SDA and SCL of HDMI 19 poles as a first differential pair, and one-way communication is executed with CEC and Reserved as a second pair.

However, communication is executed with SDA and SCL wherein H is 1.5 kΩ pull-up, and L is low-impedance pull-down, and with CEC and H wherein H is 27 kΩ pull-up, and L is low-impedance pull-down.

Maintaining such functions while having compatibility with the existing HDMI may have difficulty in sharing a LAN function for executing high-speed data communication necessary for subjecting the terminations of a transmission line to matching termination.

Therefore, with the first configuration example, an arrangement has been made wherein full-duplex communication by one pair two-way communication is executed with Reserved and HPD as a differential pair by avoiding use of the SDA, SCL, and CEC lines.

HPD is a flag signal according to a DC level, and accordingly, both of infusion of a LAN signal according to AC connection, and transmission of plug information according to a DC level hold. A function for mutually recognizing that the terminal has a LAN function according to a DC level using a method similar to HPD is added to Reserved anew.

With the second configuration example, an arrangement is made wherein two-pair full-duplex communication for executing one-way communication is executed with each of two-pair differential pairs made up of HPD, SDA, SCL, and Reserved.

With HDMI, DDC communication in a burst manner according to SDA and SCL is executed wherein the transmitter becomes the master, and controls the timing thereof.

With this example, when the transmitter executes DDC communication, the analog switches are operated so as to connect the SDA, SCL lines to the transceiver for DDC, and when the transmitter does not execute DDC communication, the analog switches are operated so as to connect the lines to the transceiver for LAN.

This switch operation signal is transmitted to the receiver with the DC level of the Reserved line, and the same switch switching is executed on the receiver side.

The above arrangement is employed, whereby, as a first advantage, the SCL, SDA, and CEC communication do not receive noise due to LAN communication, and stable DDC and CEC communication can be secured constantly.

With the first configuration example, this is achieved by separating LAN from these lines physically, and with the second configuration example, this is achieved by disconnecting the LAN signal from the lines during DDC communication using the switches.

As a second advantage, LAN communication is executed with a line having ideal terminations, whereby stable communication with a large margin can be executed.

This is because, with the first configuration example, the LAN signal is superimposed on the lines of Reserved and HPD where only a DC level is transmitted, and accordingly, termination impedance can be held with an ideal value over sufficient wide frequencies necessary for LAN communication, and with the second configuration example, a termination circuit for LAN which is not activated at the time of DDC communication is connected only when executing LAN communication.

FIG. 21(A) through (E) are diagrams illustrating a two-way communication waveform according to the communication system of the present configuration example.

FIG. 21(A) illustrates a signal waveform transmitted from the EH source device, FIG. 21(B) illustrates a signal waveform received at the EH sink device, FIG. 21(C) illustrates a signal waveform passing through a cable, FIG. 21(D) illustrates a signal received at the EH source device, and FIG. 21(E) illustrates a signal waveform transmitted from the EH source device, respectively.

Figure 21:
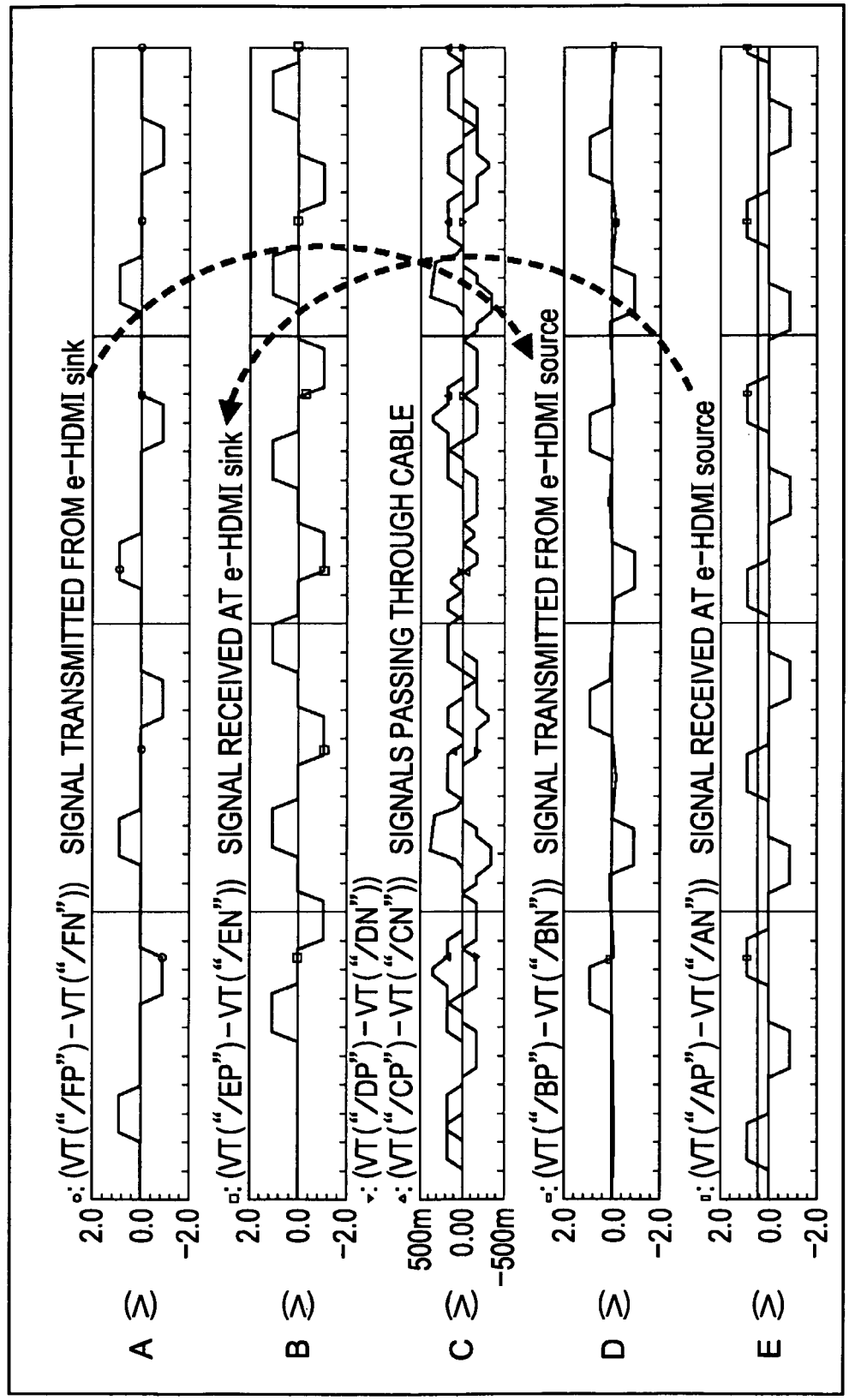
FIG. 21 is a diagram illustrating two-way communication waveforms with the communication system of the configuration example.

Such as shown in FIG. 21, according to the present configuration example, excellent two-way communication can be realized.

[Second Embodiment] With a system including multiple devices to be connected by using HDMI and Ethernet (Registered Trademark) together, a method for calculating the address of Ethernet (Registered Trademark) based on the unique address of each of the devices assigned at the time of HDMI connection, and the system employing this will be described below.

FIG. 22 is a diagram illustrating a system including multiple devices to be connected by using HDMI and Ethernet (Registered Trademark) together. This system is configured of a device 901 through a device 904. With the device 901, an HDMI terminal 911 and an Ethernet (Registered Trademark) terminal 912 which make up a pair, an Ethernet (Registered Trademark) terminal 913, and an HDMI terminal 914 and an Ethernet (Registered Trademark) terminal 915 which make up a pair, are provided.

Also, with the device 902, an HDMI terminal 916 and an Ethernet (Registered Trademark) terminal 917 which make up a pair, is provided. The HDMI terminal 916 of the device 902, and the HDMI terminal 911 of the device 901 are connected with a cable or the like, and the Ethernet (Registered Trademark) terminal 917 of the device 902, and the Ethernet (Registered Trademark) terminal 912 of the device 901 are connected with a cable or the like.

Further, with the device 904, an Ethernet (Registered Trademark) terminal 918 is provided, and this Ethernet (Registered Trademark) terminal 918 is connected to the Ethernet (Registered Trademark) terminal 913 of the device 901 with a cable or the like. Further, an HDMI terminal 919 and an Ethernet (Registered Trademark) terminal 920 which make up a pair are provided. The HDMI terminal 919 of the device 903, and the HDMI terminal 914 of the device 901 are connected with a cable or the like, and the Ethernet (Registered Trademark) terminal 920 of the device 903, and the Ethernet (Registered Trademark) terminal 915 of the device 901 are connected with a cable or the like.

Incidentally, with devices connected with HDMI, there is a function for exchanging a command message called CEC, Physical Address to be stored in an HDMI VSDB is used for determining the transmission side and the reception side thereof. This will be quoted from HDMI spec. 1.3a (High-Definition Multimedia Interface Specification Version 1.3a), and the structure thereof will be shown below.

8.3.2 HDMI Vendor-Specific Data Block (HDMI VSDB)

The first CEA Extension shall include an HDMI Vendor Specific Data Block (HDMI VSDB) shown in Table 8-6. This is a CEA-861-D Vendor Specific Data Block (see CEA-861-D section 7.5.4 for details) containing a 24-bit IEEE Registration Identifier of 0x000C03, a value belonging to HDMI Licensing, LLC.

Sinks shall contain an HDMI VSDB minimally containing a 2-byte Source Physical Address field following the 24-bit identifier. An HDMI VSDB may have zero or more extension fields as shown in Table 8-6. The minimum value of N (length) is 5 and the maximum value of N is 31. A Sink that supports any function indicated by an extension field shall use an HDMI VSDB with a length sufficient to cover all supported fields.

The Source shall have the ability to handle an HDMI VSDB of any length. In future specifications, new fields may be defined. These additional fields will be defined such that a zero value indicates the same characteristics as is indicated if the field was not present. Source should use the length field to determine which extension fields are present, and shall process the HDMI VSDB with no regard to non-zero values in fields defined as Reserved in this specification.

Now, FIG. 23 is a diagram illustrating Table 8-6 with the above HDMI spec. 1.3a. That is to say, FIG. 23 is a diagram illustrating HDMI VSDB. In FIG. 23, Physical Addresses are denoted with A, B, C, and D.

Specifically, let us say that the first CEA extension includes HDMI Vendor-specific Data Block (HDMI VSDB) shown in Table 8-6 (FIG. 23). This is CEA-A-861-D Vendor-specific Data Block including a 24-bit IEEE registration identifier of 0x000C03, which is a value belonging to HDMI Licensing, LLC (see CEA-861-D section 7.5.4 with regard to the details).

Let us say that sinks include an DHMI VSDB minimally including a 2-byte Source Physical Address field following the 24-bit identifier. An HDMI VSDB may have zero or more extension field such as shown in Table 8-6 (FIG. 23). The minimum value of N (length) is 5, and the maximum value of N is 31. Let us say that a sink supporting any function indicated with an extension field shall use an HDMI VSDB with a length sufficient for covering all the fields to be supported.

Let us say that sources have capability to handle an HDMI VSDB of any length. With future specifications, new fields may be defined. These additional fields will be defined such that a zero value indicates the same characteristics as is indicated if the field was not present. Sources have to use the length field to determine which extension field is present, and let us say that sources process an HCMI VSDB regardless of values other than zero in fields defined as Reserved in the present specification.

Next, a method for determining this Physical Address will be shown below by quoting HDMI spec. 1.3a.

8.7 Physical Address 8.7.1 Overview

In order to allow CEC to be able to address specific physical devices and control switches, all devices shall have a physical address. This connectivity has to be worked out whenever a new device is added to the cluster. The physical address discovery process uses only the DDC/EDID mechanism and applies to all HDMI Sinks and Repeaters, not only to CEC-capable devices.

The CEC and DDC connections are shown in FIG. 8-1.

The CEC line is directly connected to all nodes on the network.

After discovering their own physical address, the CEC devices transmit their physical and logical addresses to all other devices, thus allowing any device to create a map of the network.

8.7.2 Physical Address Discovery

The physical address of each node is determined through the physical address discovery process. This process is dynamic in that it automatically adjusts physical addresses as required as devices are physically or electrically added or removed from the device tree.

All Sinks and Repeaters shall perform the steps of physical address discovery and propagation even if those devices are not CEC-capable. Sources are not required to determine their own physical address unless they are CEC-capable.

All addresses are 4 digits long allowing for a 5 device-deep hierarchy. All are identified in the form of n.n.n.n in the following description. An example of this is given in FIG. 8-3.

A Sink or Repeater that is acting as the CEC root device will generate its own physical address: 0.0.0.0. A source or a Repeater reads its physical address from the EDID of the connected Sink. The CEC line may be connected to only the HDMI output so a device with multiple HDMI outputs will read its physical address from the EDID on the CEC-connected output. Each Sink and Repeater is responsible for generating the physical address of all Source devices connected to that device by appending a port number onto its own physical address and placing that value in the EDID for that port. The Source Address Field of the HDMI Vendor Specific Data Block (see Section 8.3.2) is used for this purpose.

Note that the values shown in the figures below represent the physical addresses for the devices themselves, not the Source physical addresses stored in the EDID within that device. In fact, for all devices shown, except the TV, those physical addresses are stored in the EDID of the connected Sink. An example is shown for the TV at physical address 0.0.0.0.

8.7.3 Discovery Algorithm

The following algorithm is used to allocate the physical address of each device whenever HPD is de-asserted or upon power-up:

```
Disable assertion of HPD to all source devices
If I am CEC root
    Set my_address to 0.0.0.0
Else
    Wait for HPD from sink
    Query sink for my_address of my connection (Section 8.7.4)
    The device shall retain this physical address until HPD is
        removed (or the device is powered off).
End if
If device has connections for source devices then
    Label all possible connections to source devices uniquely starting
        From connection_label = 1 to the number of source input connections
            If device has separate EDIDs for each source connection then
                If my_address ends with 0 then
                    Set each source_physical_address to my_address with the
                        first 0 being replaced with connection_label.
                Else (i.e. beyond the fifth layer of the tree)
                    Set each source_physical_address to F.F.F.F
                End if
            Else
                Set each source_physical_address to my_address
            End if
            Write source_physical_address to HDMI VSDB in EDID for each source
                connection
End if
```

Allow HPD to be asserted for source devices 8.7.4 HDMI Sink Query

A Source shall determine its physical address (my_address) by checking the HDMI Vendor Specific Data Block (see Section 8.3.2) within the EDID. The fourth and fifth bytes of this 5 byte structure contain the Source Physical Address (fields A, B, C, D).

Figure 25:
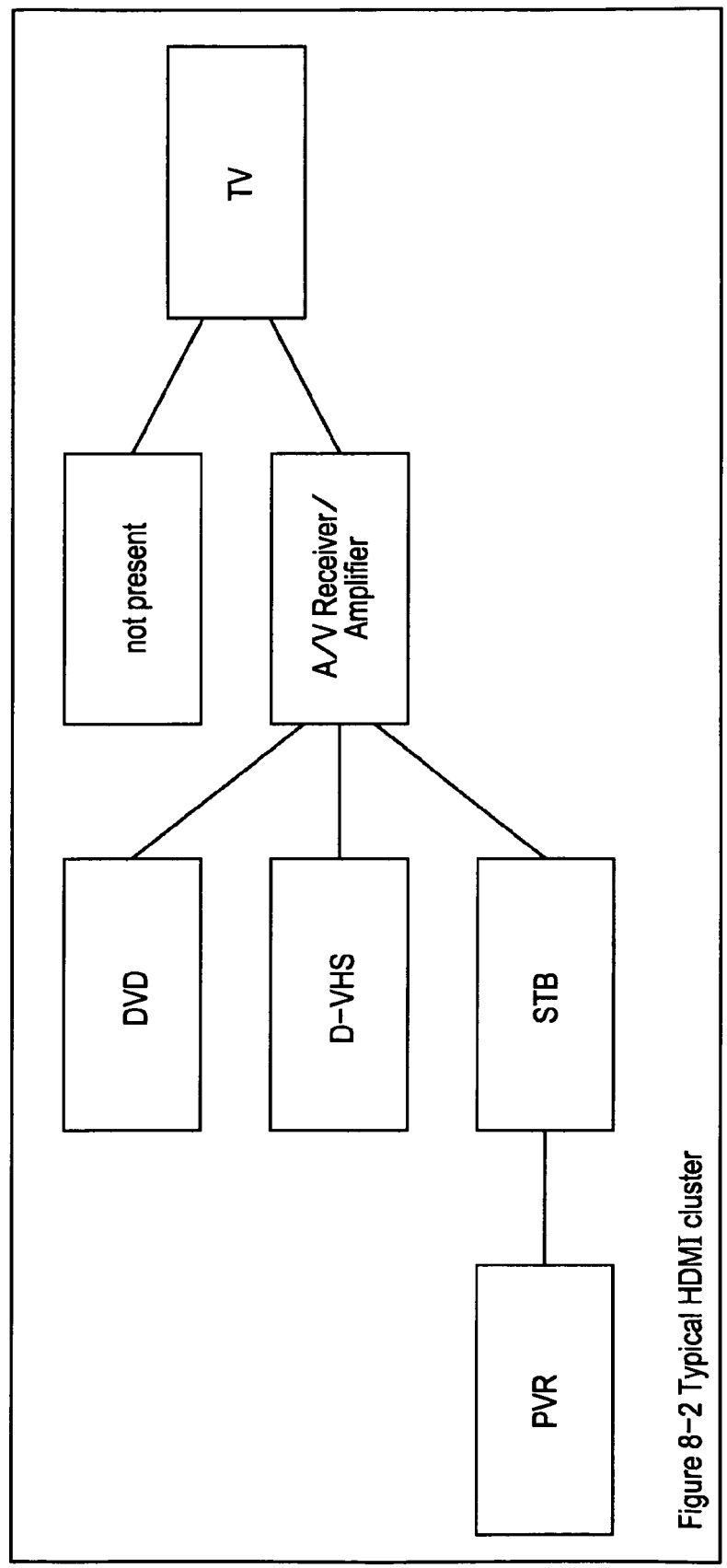
FIG. 25 is a diagram illustrating HDMI cluster.
Figure 26:
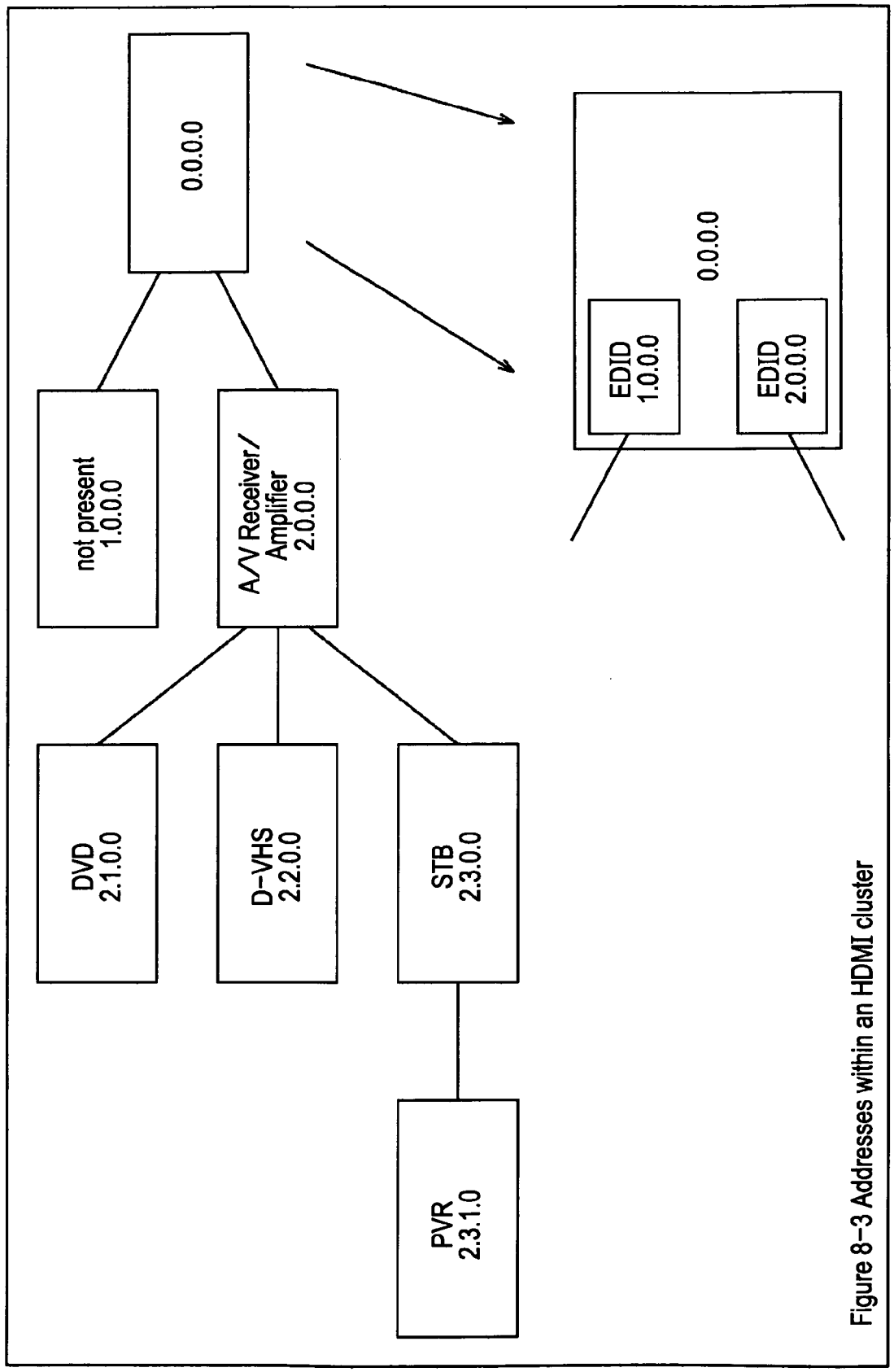
FIG. 26 is a diagram illustrating HDMI cluster.

Now, FIG. 24 is a diagram illustrating "FIG. 8-1" in the above HDMI spec. 1.3a. That is to say, FIG. 24 is a diagram illustrating connection of CEC and DDC. Also, FIG. 25 is a diagram illustrating "FIG. 8-2" in the HDMI spec. 1.3a, i.e., a diagram illustrating HDMI cluster. Further, FIG. 26 is a diagram illustrating "FIG. 8-3" in the HDMI spec. 1.3a, i.e., a diagram illustrating HDMI cluster.

In order to allow CEC to be able to address specific physical devices and control switches, all devices shall have a physical address. This connectivity has to be taken into consideration regardless of whether or not a new device is added to the cluster. The physical address discovery process uses only the DDC/EDID mechanism and applies to all HDMI Sinks and Repeaters, not only to CEC-capable devices. The CEC and DDC connections are shown in FIG. 24. The CEC line is directly connected to all the nodes on the network. After discovering their own physical address, the CEC devices transmit their physical and logical addresses to all other devices, thus allowing any device to create a map of the network.

Also, the physical address of each node is determined with the physical address discovery process. This process is dynamic in that it automatically adjusts the physical address as required such that devices are physically or electrically added or removed from the device tree. Let us say that all Sinks and Repeaters execute the steps of physical address discovery and propagation even if those devices are not CEC-capable. Sources are not required to determine their own physical addresses unless they are CEC-capable.

All addresses are 4 digits long allowing for a 5-device-depth hierarchy. All are identified in the form of n.n.n.n in the following description. An example of this is given in FIG. 26.

A Sink or Repeater that is acting as the CEC root device will generate its own physical address: 0.0.0.0. A source or a Repeater reads its physical address from the EDID of the connected Sink. The CEC line may be connected to only a single HDMI output so a device with multiple HDMI outputs will read its physical address from the EDID on the CEC-connected output. Each Sink and Repeater is responsible for generating the physical addresses of all Source devices connected to that device by appending a port number onto its own physical address and placing that value in the EDID for that port. The Source Address Field of the HDMI Vendor Specific Data Block (see Section 8.3.2) is used for this purpose.

Note that the values shown in the FIG. 26 represent the physical addresses for the devices themselves, not the Source physical addresses stored in the EDID within that device. In fact, for all devices shown, except the TV, those physical addresses are stored in the EDID of the connected Sink. An example is shown for the TV at physical address 0.0.0.0.

Further, the above algorithm is used to allocate the physical address of each device whenever HPD is de-asserted or upon power-up.

Let us say that a Source determines its physical address (my_address) by checking the HDMI Vendor-Specific Data Block within the EDID (see Section 8.3.2). The fourth and fifth bytes of this 5-byte structure include the source physical address (fields A, B, C, D).

Also, with CEC, a logical address is determined such as the following based on the physical address obtained here. Hereafter, a method for determining a logical address will be shown by quoting the HDMI Spec. 1.3a.

CEC is a protocol based on a bus system and therefore cannot alone ascertain the physical connectivity of the network. The mechanism defined in section 8.7 uses DDC to allocate physical addresses to devices in the network.

All CEC devices therefore have both a physical and logical address, whereas non-CEC devices only have a physical address.

CEC 10.1 Physical Address Discovery

The algorithm defined in 8.7.3 is used to allocate the physical address of each device.

Whenever a new physical address (other than F.F.F.F) is discovered, a CEC device shall:

allocate the logical address (see CEC 10.2.1)

report the association between its logical and physical addresses by broadcasting <Report Physical Address>.

This process allows any node to create a map of physical connections to logical addresses.

CEC 10.2 Logical Addressing

Each device appearing on the control signal line has a logical address which is allocated to only one device in the system. This address defines a device type as well as being a unique identifier. These are specified in CEC Table 5.

If a physical device contains the functions of more than one logical device then it should take the logical addresses for each of those logical devices. For example, a if a DVD recorder has a tuner, it may take one of the addresses 3, 6, 7, or 10 (Tuner) in addition to one of 1, 2, or 9 (Recording Device).

It is allowed for a device to declare the functionality of another device by using a different logical address. For example, a recordable DVD device may take the address 4 or 8 to expose only the functionality of a standard DVD Playback Device. In this case, the recording functionality will not be available or controllable via CEC.

A Recording Device with addresses 1, 2, or 9 (Recording Device) shall not also take a Playback Device address as the playback functionality is also included in the recorder functionality.

If a device has multiple instances of a particular functionality, it should advertise only one instance. For instance, if a device has multiple tuners, it should only expose one for control via CEC. In this case, it is up to the device itself to manage multiple tuners.

A device shall advertise a function with a Logical Address, such as a Tuner, only if it supports at least the mandatory for that function.

CEC 10.2.1 Logical Address Allocation

Note that a logical address should only be allocated when a device has a valid physical address (i.e., not F.F.F.F), at all other times a device should take the Unregistered' logical address (15).

Only the device at physical address 0.0.0.0 may take logical address TV(0). A TV at any other physical address shall take the Free Use'(14) address. If address 14 is already allocated it shall take the Unregistered' address (15).

Reserved addresses shall not be used at present and are reserved for future extensions to this specification.

Where more than one possible logical address is available for the given device type (e.g. Tuner 1, Tuner 2, etc.), an address allocation procedure shall be carried out by a newly connected device. The device takes the first allocated address for that device type and sends a <Polling Message> to the same address (e.g. Tuner 1→Tuner 1). If the <Polling Message> is not acknowledged, then the device stops the procedure and retains that address.

If the first address is acknowledged, then the device takes the next address for that device type and repeats the process (e.g. Tuner 2→Tuner 2). Again, if the message is not acknowledged, the device keeps that address.

This procedure continues until all possible type specific' addresses have been checked; if no type specific' addresses are available, the device should take the unregistered address (15). Note that several physical devices might be sharing this address.

A device may lose its logical address when it is disconnected or switched off. However, it may remember its previous logical address, so that the next time it is reconnected or switched on, it can begin the polling process at its previous logical address and try each other allowable logical address in sequence before taking the unregistered address. For example, if an STB that was previously allocated address Tuner 2 is reconnected, it would poll Tuner 2, Tuner 3, Tuner 4 and Tuner 1 before taking the unregistered address.

If a device loses its physical address at any time (e.g. it is unplugged) then its logical address should be set to unregistered (15).

Figure 28:
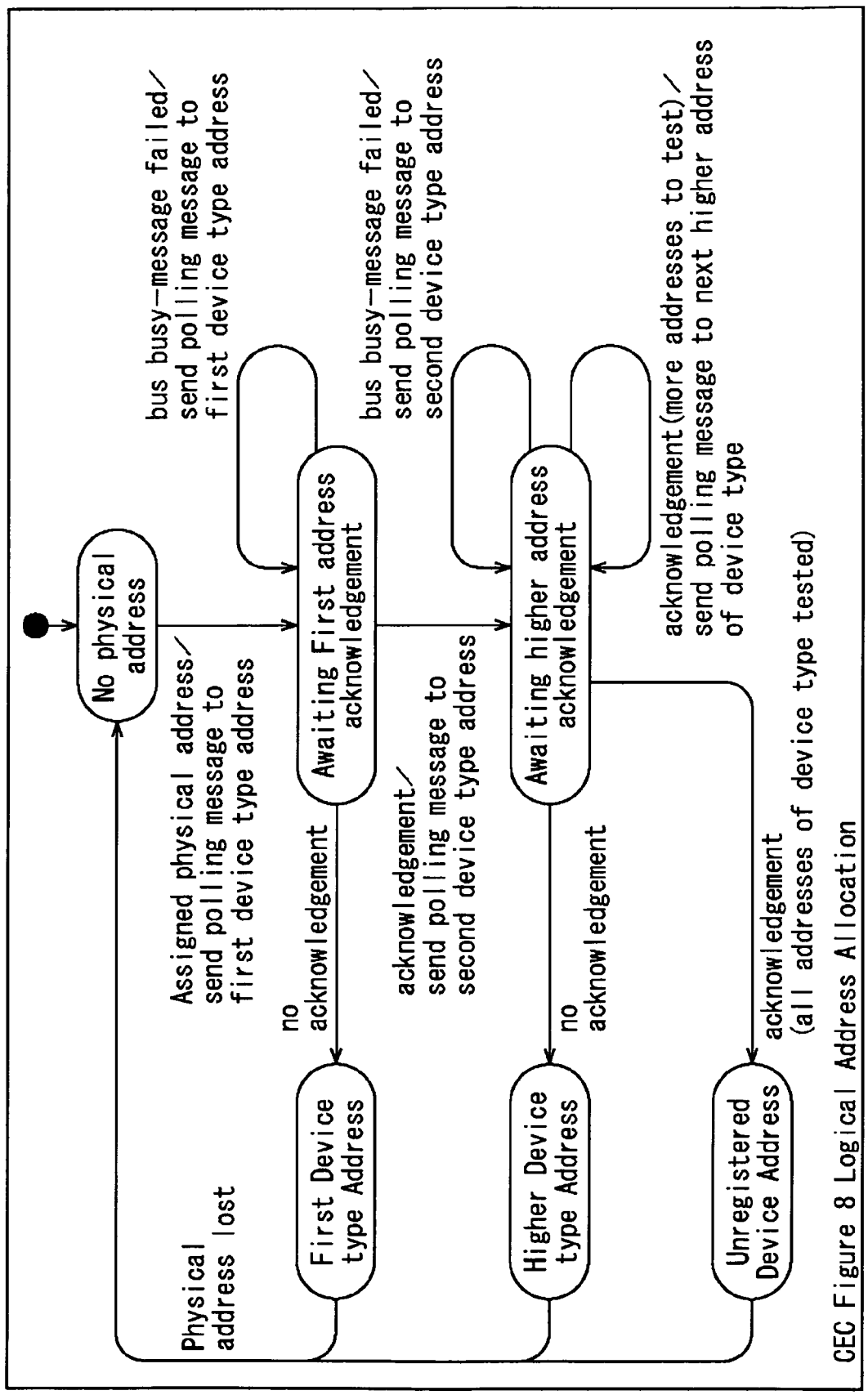
FIG. 28 is a diagram for describing logical address allocation.

Now, FIG. 27 is a diagram illustrating "Table 5" in the HDMI Spec. 1.3a, i.e., a diagram illustrating logical addresses. Also, FIG. 28 is a diagram illustrating "FIG. 8" in the HDMI Spec. 1.3a, i.e., a diagram for describing logical address Allocation.

On the other hand, with Ethernet (Registered Trademark), an IP address of xx.xx.xx.xx is used, and the method thereof includes a method determined by a DHCP server, a method wherein fixed addresses are provided beforehand, and a method called AutoIP wherein an address is allocated to the self device dynamically. In general, with Ethernet (Registered Trademark), it takes time for this address allocation. Also, each of devices has frequently difficulty in being recognized depending on a method for determining a fixed address.

That is to say, with a system including multiple devices to be connected using HDMI and Ethernet (Registered Trademark) together, it has been difficult to determine an IP address to be used for Ethernet (Registered Trademark).

Therefore, with a system including multiple devices to be connected using HDMI and Ethernet (Registered Trademark) together, a method for simply determining an IP address to be used for Ethernet (Registered Trademark) will be provided.

A Physical Address used for HDMI is indicated with A.B.C.D, and has 16 bits in total of 4 bits×4, and simultaneously, represents connection topology between devices connected with HDMI.

On the other hand, an IP address used for Ethernet (Registered Trademark) has 64 bits in total of 16 bits×4, and now, if we say that an IP address used for Ethernet (Registered Trademark) is represented with E.F.G.H for descriptive purposes, E, F, G, and H each have 16 bits.

Figure 29:
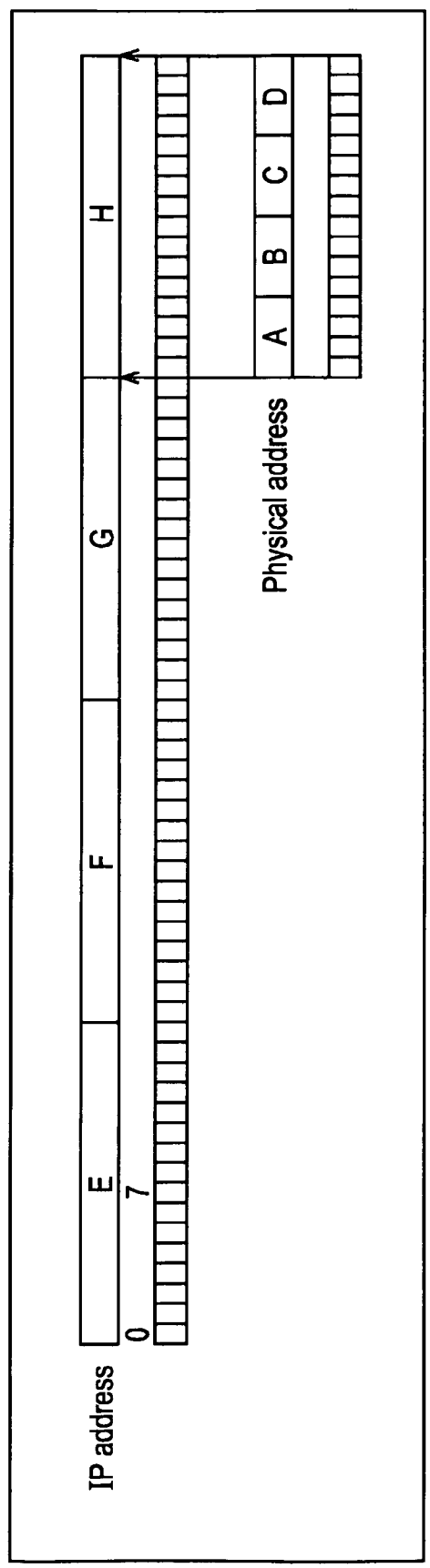
FIG. 29 is a diagram for describing a method for determining an IP address.

A first method for determining an IP address used for Ethernet (Registered Trademark) has, such as shown in FIG. 29 for example, a fundamental feature wherein an IP address is determined by allocating a 16-bit value in total of A.B.C.D to the 16 bits of H. The values of E, F, and G are determined by the CEC Root that is A.B.C.D=0.0.0.0, and information of A.B.C.0 is transmitted over Ethernet (Registered Trademark). Each device determines the E.F.G.H of the self device based on the information thereof and the self A.B.C.D. Thus, the address of the connection end having an HDMI terminal and Ethernet (Registered Trademark) terminal as a pair is determined.

In FIG. 29, the E.F.G.H of an IP address used for Ethernet (Registered Trademark), and A.B.C.D allocated to H are illustrated.

Figure 30:
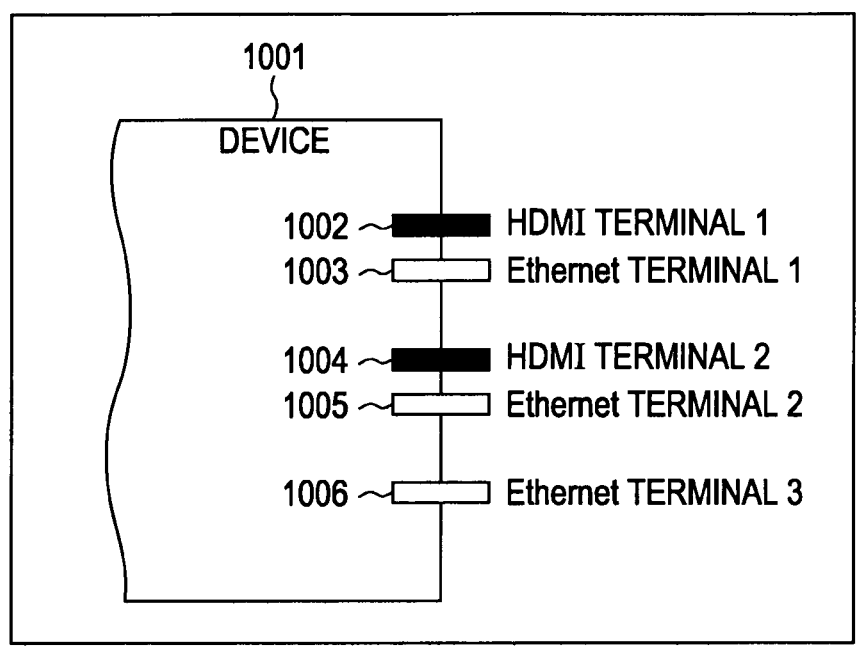
FIG. 30 is a diagram for describing a terminal provided with a device.

Also, for example, such as shown in FIG. 30, even in the case that an independent Ethernet (Registered Trademark) terminal is provided separately from a pair of the HDMI terminal and the Ethernet (Registered Trademark) terminal within the same device, the terminal thereof has no address of the A.B.C.D of an HDMI, but can determine the E.F.G.H of an IP address. 1.0.0.0 in FIG. 8-3, i.e., 1.0.0.0 in FIG. 26 is equivalent to this.

In FIG. 30, with a device 1001, an HDMI terminal 1002 and an Ethernet (Registered Trademark) terminal 1003 which make up a pair, an HDMI terminal 1004 and an Ethernet (Registered Trademark) terminal 1005 which make up a pair, and an Ethernet (Registered Trademark) terminal 1006 are provided. Here, the Ethernet (Registered Trademark) terminal 1006 is independently provided from the other terminals.

Also, multiple methods can be assumed wherein the CEC Root of which the A.B.C.D is 0.0.0.0 determines the values of E, F, and G. These are a method using the values of fixed A, B, and C, a method for determining with reference to the address allocated from a DHCP server, and a method using AutoIP, and the like. Devices of which the values of E, F, and G are the same can communicate freely within the same segment, but communication between devices of which the values thereof differ may have to have a router therebetween.

Further, as another solving means different from the first method described above, such as shown in FIG. 31 for example, there is a method to take advantage of logical addresses (described as E here) in CEC. A logical address in CEC has four bits, and these are allocated to the value of H. Also, the logical address 15 in CEC is used for Broadcast, and accordingly, the value may be converted into a value of 255.

Figure 31:
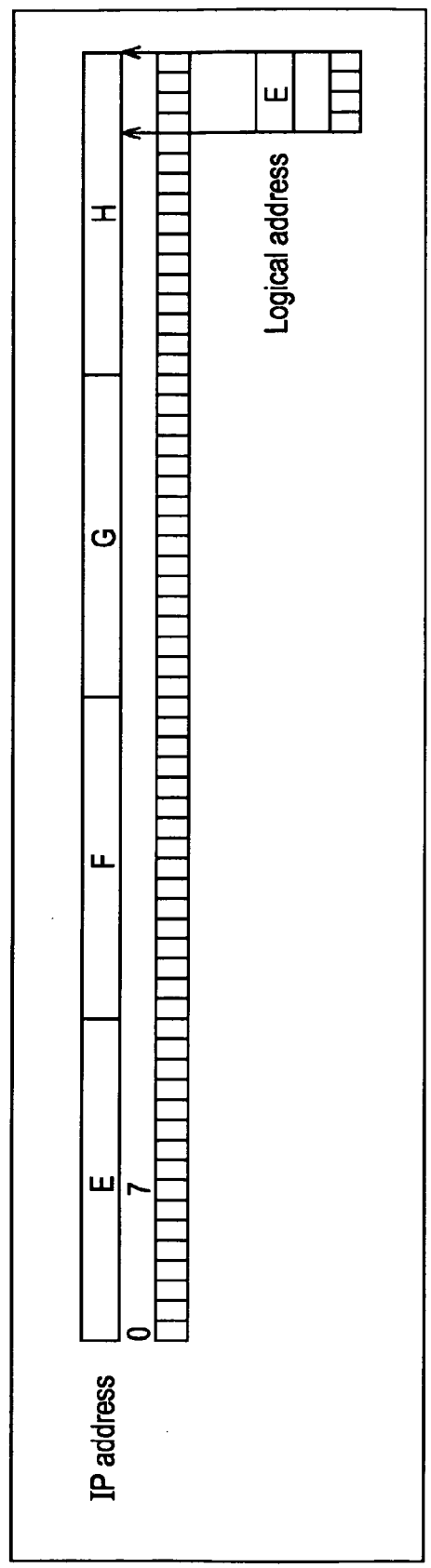
FIG. 31 is a diagram for describing a method for determining an IP address.

FIG. 31 illustrates the E.F.G.H of an IP address used for Ethernet (Registered Trademark), and a logical address (E) to be allocated to the value of H.

Figure 32:
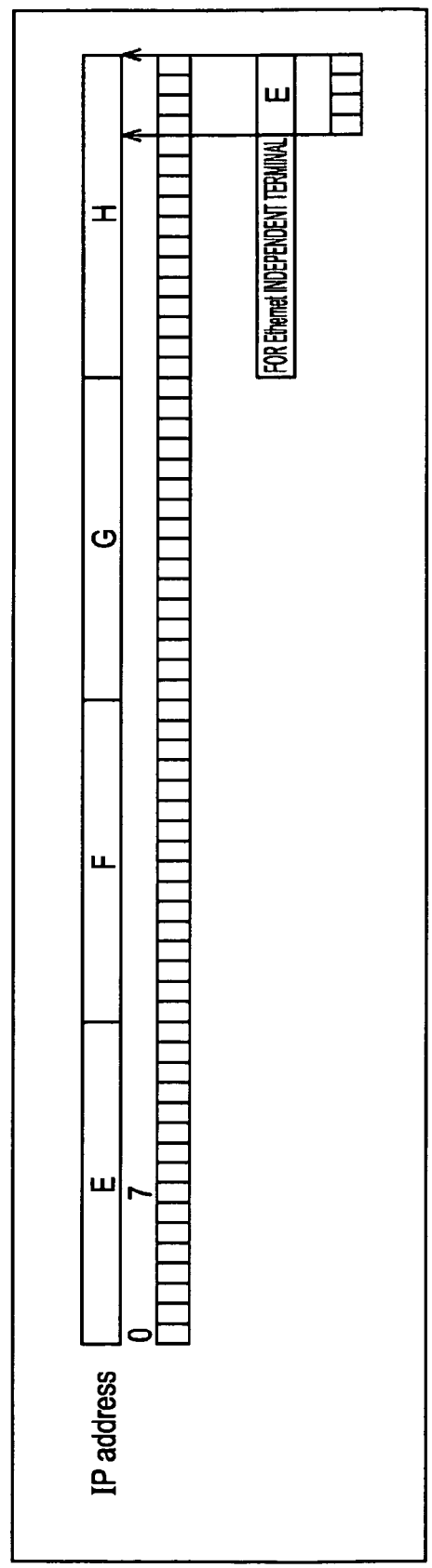
FIG. 32 is a diagram for describing a method for determining an IP address.

Further, in this case, for example, such as shown in FIG. 32, in the case that only an Ethernet (Registered Trademark) terminal is independently provided separately from a pair of the HDMI terminal and the Ethernet (Registered Trademark) terminal, the remaining 12 bits of H of an IP address may be allocated to the independent terminal. For example, with a device of which the lower four bits are 1000b (8), the upper 12 bits of the IP address of the Ethernet (Registered Trademark) terminal of a pair of an HDMI terminal and an Ethernet (Registered Trademark) terminal is 000000000000b, and H is 8, but 000000000001b is allocated to the upper 12 bits of the IP address of the independent Ethernet (Registered Trademark) terminal of the device thereof, and accordingly, 000000000011000b (24) becomes the value of H.

Description has been made so far regarding the address length of the available maximum width as an example, but an arrangement may be made wherein only 11 bits worth are used of the available 12 bits, with consideration for future extensions and the like. Also, an offset may be added to an address, or a logical address (E) may be allocated to a portion other than H.

As another third method different from the first method and the second method described above, there is a method wherein an IP address is determined using a conventional method such as inquiring a DHCP server, or the like, and each of devices packetizes the correspondence information as to the Physical Address and the logical address, and mutually exchanges this on CEC or Ethernet (Registered Trademark), thereby offering facility for an application to be used mutually between HDMI and Ethernet (Registered Trademark).

Figure 33:
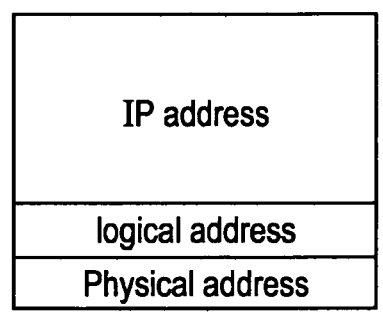
FIG. 33 is a diagram for describing a method for determining an IP address.
Figure 34:
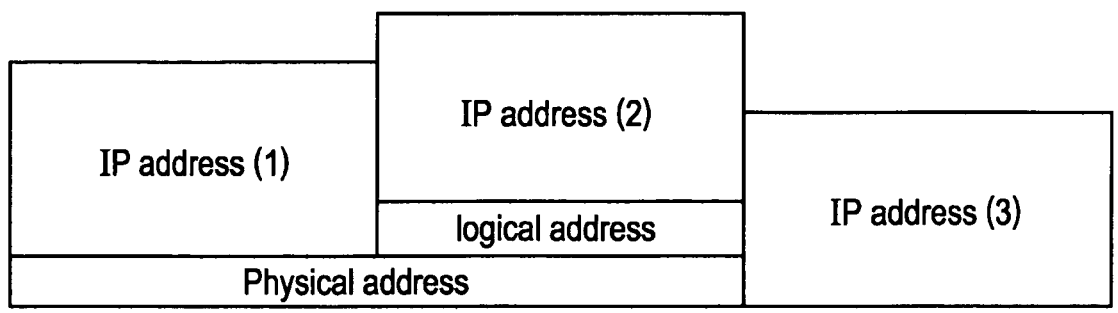
FIG. 34 is a diagram for describing a method for determining an IP address.

Also, FIG. 33 illustrates an IP address, a logical address, and a Physical Address. Further, FIG. 34 illustrates three of IP address (1) through IP address (3), a logical address, and a Physical Address.

Further, with a device having a function for allocating multiple addresses to a signal Ethernet (Registered Trademark) terminal, the above first method, second method, or third method may be used together. In this case, the values of E, F, and G differ for each method. Also, with regard to an HDMI terminal and an Ethernet (Registered Trademark) terminal which make up a pair, a signal path for communicating an Ethernet (Registered Trademark) signal is provided within an HDMI cable, whereby these may be handled as a single terminal and a single cable in an apparent manner.

As described above, with a system including multiple devices to be connected using HDMI and Ethernet (Registered Trademark) together, an IP address to be used for Ethernet (Registered Trademark) can readily be determined.

[Third Embodiment] Hereafter, the communication method described in the first embodiment will be referred to as eHDMI connection. With the present embodiment, a method for avoiding a loop will be described in the case of having the eHDMI connection coexist with common LAN connection.

An eHDMI connector and a LAN connector have to be mounted on a device which can handle both of eHDMI and DLNA. With the eHDMI standard, a device may be connected to a network via an eHDMI cable, but upon the device being connected to the network via the LAN connector simultaneously, the single device is connected to the network using two systems, which causes a loop.

Figure 35:
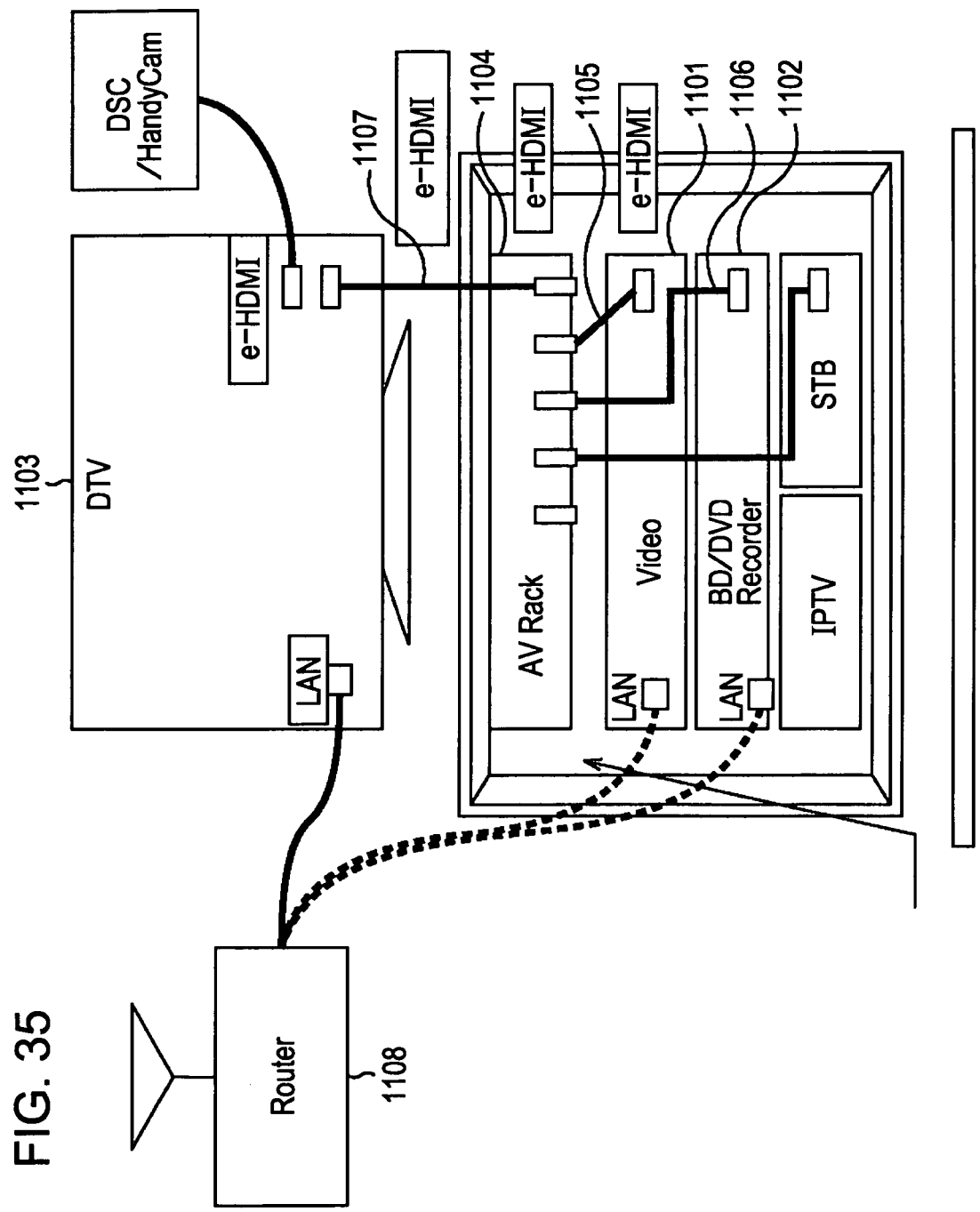
FIG. 35 is a diagram for describing connection between devices by an eHDMI cable or LAN cable.

For example, such as shown in FIG. 35, let us say that a VIDEO (video) 1101 and a BD/DVD Recorder (BD/DVD recorder) 1102 are connected to a DTV (Digital Television Receiver) 1103 via an eHDMI cable. Specifically, the VIDEO 1101 and an AVRack 1104 are connected with an eHDMI cable 1105, and the BD/DVD Recorder 1102 and the AVRack 1104 are connected with an eHDMI cable 1106. Also, the DTV 1103 is connected to the AVRack 1104 with an eHDMI cable 1107.

Also, the eHDMI cables have a LAN cable function in addition to the conventional HDMI, and accordingly, the VIDEO 1101 and the BD/DVD Recorder 1102 are LAN-connected to a ROUTER (router) 1108 via the DTV 1103. On the other hand, a common LAN connector has to be mounted on the VIDEO 1101, BD/DVD Recorder 1102, and the like assuming a case where a user who uses no eHDMI function performs DLNA connection. Upon the user connecting a LAN cable to the LAN connector provided to each of the VIDEO 1101 and the BD/DVD Recorder 1102, and further connecting the opposite sides of the LAN cables thereof to the ROUTER 1108 in addition to eHDMI connection at the time of setting, the VIDEO 1101 and the BD/DVD Recorder 1102 are connected to the ROUTER 1108 with the two systems of the eHDMI cable and the LAN cable, which causes a LOOP. Therefore, the user's attention has to be called by notes with a manual, and also some sort of evasive measure has to be taken on the main unit side of the device. That is to say, in the case of having eHDMI connection coexist with common LAN connection, there is a possibility that a LOOP may be caused.

Therefore, as a method for avoiding such a LOOP, a software-based method and a hardware-based method will be described below.

Figure 36:
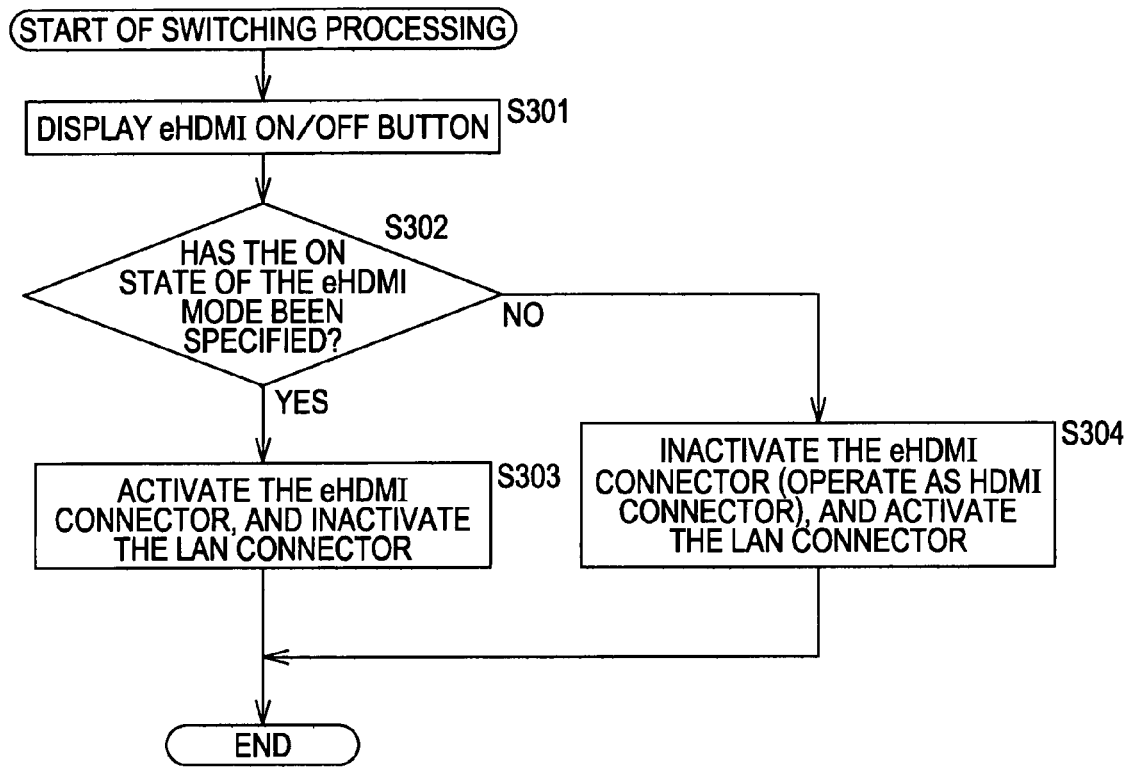
FIG. 36 is a flowchart for describing switching processing.

First, a menu is displayed on a device which can handle both of eHDMI and DLNA, and an eHDMI mode ON/OFF button is provided on the menu thereof. This eHDMI mode ON/OFF button is operated by the user, thereby switching which of the LAN connector and the eHDMI connector provided to the device should be activated. Description will be made below regarding switching processing that is processing for the device executing switching of these LAN connector and eHDMI connector, with reference to the flowchart in FIG. 36.

In step S301, the device displays the menu. The eHDMI mode ON/OFF button is displayed on this menu, and the user operates the device, whereby one of the ON state or OFF state of the eHDMI mode for switching the active connector can be selected by this eHDMI mode ON/OFF button.

In step S302, the device determines whether or not the ON state of the eHDMI mode has been specified. Upon determining in step S302 that the ON state has been specified, in step S303 the device turns on the eHDMI mode, and the switching processing ends. That is to say, the device activates the eHDMI connector provided to the self device, and inactivates the LAN connector. Thus, only the eHDMI connector is activated, and occurrence of a LOOP can be avoided.

On the other hand, in the case that determination is made in step S302 that the ON state has not been specified, in step S304 the device turns off the eHDMI mode, and the switching processing ends. That is to say, the device inactivates the eHDMI connector provided to the self device, and activates the LAN connector. The eHDMI connector activated here functions as HDMI. Thus, only the LAN connector is activated, and occurrence of a LOOP can be avoided.

Thus, the menu is displayed, and the user is allowed to select so as to activate any one connector of the eHDMI connector and the LAN connector, whereby a LOOP can be readily avoided.

Next, a hardware-based method for avoiding a LOOP will be described.

Figure 37:
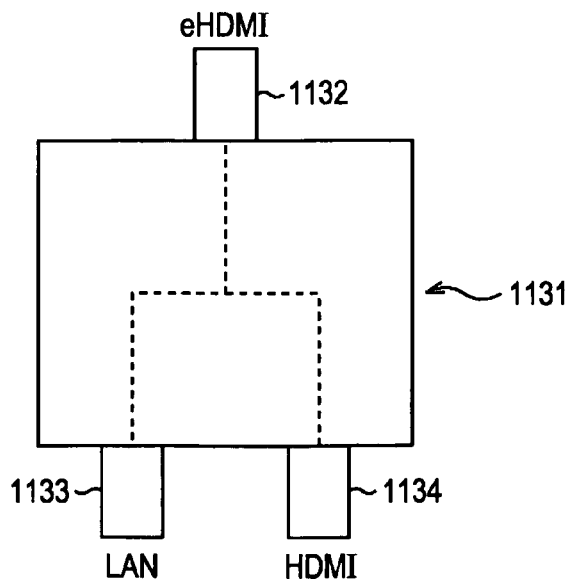
FIG. 37 is a diagram illustrating the configuration of a conversion adaptor.

In such a case, for example, only eHDMI is mounted on the device. Also, in the case that this device directly connects to DLNA without passing through eHDMI, i.e., in the case of carrying out LAN connection to another device without passing through the eHDMI cable, a conversion adaptor 1131 shown in FIG. 37 is used, for example.

The conversion adaptor 1131 is an adaptor for separating eHDMI into LAN and HDMI, or combining LAN and HDMI to obtain eHDMI. With this conversion adaptor 1131, a terminal 1132 for eHDMI, a terminal 1133 for LAN, and a terminal 1134 for HDMI are provided. Such a conversion adaptor 1131 is connected to a device on which only eHDMI is mounted, whereby LAN connection can be carried out to another device without passing through an eHDMI cable.

Figure 38:
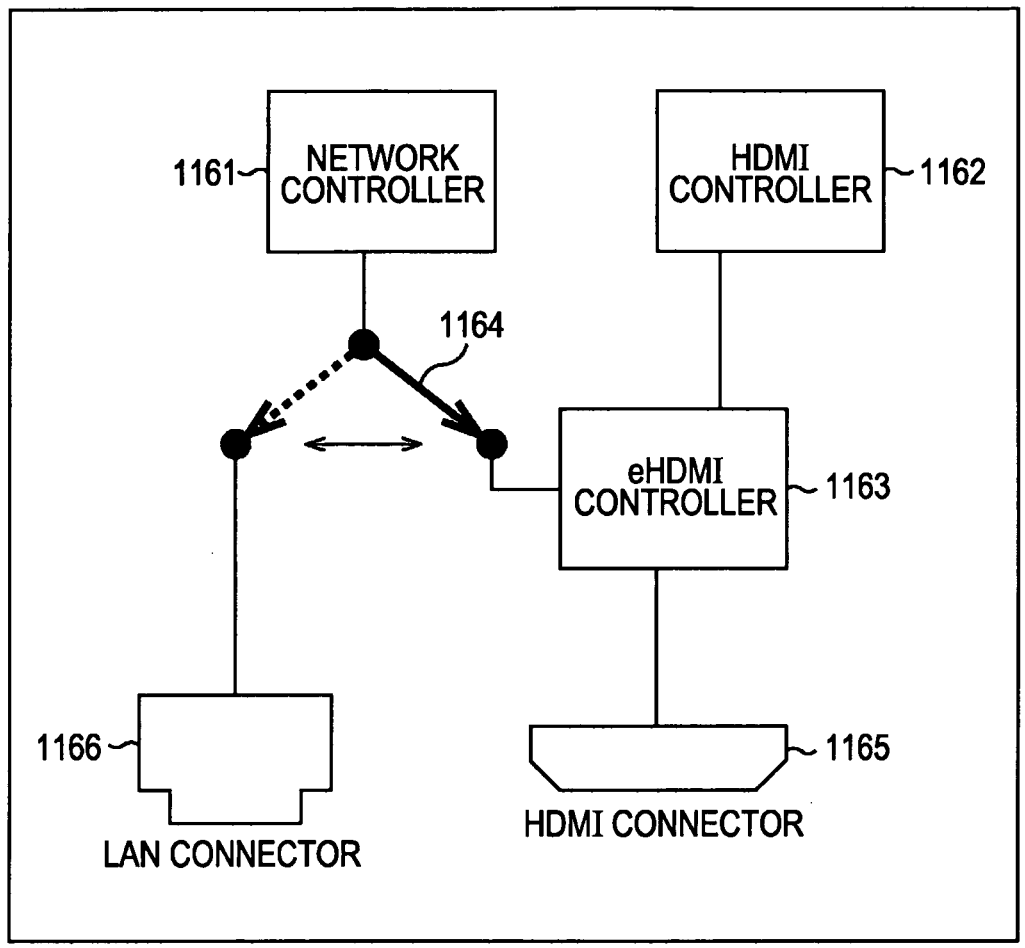
FIG. 38 is a diagram illustrating the configuration of a device to which a switch for switching a connector is provided.

Also, another hardware-based method for avoiding a LOOP may be used, for example, such as shown in FIG. 38, wherein a hard switch is provided to the device, and connection to the eHDMI connector and connection to the LAN connector is switched.

In FIG. 38, with the device, a network controller 1161, an HDMI controller 1162, an eHDMI controller 1163, a switch 1164, an HDMI connector (eHDMI connector) 1165, and a LAN connector 1166 are provided.

The HDMI controller 1162 is connected to the eHDMI controller 1163, and the eHDMI controller 1163 is connected to the HDMI connector 1165. Further, the switch 1164 is connected to the network controller 1161, and the switch 1164 is switched to connect to one of the eHDMI controller 1163 and the LAN connector 1166.

Here, upon the switch 1164 being connected to the eHDMI controller 1163, the network controller 1161 is connected to the HDMI connector 1165 via the eHDMI controller 1163. Also, upon the switch 1164 being connected to the LAN connector 1166, the network controller 1161 is connected to the LAN connector 1166. Thus, connection is switched to the HDMI connector 1165 or LAN connector 1166 by the switch 1164, whereby a LOOP can readily be avoided.

Figure 39:
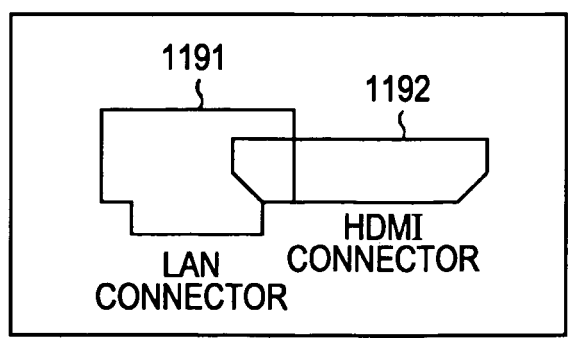
FIG. 39 is a diagram illustrating an example of a LAN connector and an HDMI connector provided to the device.

Further, another hardware-based method for avoiding a LOOP may be used, for example, such as shown in FIG. 39, wherein the LAN connector 1191 and the HDMI connector (eHDMI connector) 1192 are provided closely to the device, and only one of the connectors is allowed to be connected. That is to say, only one of the LAN connector 1191 and the HDMI connector 1192 is connected to another device via a cable or the like.

Further, another hardware-based method for avoiding a LOOP may be used wherein two network control chips for eHDMI connectors and for LAN connectors are mounted on the device.

Figure 40:
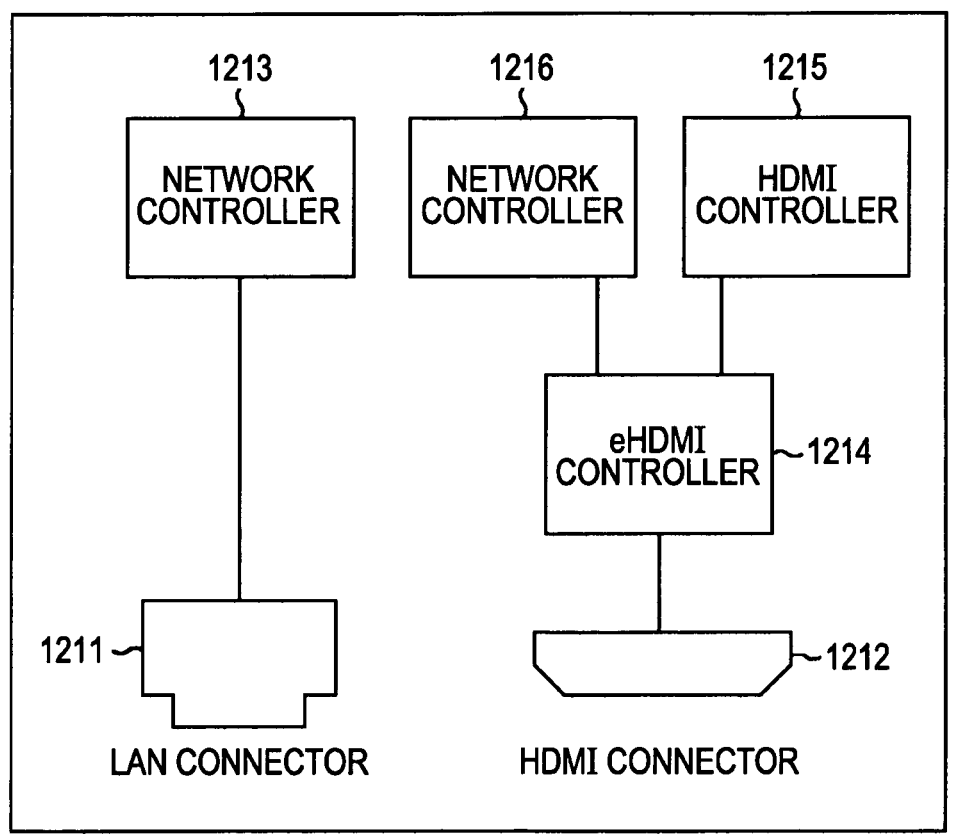
FIG. 40 is a diagram illustrating the configuration of the device.

In such a case, for example, such as shown in FIG. 40, with the device, a LAN connector 1211, an HDMI connector (eH-DMI connector) 1212, a network controller 1213, an eHDMI controller 1214, an HDMI controller 1215, and a network controller 1216 are provided.

Here, the LAN connector 1211 is connected to the network controller 1213. Also, the HDMI connector 1212 is connected to the eHDMI controller 1214, and the HDMI controller 1215 and the network controller 1216 are connected to the eHDMI controller 1214.

Thus, the network controller 1213 for the LAN connector 1211, and the network controller 1216 for the HDMI connector 1212 are provide to the device, whereby a LOOP can readily be avoided.

The invention claimed is:

1. A transmission device configured to transmit pixel data of one screen worth of an uncompressed image to a reception device in one direction within a valid image section that is a section obtained by removing a horizontal retrace section and a vertical retrace section from a section from one vertical synchronizing signal to the next vertical synchronizing signal, using a first differential signal, comprising:
   conversion device configured to convert data different from said pixel data, which is data to be transmitted, into a second differential signal made up of a first partial signal and a second partial signal, transmit said first partial signal to said reception device via a first signal line, and also output said second partial signal;
   first selecting device configured to select one of a first transmission signal that is a signal relating to control, and said second partial signal output from said conversion device, said second partial signal being output to said first selecting device from said first conversion device, and transmit the selected signal to said reception device via a second signal line;
   first control device configured to control, in the case of transmitting said first transmission signal to said reception device, said first selecting device so as to select said first transmission signal, and in the case of transmitting said second differential signal to said reception device, to control said first selecting device so as to select said second partial signal; and
   decoding device configured to receive a third differential signal made up of a third partial signal and a fourth partial signal, transmitted from said reception device, and decode said third differential signal to the original data,
   wherein said decoding device receives said third differential signal made up of said third partial signal transmitted via a third signal line, and said fourth partial signal transmitted via a fourth signal line;
   and wherein said transmission device further includes
   second selecting device configured to select one of said third partial signal, and a second transmission signal that is a signal relating to control, to be transmitted to said reception device;
   third selecting device configured to select one of said fourth partial signal, and a third transmission signal to be transmitted to said reception device; and
   second control device configured to control, in the case of transmitting said second transmission signal and said third transmission signal to said reception device, said second selecting device so as to select said second transmission signal and to transmit said second transmission signal to said reception device via said third signal line, and to control said third selecting device so as to select said third transmission signal and to transmit said third transmission signal to said reception device via said fourth signal line, and in the case of receiving said third differential signal, to control said second selecting device so as to select said third partial signal, and said decoding device so as to receive said third partial signal, and said third selecting device so as to select said fourth partial signal, and said decoding device so as to receive said fourth partial signal.

2. The transmission device according to claim 1, wherein said first selecting device selects said second partial signal, or said first transmission signal, or a first reception signal that is a signal relating to control, transmitted from said reception device via said second signal line, and in the case of selecting said first reception signal, to receive and output said first reception signal;

and wherein said second selecting device selects said third partial signal, or said second transmission signal, or a second reception signal that is a signal relating to control, transmitted from said reception device via said third signal line, and in the case of selecting said second reception signal, to receive and output said second reception signal.

3. The transmission device according to claim 2, wherein said first transmission signal and said first reception signal are a CEC (Consumer Electronics Control) signal that is data for control of said transmission device or said reception device;

and wherein said second reception signal is E-EDID (Enhanced Extended Display Identification Data) that is information relating to the performance of said reception device, used for control;

and wherein data to be converted into said second differential signal, and data obtained by decoding said third differential signal is data conforming to IP (Internet Protocol);

and wherein said first control device is controlled to cause said first selecting device to select said second partial signal after receiving said second reception signal;

and wherein said second control device is controlled to cause said second selecting device and said third selecting device to select said third partial signal and said fourth partial signal after receiving said second reception signal.

4. A reception device configured to receive pixel data of one screen worth of an uncompressed image to be transmitted from a transmission device in one direction within a valid image section that is a section obtained by removing a horizontal retrace section and a vertical retrace section from a section from one vertical synchronizing signal to the next vertical synchronizing signal, using a first differential signal, comprising:

decoding device configured to receive a second differential signal made up of a first partial signal transmitted from said transmission device via a first signal line, and a second partial signal transmitted from said transmission device via a second signal line, and decode said second differential signal to the original data;

first selecting device configured to select one of said first partial signal, and a first reception signal that is a signal relating to control, transmitted from said transmission device via said first signal line;

first control device configured to control, in the case of receiving said first reception signal, said first selecting device so as to select and receive said first reception signal, and in the case of receiving said second differential signal, to control said first selecting device so as to select said first partial signal for output to the decoding device, and said decoding device so as to receive the first partial signal; and conversion device configured to convert data different from said pixel data, which is data to be transmitted, into a third differential signal made up of a third partial signal and a fourth partial signal, and transmit the third differential signal to said transmission device, wherein said conversion device outputs said third partial signal and said fourth partial signal;

and wherein said reception device further comprising:

second selecting device configured to select one of said third partial signal output from said conversion device, and a second reception signal that is a signal relating to control, transmitted from said transmission device via a third signal line;

third selecting device configured to select one of said fourth partial signal output from said conversion device, and a third reception signal transmitted from said transmission device via a fourth signal line; and second control device configured to control, in the case of receiving said second reception signal and said third reception signal, said second selecting device so as to select said second reception signal so as to receive said second reception signal, and also control said third selecting device so as to select said third reception signal so as to receive said third reception signal, and in the case of transmitting said third differential signal, to control said second selecting device so as to select said third partial signal, and transmit said third partial signal to said transmission device via said third signal line, and also to control said third selecting device so as to select said fourth partial signal, and transmit said fourth partial signal to said transmission device via said fourth signal line.

5. The reception device according to claim 4, wherein said first selecting device selects said first partial signal, or said first reception signal, or a first transmission signal that is a signal relating to control, and in the case of selecting said first transmission signal, is to transmit said selected first transmission signal to said transmission device via said first signal line;

and wherein said second selecting device selects said third partial signal, or said second reception signal, or a second transmission signal that is a signal relating to control, to be transmitted to said transmission device, and in the case of selecting said second transmission signal, to transmit said selected second transmission signal to said transmission device via said third signal line.

* * * * *